(12) United States Patent
Husak et al.

(10) Patent No.: US 7,929,433 B2
(45) Date of Patent: Apr. 19, 2011

(54) MANIPULATING DATA STREAMS IN DATA STREAM PROCESSORS

(75) Inventors: David J. Husak, Windham, NH (US); Matthew S. Melton, Boulder, CO (US); David F. Barton, Longmont, CO (US); David Nuechterlein, Longmont, CO (US); Syed I. Shah, North Andover, MA (US); Jon L. Fluker, Lafayette, CO (US)

(73) Assignee: Freescale Semiconductor, Inc., Austin, TX (US)

( * ) Notice: Subject to any disclaimer, the term of this patent is extended or adjusted under 35 U.S.C. 154(b) by 237 days.

(21) Appl. No.: 12/388,630

(22) Filed: Feb. 19, 2009

(65) Prior Publication Data

US 2009/0154459 A1 Jun. 18, 2009

Related U.S. Application Data

(62) Division of application No. 10/475,066, filed as application No. PCT/US02/11509 on Apr. 11, 2002, now abandoned.

(60) Provisional application No. 60/283,746, filed on Apr. 13, 2001.

(51) Int. Cl.
*H04L 12/56* (2006.01)
(52) U.S. Cl. ...................................................... 370/229
(58) Field of Classification Search .......... 709/230–237; 370/229–231, 235
See application file for complete search history.

(56) References Cited

U.S. PATENT DOCUMENTS

| | | | |
|---|---|---|---|
| 5,850,399 A | | 12/1998 | Ganmukhi et al. |
| 5,859,835 A | * | 1/1999 | Varma et al. ................. 370/229 |
| 5,898,687 A | | 4/1999 | Harriman et al. |
| 5,996,019 A | * | 11/1999 | Hauser et al. ................. 709/235 |
| 6,026,093 A | | 2/2000 | Bellaton et al. |
| 6,094,435 A | | 7/2000 | Hoffman et al. |
| 6,128,278 A | | 10/2000 | Joffe et al. |
| 6,144,668 A | | 11/2000 | Bass et al. |
| 6,160,812 A | * | 12/2000 | Bauman et al. ............... 370/416 |

(Continued)

FOREIGN PATENT DOCUMENTS

EP 0680173 B1 9/2003

(Continued)

OTHER PUBLICATIONS

First Office Action issued Mar. 2, 2007 in corresponding Chinese Application No. 02808208.7.

(Continued)

*Primary Examiner* — Chi H Pham
*Assistant Examiner* — Robert Lopata

(57) ABSTRACT

Techniques for performing user-configurable traffic management functions on streams of packets. The functions include multicasting, discard, scheduling, including shaping, and segmentation and reassembly. In the techniques, the functions are not performed directly on the packets of the stream, but instead on descriptors that represent stored packets. Output of descriptors from all traffic queues, including discard traffic queues, is scheduled. Scheduling is done using a hierarchy of schedulers. The form of the hierarchy and the scheduling algorithms used by the schedulers in the hierarchy are both user configurable. As disclosed, the techniques are implemented in a traffic management coprocessor integrated circuit. The traffic manager coprocessor is used with a digital communications processor integrated circuit that performs switching functions. The buffers for the packets are in the digital communications processor. Also disclosed are a modified partial packet discard algorithm and a frame based deficit round robin scheduling algorithm.

9 Claims, 35 Drawing Sheets

U.S. PATENT DOCUMENTS

| | | |
|---|---|---|
| 6,430,152 B1 | 8/2002 | Jones et al. |
| 6,452,933 B1 * | 9/2002 | Duffield et al. ............... 370/415 |
| 6,606,301 B1 | 8/2003 | Muller et al. |
| 6,629,147 B1 | 9/2003 | Grow |
| 6,680,933 B1 | 1/2004 | Cheesman et al. |
| 6,754,215 B1 * | 6/2004 | Arikawa et al. ............ 370/395.4 |
| 6,882,625 B2 * | 4/2005 | Le et al. ......................... 370/238 |
| 6,934,760 B1 | 8/2005 | Westbrook et al. |
| 6,987,760 B2 | 1/2006 | Calvignac et al. |
| 7,027,394 B2 * | 4/2006 | Gupta et al. ............... 370/230.1 |
| 7,035,212 B1 | 4/2006 | Mittal et al. |
| 7,236,491 B2 * | 6/2007 | Tsao et al. .................... 370/392 |
| 7,257,616 B2 | 8/2007 | Bass et al. |
| 7,315,901 B1 | 1/2008 | Bass et al. |
| 2002/0023168 A1 | 2/2002 | Bass et al. |
| 2002/0095512 A1 | 7/2002 | Rana et al. |
| 2002/0107974 A1 | 8/2002 | Janoska et al. |
| 2002/0136200 A1 * | 9/2002 | St. John ....................... 370/352 |
| 2003/0169743 A1 * | 9/2003 | Chiussi et al. ............. 370/395.4 |
| 2004/0062246 A1 | 4/2004 | Boucher et al. |
| 2004/0081093 A1 | 4/2004 | Haddock et al. |
| 2005/0175014 A1 * | 8/2005 | Patrick ..................... 370/395.43 |

FOREIGN PATENT DOCUMENTS

| | | |
|---|---|---|
| EP | 0874532 B1 | 8/2004 |
| EP | 1093266 B1 | 6/2007 |
| WO | 99/27688 A1 | 6/1999 |
| WO | 00/60899 A1 | 10/2000 |
| WO | 01/13590 A1 | 2/2001 |

OTHER PUBLICATIONS

Second Office Action issued Jan. 4, 2008 in corresponding Chinese Application No. 02808208.7.

Rejection mailed May 22, 2007 in corresponding Japanese Application No. 2002-582554.

Preliminary Rejection mailed Nov. 21, 2008 in corresponding Korean Application No. 10-2003-7013456.

PCT/US02/11509 International Search Report and Written Opinion mailed Jun. 6, 2003.

Office Action mailed Jun. 9, 2008 in U.S. Appl. No. 10/475,066.

Final Rejection mailed Nov. 19, 2008 in U.S. Appl. No. 10/475,066.

Briem et al., "Traffic Control for an ATM Switch with Per VC Queuing: Concept and Implementation," X VI World Telecom Congress Proceedings, Interactive Session 3, Systems Technology & Engineering, Sep. 21-26, 1997, pp. 409-415.

Kumar et al., "Beyond Best Effort: Router Architectures for the Differentiated Services of Tomorrow's Internet," Bell Laboratories, 1998, pp. 1-16.

Sasaki, Yasuhito et al.; "Design of the Shared-Buffering ATM Switch LSI Chipset Using 0.5um CMOS Technology"; Electronics, Information and Communication Engineers, Technical Report. SSE95-76; Sep. 26, 1995; pp. 37-42; vol. 95, No. 267, Japan.

Restriction issued Feb. 4, 2008 in U.S. Appl. No. 10/475,066.

* cited by examiner

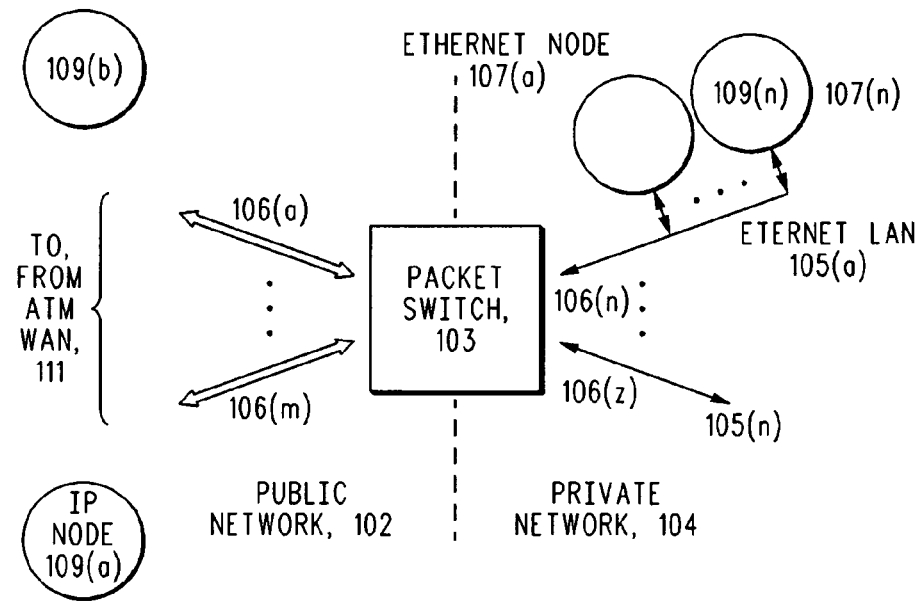
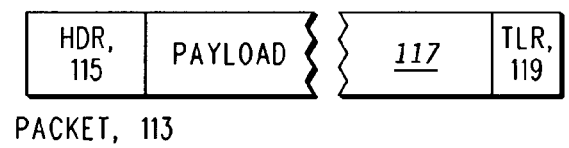
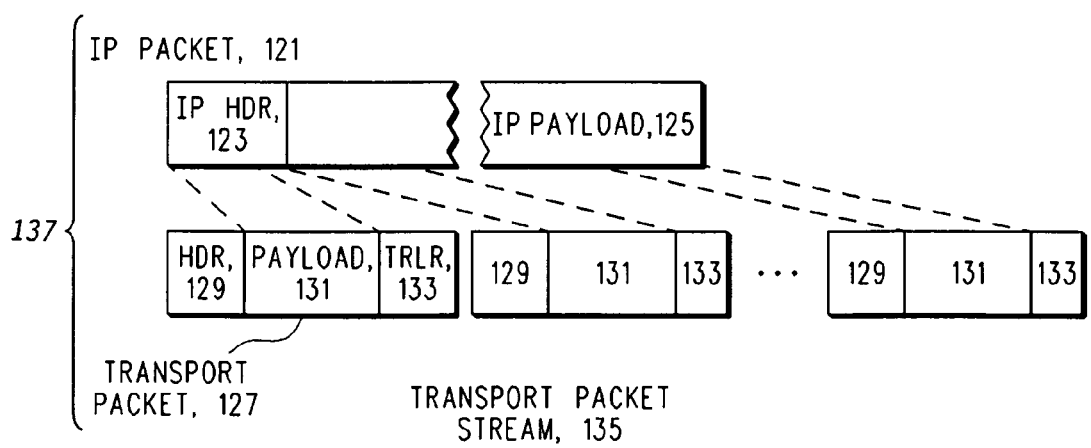
*FIG.1*
—PRIOR ART—

FIG. 6

| WORD OFFSET | FIELD NAME | BIT POSITION | DESCRIPTION | |
|---|---|---|---|---|
| 0 | TYPE (TYPE) | 2:0 | ENQUEUE MESSAGE TYPE. SPECIFIED AS FOLLOWS:<br>• B111 = IDLE. THIS IS NOT THE START OF AN ENQUEUE MESSAGE.<br>• B000 = NORMAL ENQUEUE MESSAGE.<br>• B001 = NORMAL ENQUEUE MESSAGE WITH FAILURE (ONLY HAPPENS WHEN QMU COMBINES SPEC/COMMIT WITH FAILURE MESSAGES INTO ONE "NORMAL" MESSAGE)<br>• B010 = SPECULATIVE ENQUEUE MESSAGE.<br>• B011 = RESERVED.<br>• B100, B101, B110 = RESERVED FOR COMMIT ENQUEUE MESSAGE TYPES. | 611 |
| | END OF MESSAGE (EOM) | 3 | THIS FIELD IS ONLY VALID WHEN THE SPECIFIED TRAFFIC QUEUE IS CONFIGURED TO SUPPORT ONE OR MORE OF THE FOLLOWING FUNCTIONS, AND IS OTHERWISE IGNORED:<br>1. REASSEMBLY OF MULTI-PACKET MESSAGES.<br>2. EARLY OR PARTIAL PACKET DISCARD.<br>THIS INDICATOR IS SET HIGH WHEN THE ENQUEUE MESSAGE DESCRIPTOR CORRESPONDS TO A PACKET THAT COMPLETES THE END OF MULTI-PACKET MESSAGE. THIS FIELD IS COMMONLY USED TO MARK THE LAST CELL OF AN ATM AAL-5 PACKET. | 613 |
| | TRAFFIC QUEUE IDENTIFIER (TQID) | 21:4 | IDENTIFIES A TRAFFIC QUEUE OR MULTICAST GROUP. 18 BITS SUPPORTS UP TO 256K TRAFFIC QUEUES. | 615 |
| | | 22 | SET TO ZERO. RESERVED | 617 |
| | MULTICAST | 23 | INDICATOR SET HIGH TO IDENTIFY AN ENQUEUE TO A MULTICAST GROUP. | 619 |
| 1 | PACKET BYTE LENGTH (PKTBYTELEN) | 15:0 | BYTE LENGTH OF THE PACKET WHOSE ASSOCIATED DESCRIPTOR IS BEING ENQUEUED. 16 BITS SUPPORTS PACKET BYTE LENGTHS FROM 0 TO 64K-1. | 621 |
| | SOURCE IDENTIFIER (SRCID) | 20:16 | IDENTIFIES THE SOURCE OF THE ENQUEUE MESSAGE DESCRIPTOR. THIS FIELD IS USED TO ASSOCIATED COMMIT ENQUEUE MESSAGES WITH PRIOR SPECULATIVE ENQUEUE MESSAGES. THIS FIELD MAY ALSO BE USED FOR DETERMINING THE DESTINATION DISCARD QUEUE. FOR SPECULATIVE ENQUEUE MESSAGES, THIS FIELD IS RESTRICTED TO VALUES 0 THROUGH 15. | 623 |
| | DISCARD PRIORITY (DISCARDPRIORITY) | 23:21 | IDENTIFIES ONE OF EIGHT DISCARD PRIORITIES. A HIGHER DISCARD PRIORITY VALUE USUALLY MEANS THAT THE DESCRIPTOR IS MORE LIKELY TO BE DISCARDED. THE DISCARD PRIORITY FIELD IS COMMONLY USED TO REPRESENT ATM CELL LOSS PRIORITY (CLP). | 625 |

| WORD OFFSET | FIELD NAME | BIT POSITION | DESCRIPTION | |
|---|---|---|---|---|
| 0 | TYPE (TYPE) | 2:0 | DEQUEUE MESSAGE TYPE. SPECIFIED AS FOLLOWS:<br>• B111 = IDLE. THIS IS NOT THE START OF A DEQUEUE MESSAGE.<br>• B000 = NORMAL DEQUEUE MESSAGE.<br>• B001 = DISCARD DUE TO INSUFFICIENT RESOURCES FOR A MULTICAST ELABORATION.<br>• B010 = DEQUEUE MESSAGE ASSOCIATED WITH A SPECULATIVE ENQUEUE COMMITTED WITH FAILURE OR AN ENQUEUE OF THE "NORMAL ENQUEUE MESSAGE WITH FAILURE" TYPE.<br>• B011 = REASSEMBLY TIMEOUT, WHERE THE END OF MESSAGE INDICATION IS FORCED ON FOR THE LAST DESCRIPTOR RECEIVED FOR THE TIMED-OUT REASSEMBLY.<br>• B100 = DISCARD DUE TO THE REASON SPECIFIED IN THE DISCARD REASON FIELD.<br>• B101 = DISCARD DUE TO THE REASON SPECIFIED IN THE DISCARD REASON FIELD, OF A SEGMENT IN A MULTI-SEGMENT PACKET THAT IS BEING REASSEMBLED. THE REMAINING SEGMENTS OF THE PACKET WILL BE DISCARDED WITH THE EPD/PPD DISCARD REASON.<br>• B110 = DISCARD OF AN ILLEGAL ENQUEUE. ILLEGAL ENQUEUE REASONS INCLUDE: ENQUEUE TO A DISABLED TRAFFIC QUEUE, ENQUEUE WITH ZERO PACKET LENGTH, ETC. | 703 |
| | END OF MESSAGE (EOM) | 3 | THIS FIELD IS ONLY VALID WHEN THE SPECIFIED TRAFFIC QUEUE IS CONFIGURED TO SUPPORT ONE OR MORE OF THE FOLLOWING FUNCTIONS, AND IS OTHERWISE IGNORED:<br>1. REASSEMBLY OF MULTI-PACKET MESSAGES.<br>2. PACKET SEGMENTATION.<br>THIS INDICATOR IS SET HIGH WHEN THE DEQUEUE MESSAGE DESCRIPTOR CORRESPONDS TO A PACKET THAT COMPLETES THE END OF MULTI-PACKET MESSAGE. THIS FIELD IS COMMONLY USED TO MARK THE LAST CELL OF AN ATM AAL-5 PACKET. | 705 |
| | VIRTUAL OUTPUT PORT IDENTIFIER (VOPID) | 12:4 | IDENTIFIES A VIRTUAL OUTPUT PORT. 9 BITS SUPPORTS UP TO 512 VIRTUAL OUTPUT PORTS. | 707 |
| | | 14:13 | SET TO ZERO. RESERVED | 709 |

| WORD OFFSET | FIELD | BIT POSITION | DESCRIPTION | |
|---|---|---|---|---|
| 0 | TAIL DESCRIPTOR IDENTIFIER (TAILDESCID) | 20:0 | DESCRIPTOR IDENTIFIER OF THE LAST DESCRIPTOR IN THE TRAFFIC QUEUE'S LINKED LIST OF DESCRIPTORS. | 811 |
| | TRAFFIC QUEUE STATE (TQSTATE) | 23:21 | TRAFFIC QUEUE STATE. THIS VALUE SHOULD BE INITIALIZED TO 000 TO DISABLE THE TRAFFIC QUEUE. THE STATE INDICATES WHETHER THE TRAFFIC QUEUE IS DISABLED, INACTIVE, AND ADDITIONAL INFORMATION USED IN AAL5 MESSAGE PROCESSING. | 861 |
| | INPUT SELECT CONFIGURATION IDENTIFIER (INPUTSELCFGID) | 31:24 | A EIGHT BIT INDEX INTO THE INPUT SELECTIONS CONFIGURATION TABLE FOR SPECIFYING HOW THE TQ SHOULD BE ATTACHED TO THE I2C SCHEDULER INPUTS. | 831 |
| | TRAFFIC QUEUE TAG (TQTAG) | 39:32 | TQ TAG IS AN 8 BIT, GENERIC FIELD THAT GETS CARRIED WITH A DEQUEUED DESCRIPTOR TO HELP IDENTIFY WHICH TQ IT CAME FROM. ONE USE OF THIS FIELD IS TO HELP ASSIST IN MULTICAST ELABORATION IDENTIFICATION. NOTE: WHEN A DESCRIPTOR IS REDIRECTED INTO A DISCARD TQ, THE TQ TAG OF THE ORIGINAL TQ IS PROPAGATED TO THE C5 FOR IDENTIFICATION. | 865 |
| | BUFFER POOL IDENTIFIER (BPID) | 50:40 | IDENTIFIER OF THE BUFFER POOL TO WHICH THIS TRAFFIC QUEUE BELONGS. | 827 |
| | BUFFER POOL IDENTIFIER VALID (BPIDVALID) | 51 | INDICATES THAT THE BUFFER POOL IDENTIFIER BPID IS VALID. IF THIS BIT IS ZERO, THEN THIS TRAFFIC QUEUE IS NOT A MEMBER OF ANY BUFFER POOL AND THE BPID FIELD IS IGNORED. | 867 |
| | DISCARD CONFIGURATION IDENTIFIER (DISCARDCFGID) BITS 4:0 | 56:52 | LOW 5 BITS OF THE 11-BIT IDENTIFIER FOR THE DISCARD CONFIGURATION USED BY THIS TRAFFIC QUEUE. | 813 |
| | SWEEP INDICATORS | 58:57 | 2 BITS THAT CAN BE SET BY THE HOST TO ASSIST IN CLOCK SWEEP ALGORITHMS. THESE BITS ARE CLEARED TO 00 ON EVERY DESCRIPTOR ENQUEUE TO THE TRAFFIC QUEUE. IF BOTH BITS ARE SET, THIS INDICATES THAT IT HAS BEEN A LONG TIME SINCE THE LAST ENQUEUE TO THIS TRAFFIC QUEUE. | 869 |
| | CLASS SCHEDULER IDENTIFIER (I2CID) | 68:59 | IDENTIFIER OF THE CLASS SCHEDULER THAT SERVICES THIS TRAFFIC QUEUE. | 819 |
| | RESERVED | 70:69 | NOT USED. | |
| | ODD PARITY-WORD 0 | 71 | ODD PARITY ON BITS 70:0 OF WORD 0. | |

| WORD OFFSET | FIELD | BIT POSITION | DESCRIPTION | |
|---|---|---|---|---|
| 0 | NEXT MULTICAST ELABORATION TABLE IDENTIFIER (NEXTMCASTELAB TABLEID) | 17:0 | ADDRESS OF THE NEXT MULTICAST ELABORATION TABLE IN THE LINKED LIST OF MULTICAST ELABORATION TABLES FOR THIS MULTICAST GROUP. | 911 |
| | | 18 | SET TO ZERO. RESERVED. | |
| | NEXT MULTICAST ELABORATION TABLE IDENTIFIER VALID (NEXTMCAST-ELABTABLEIDVALID) | 19 | INDICATOR SET HIGH IF THE NEXT MULTICAST ELABORATION TABLE IDENTIFIER IS VALID. IF NOT VALID, THIS MULTICAST ELABORATION TABLE IS THE LAST MULTICAST ELABORATION TABLE IN THE LIST OF MULTICAST ELABORATION TABLES FOR THIS MULTICAST GROUP. | 913 |
| | | 39:20 | SET TO ZERO. RESERVED. | |
| | TRAFFIC QUEUE IDENTIFIER 0 (TQID0) | 57:40 | IDENTIFIER OF A TRAFFIC QUEUE THAT IS A MEMBER OF THIS MULTICAST GROUP. | 916 |
| | | 58 | SET TO ZERO. RESERVED. | 917 |
| | TRAFFIC QUEUE IDENTIFIER 0 VALID (TQIDVALID0) | 59 | INDICATOR SET HIGH IF TRAFFIC QUEUE IDENTIFIER 0 IS VALID. | |
| | TRAFFIC QUEUE IDENTIFIER 1 BITS 10:0 (TQID1[10:0]) | 70:60 | BITS 10 THROUGH 0 OF TRAFFIC QUEUE IDENTIFIER 1. | 915 |
| | ODD PARITY (ODDPARITY) | 71 | ODD PARITY ON BITS 70:0. | 919 |
| 1 | TRAFFIC QUEUE IDENTIFIER 1 BITS 17:11 (TQID1[17:11]) | 6:0 | BITS 17 THROUGH 11 OF TRAFFIC QUEUE IDENTIFIER 1. | |

| FIELD NAME | BIT POSITION | DESCRIPTION |
|---|---|---|
| PROBABILITY TERM EXPONENT | 62:58 | PROBABILITY TERM EXPONENT |
| PROBABILITY TERM MANTISSA | 57:50 | PROBABILITY TERM MANTISSA |
| MIN THRESHOLD EXPONENT | 49:45 | BUFFER POOL MINIMUM THRESHOLD EXPONENT |
| MIN THRESHOLD MANTISSA | 44:37 | BUFFER POOL MINIMUM THRESHOLD MANTISSA |
| TMC TQ THESHOLDING CFG [36:3] | 36:3 | IDENTICAL TO TMC TQ THRESHOLDING CFG [36:3] DEFINED IN TABLE 23. |
| PARENT MAX THRESHOLD EXPONENET | 36:32 | PARENT BUFFER POOL MAXIMUM THRESHOLD EXPONENT |
| PARENT MAX THRESHOLD MANTISSA | 31:24 | PARENT BUFFER POOL MAXIMUM THRESHOLD MANTISSA |
| MAX THRESHOLD EXPONENT | 23:19 | BUFFER POOL MAXIMUM THRESHOLD EXPONENT |
| MAX THRESHOLD MANTISSA | 18:11 | BUFFER POOL MAXIMUM THRESHOLD MANTISSA |
| EOM CONTROL | 10:9 | END OF MESSAGE CONTROL |
| DISCARD QID VALID | 8 | DISCARD QUEUE IDENTIFIER VALID |
| DISCARD QID | 7:3 | DISCARD QUEUE IDENTIFIER |
| DISCARD DATA TYPE | 2:0 | DISCARD DATA CONFIGURATION TYPE-A VALUE OF 000B INDICATES THAT THIS IS A TQ THRESHOLDING CFG DISCARD CONFIGURATION. |

| FIELD NAME | BIT POSITION | DESCRIPTION |
|---|---|---|
| LAST AVG SIZE UPDATE TIME | 135:104 | TIME OF PREVIOUS AVERAGE SIZE UPDATES -(T) 32-BIT TIMESTAMP OF LAST AVERAGE SIZE UPDATE. THIS VALUE IS UPDATED BY HARDWARE. |
| AVG SIZE | 103:32 | BUFFER POOL AVERAGE SIZE-(S) EXPONENTIALLY WEIGHTED AVERAGE BUFFER POOL SIZE, STORED IN BYTES OR PACKETS, DEPENDING ON THE STATE OF THE SIZE IN PACKET NOT BYTES BIT. THIS VALUE IS UPDATED BY HARDWARE. |
| SIZE SCALING EXPONENT | 71:68 | SIZE SCALING EXPONENT |
| AVERAGE WEIGHT DENOMINATOR EXPONENT | 67:64 | AVERAGE WEIGHT DENOMINATOR EXPONENT |
| SAMPLING PERIOD EXPONENT | 63:60 | SAMPLING PERIOD EXPONENT |
| VARIABLE SAMPLING PERIOD | 59 | VARIABLE SAMPLING TIME PERIOD |
| UPDATE ON DEQUEUE | 58 | UPDATE BUFFER POOL SIZE ON DEQUEUE |
| BP SIZE | 57:26 | BUFFER POOL INSTANTANEOUS SIZE-(S) BUFFER POOL SIZE, STORED IN BYTES OR PACKETS, DEPENDING ON THE STATE OF THE SIZE IN PACKETS NOT BYTES BIT. THIS VALUE IS UPDATED BY HARDWARE. |
| SIZE ALLOWANCE EXPONENT | 25:21 | BUFFER POOL MINIMUM ALLOWANCE THRESHOLD EXPONENT. |
| SIZE ALLOWANCE MANTISSA | 20:13 | BUFFER POOL MINIMUM ALLOWANCE THRESHOLD MANTISSA. |
| SIZE IN PACKETS NOT BYTES | 12 | SIZE IN PACKETS NOT BYTES |
| PARENT BPID | 11:3 | PARENT BUFFER POOL IDENTIFIER |
| DISCARD DATA TYPE | 2:0 | DISCARD DATA CONFIGURATION TYPE-A VALUE OF 100B INDICATES THAT THIS IS A TMC BP DATA DISCARD CONFIGURATION. |

FIG.11

| WORD OFFSET *603* | FIELD NAME *605* | BIT POSITION *607* | DESCRIPTION *609* |
|---|---|---|---|
| 0 | TYPE (TYPE) | 2:0 | COMMIT ENQUEUE MESSAGE TYPE. SPECIFIED AS FOLLOWS:<br>• B111 = IDLE. THIS IS NOT THE START OF AN ENQUEUE MESSAGE.<br>• B0XX = RESERVED FOR DESCRIPTOR ENQUEUE MESSAGE TYPES.<br>• B100 = COMMIT WITH SUCCESS ENQUEUE MESSAGE.<br>• B101 = COMMIT WITH FAILURE ENQUEUE MESSAGE.<br>• B110 = RESERVED.<br>OTHER TYPE FIELD ENCODINGS ARE RESERVED FOR ENQUEUE MESSAGE TYPES THAT CONTAIN DESCRIPTOR DATA. |
|  |  | 15:3 | SET TO ZERO. RESERVED. |
|  | SOURCE IDENTIFIER (SRCID) | 20:16 | IDENTIFIES THE SOURCE OF THE COMMIT MESSAGE. THIS FIELD IS USED TO ASSOCIATED THIS COMMIT ENQUEUE MESSAGE WITH A PRIOR SPECULATIVE ENQUEUE MESSAGE. |
|  |  | 23:21 | SET TO ZERO. RESERVED. |

*FIG. 13*  *1301*

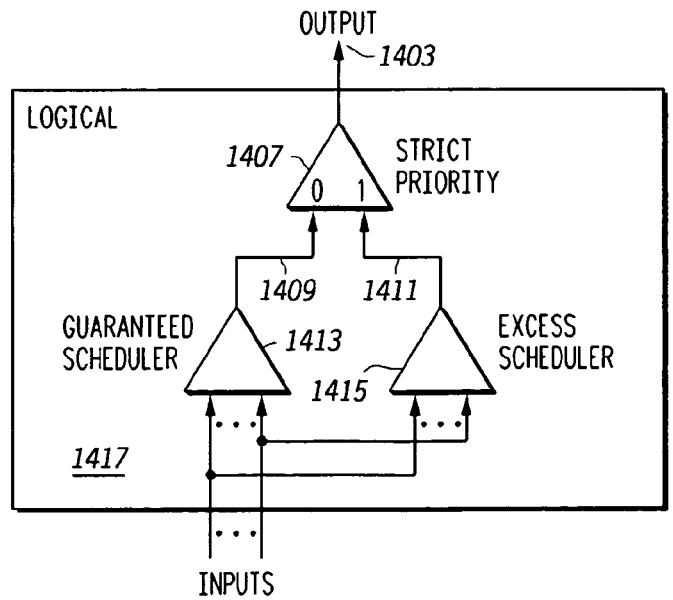

*FIG. 14*  *1401*

| DESCR. SIZE | NUMBER OF DESCR. | TQ | SQ | BUCKET TABLES | DESC. MEM BUS WIDTH + ECC | DESC. MEM DDRSDRAM 133MHz | LINK MEM ZBT | PARAM MEM ZBT | TOTAL CHIPS |
|---|---|---|---|---|---|---|---|---|---|
| 32 | 2M | 256k | 16k | 4096 | 64+8 | (4) 128Mb(x16)<br>(1) 128Mb(x8) | (5) 1Mx18 | (4) 512kx36 | 14 |
| 24 | 2M | 256k | 16k | 4096 | 48+8 | (3) 128Mb(x16)<br>(1) 128Mb(x8) | (5) 1Mx18 | (4) 512kx36 | 13 |
| 16 | 2M | 256k | 16k | 4096 | 16+8 | (2) 128Mb(x16)<br>(1) 128Mb(x8) | (5) 1Mx18 | (4) 512kx36 | 12 |
| 32 | 1.875M | 256k | 16k | 4096 | 64+8 | (4) 128Mb(x16)<br>(1) 128Mb(x8) | (4) 1Mx18 | (4) 512kx36 | 13 |
| 32 | 1.875M | 256k | 16k | 4096 | 64+8 | (4) 128Mb(x16)<br>(1) 128Mb(x8) | (4) 1Mx18 | (4) 512kx36 | 13 |
| 32 | 1.875M | 256k | 16k | 977 | 64+8 | (4) 128Mb(x16)<br>(1) 128Mb(x8) | (4) 1Mx18 | (4) 512kx36 | 13 |
| 32 | 1.375M | 256k | 16k | 977 | 64+8 | (4) 128Mb(x16)<br>(1) 128Mb(x8) | (3) 1Mx18 | (2) 512kx36<br>(2) 512kx36 | 12 |
| 32 | 0.937M | 128k | 8k | 0 | 64+8 | (4) 128Mb(x16)<br>(1) 128Mb(x8) | (2) 1Mx18 | (2) 512kx36 | 9 |
| 32 | 0.468M | 64k | 8k | 0 | 64+8 | (4) 128Mb(x16)<br>(1) 128Mb(x8) | (1) 1Mx18 | (2) 512kx36 | 8 |
| 16 | 0.468M | 64k | 8k | 0 | 32+8 | (2) 128Mb(x16)<br>(1) 128Mb(x8) | (1) 1Mx18 | (2) 256kx36 | 6 |

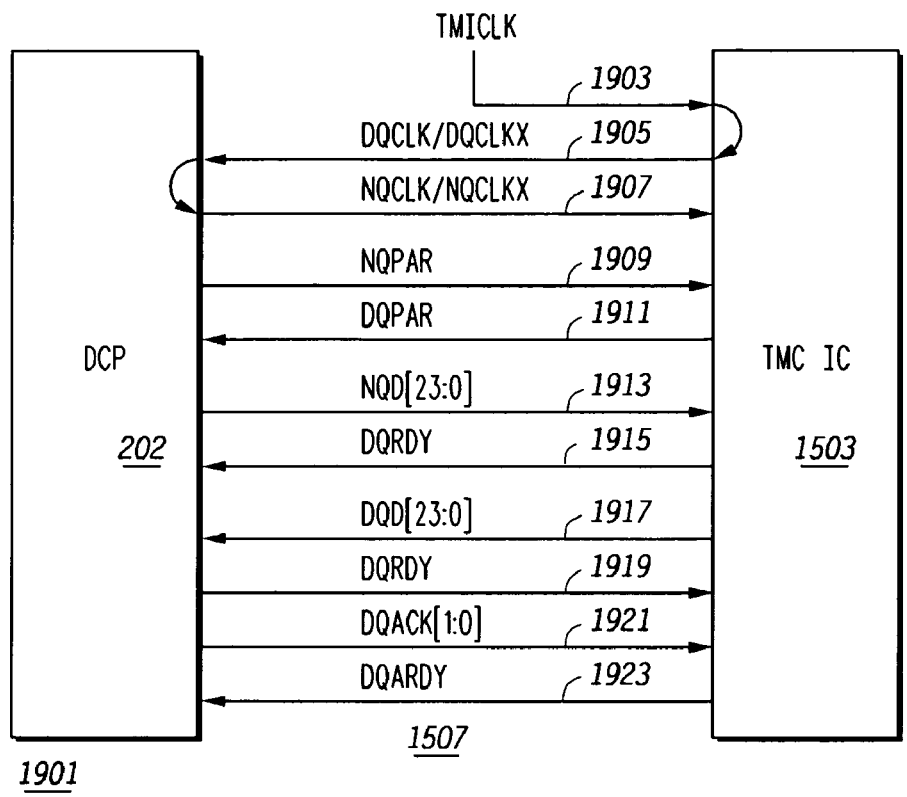

| SIGNAL NAME | I/O | DESCRIPTION |
|---|---|---|
| TMICLK | I | INTERFACE CLOCK SOURCE (UP TO 200 MHz) |
| NQCLK | I | ENQUEUE CLOCK |
| NQCLKX | I | INVERTED ENQUEUE CLOCK. |
| NQD[23:0] | I | ENQUEUE DATA. |
| NQRDY | I | ENQUEUE DATA READY. |
| DQACK[1:0] | I | DEQUEUE ACKNOWLEDGE. |
| NQPAR | I | PARITY COVERING ALL NON-CLOCK INPUTS. |
| DQCLK | O | DEQUEUE CLOCK. |
| DQCLKX | O | INVERTED DEQUEUE CLOCK. |
| DQD[23:0] | O | DEQUEUE DATA. |
| NQRDY | O | ENQUEUE DATA READY. |
| DQARDY | O | DEQUEUE ACKNOWLEDGE READY. |
| DQPAR | O | PARITY COVERING ALL NON-CLOCK OUTPUTS. |

| FIELD NAME | BIT POSITION | DESCRIPTION | |
|---|---|---|---|
| LEVEL | 31:30 | LEVEL-DEQUEUE SCHEDULER LEVEL. VALID RANGE IS 0-3. SCHEDULERS SHOULD BE CONFIGURED IN INCREASING ORDER BY LEVEL. | 2303 |
| RESERVED | 29:28 | READ AS ZERO. | |
| BASE INPUT OFFSET | 27:16 | BASE INPUT OFFSET-BASE INPUT OFFSET FOR THE SCHEDULER WITHIN ITS SPECIFIED LEVEL. VALID INPUT OFFSET RANGES PER LEVEL ARE AS FOLLOWS:<br>• LEVEL 0:0 (ONLY ONE SCHEDULER IN LEVEL 0).<br>• LEVEL 1:0-252.<br>• LEVEL 2:0-1020.<br>• LEVEL 3:0-4092.<br>A SCHEDULER IS ALLOCATED ALL INPUT OFFSETS BETWEEN ITS BASE INPUT OFFSET AND ITS BASE INPUT OFFSET PLUS ITS NUMBER OF INPUTS MINUS ONE. AN INPUT OFFSET CAN BE ALLOCATED TO NO MORE THAN ONE SCHEDULER. THE BASE INPUT OFFSET MUST BE A MULTIPLE OF 4 AND THE INPUTS OF A SCHEDULER MUST NOT CROSS A MULTIPLE OF 32 INPUT BOUNDARY. FOR EXAMPLE, A 24 INPUT SCHEDULER CAN BE POSITIONED AT BASE INPUT OFFSETS 12 THROUGH 28.<br>THE BASE INPUT OFFSET OF A GE_WFQ SCHEDULER TYPE (AS SPECIFIED BY THE TYPE FIELD OF THE SCHEDULER INITIALIZATION 1 REGISTER) IS FURTHER RESTRICTED TO BE A MULTIPLE OF 8. | 2305 |
| PARENT LEVEL | 15:14 | PARENT LEVEL-THE OUTPUTS OF A SCHEDULER IN LEVEL 1-3, CONNECTS TO A PARENT SCHEDULER INPUT OF A LOWER NUMBERED LEVEL. THIS FIELD SPECIFIES THE PARENT SCHEDULER LEVEL AND MUST BE LESS THAN OR EQUAL TO THE SPECIFIED SCHEDULER'S LEVEL. THIS FIELD IS NOT USED WHEN INITIALIZING THE LEVEL 0 SCHEDULER. | 2307 |
| PARENT BASE INPUT OFFSET D4 | 13:6 | PARENT BASE INPUT OFFSET DIVIDED BY 4-THIS FIELD SPECIFIES THE PARENT SCHEDULER'S BASE INPUT OFFSET DIVIDED BY 4. THIS FIELD IS UNUSED WHEN INITIALIZING THE LEVEL 0 SCHEDULER. VALID RANGES FOR THIS FIELD PER PARENT LEVEL ARE AS FOLLOWS:<br>• PARENT LEVEL 0: (UNUSED)<br>• PARENT LEVEL 1:0-252/4<br>• PARENT LEVEL 2:0-1020/4 | 2309 |
| PARENT INPUT NUMBER | 5:0 | PARENT INPUT NUMBER-THIS FIELD SPECIFIES THE PARENT SCHEDULER INPUT NUMBER. THIS FIELD IS UNUSED WHEN INITIALIZING THE LEVEL 0 SCHEDULER. | 2311 |

| FIELD NAME | BIT POSITION | DESCRIPTION |
|---|---|---|
| RESERVED | 31 | READ AS ZERO. |
| BS EXPONENT | 30:26 | BYTE SERVICE INTERVAL EXPONENT-USED ONLY FOR SCHEDULER TYPES THAT USED WEIGHTED FAIR QUEUEING. SPECIFIES THE EXPONENT OF THE FLOATING POINT REPRESENTATION FOR THE WEIGHTED FAIR QUEUEING SCHEDULER INPUT'S BYTE SERVICE INTERVAL. VALID RANGE IS 0-22. |
| BSI MANTISSA | 25:18 | BYTE SERVICE INTERNAL MANTISSA-USED ONLY FOR SCHEDULER TYPES THAT USE WEIGHTED FAIR QUEUEING. SPECIFIES THE MANTISSA, EXCLUDING AN IMPLIED LEADING ONE OF THE FLOATING POINT REPRESENTATION FOR THE WEIGHTED FAIR QUEUEING SCHEDULER INPUT'S BYTE SERVICE INTERVAL. VALID RANGE IS 0-255. A WEIGHTED FAIR QUEUEING SCHEDULER'S BYTE SERVICE INTERVAL IS CALCULATED USING THE FOLLOWING EQUATION: BSI = (256 + BSI MANTISSA) << BSI EXPONENT THE UNITS OF THE BYTE SERVICE INTERVAL ARE BYTES PER 1/1024TH OF A VIRTUAL TIME UNIT. FOR A WORK-CONSERVING WEIGHTED FAIR QUEUEING SCHEDULER, THE RECIPROCAL OF THE SUM OF THE RECIPROCALS OF ALL INPUT BYTE SERVICE INTERVALS MUST BE LESS THAN OR EQUAL TO ONE VIRTUAL TIME UNIT. THE FRACTION OF THE SCHEDULER'S OUTPUT BANDWIDTH THAT AN INPUT RECEIVES IS CALCULATED USING THE FOLLOWING EQUATION: FRACTION = (1/BSI)/(SUM OF ALL INPUT BSI RECIPROCALS) FOR A NON-WORK CONSERVING WEIGHTED FAIR QUEUEING SCHEDULER, ONE VIRTUAL TIME UNIT IS EQUAL TO 1/1024TH OF AN SCLK PERIOD. THE SUM OF THE INPUTS MAXIMUM RATES SHOULD NOT EXCEED THE TOTAL SERVICE RATE OF THE SCHEDULER OUTPUT. THE MAXIMUM RATE, IN BIT PER SECOND, OF AN INPUT IS CALCULATED USING THE FOLLOWING EQUATION: RATE (BPS) = 8 * (1/BSI)/(SCLK_PERIOD/1024) FOR EAXAMPLE, FOR AN SCLK PERIOD OF 7.5 ns, THE SMALLEST RATE IS ACHIEVED BY SETTING THE BSI EXPONENT TO 22 AND THE BSI MANTISSA TO 255, YIELDING A RATE OF 509.6 BPS, AND THE LARGEST RATE IS ARCHIEVED BY SETTING THE BSI EXPONENT AND BSI MANTISSA TO 0, YIELDING A RATE OF 4.267 GBPS. |
| LEVEL | 17:16 | LEVEL-THIS FIELD SPECIFIES THE LEVEL OF THE DEQUEUE SCHEDULING HIERARCHY IN WHICH THIS SCHEDULER INPUT RESIDES. |
| BASE INPUT OFFSET D4 | 15:6 | BASE INPUT OFFSET DIVIDEED BY 4-THIS FIELD SPECIFIES THE BASE INPUT OFFSET DIVIDED BY 4, OF THE SCHEDULER. THIS FIELD IS UNUSED WHEN INITIALIZING A LEVEL 0 SCHEDULER INPUT. VALID RANGES FOR THIS FIELD PER LEVEL ARE AS FOLLOWS:<br>• LEVEL 0: (UNUSED)<br>• LEVEL 1: 0-252/4<br>• LEVEL 2: 0-1020/4<br>• LEVEL 3: 0-4092/4 |
| INPUT NUMBER | 5:0 | INPUT NUMBER-SPECIFIES THE NUMBER OF THE SCHEDULER INPUT. |

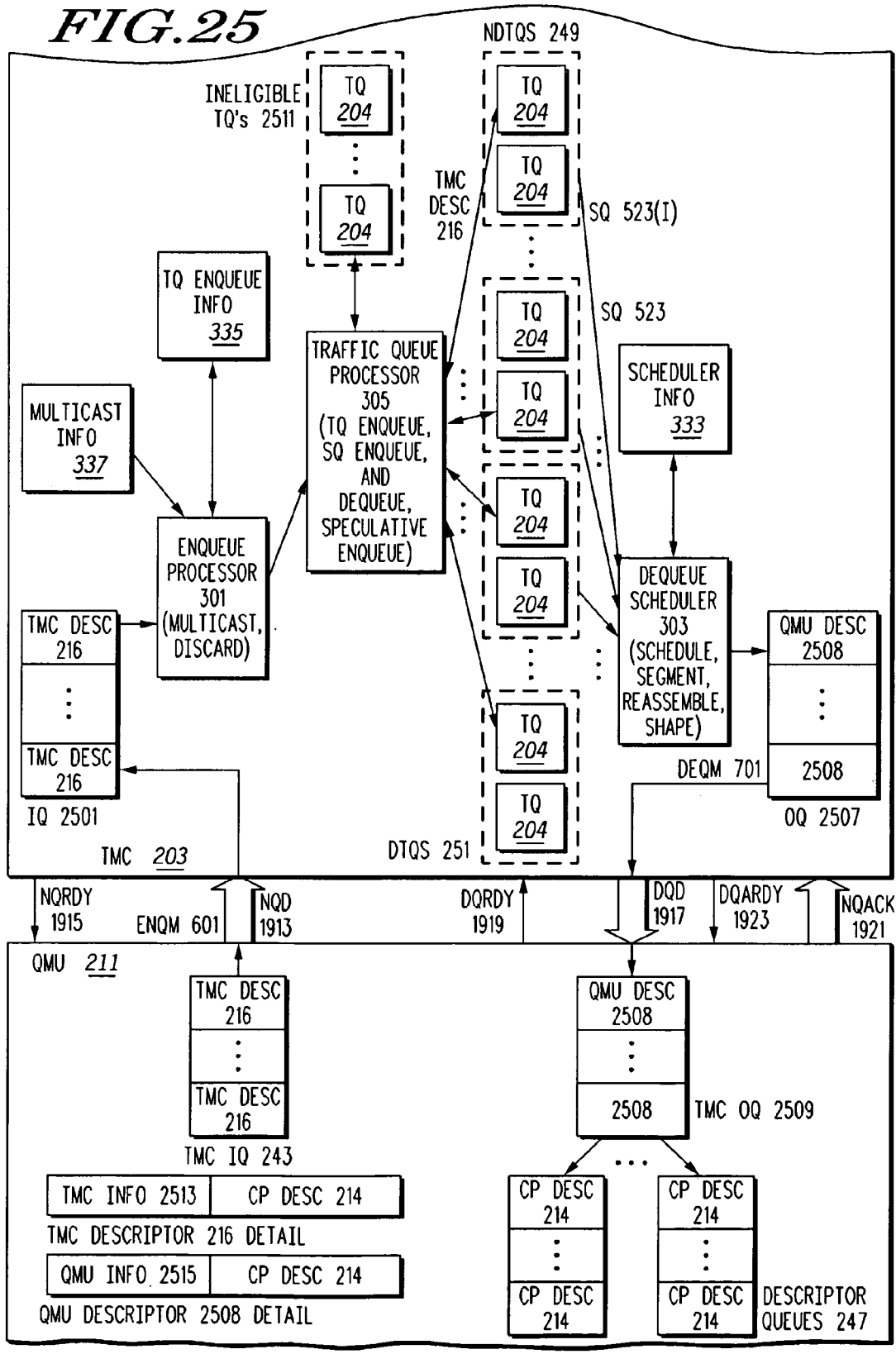

| FIELD NAME | BIT POSITION | DESCRIPTION | |
|---|---|---|---|
| MAX CREDIT | 32:27 | MAXIMUM CREDIT-MAXIMUM NUMBER OF DESCRIPTORS, DESTINED FOR THE SPECIFIED VIRTUAL OUTPUT PORT, THAT CAN BE DEQUEUE AND PENDING DEQUEUE ACKNOWLED (i.e. THE MAXIMUM DESCRIPTOR STORAGE SIZE FOR THE CORRESPONDING VIRTUAL OUTPUT PORT FIFO IN THE C-5 DCP) | 2701 |
| RESERVED | 26:25 | READ AS ZERO. | |
| VOPID | 24:16 | VIRTUAL OUTPUT PORT IDENTIFIER-VALID RANGE IS 0..511. A VIRTUAL OUTPUT PORT IS USED TO FLOW CONTROL A DEQUEUE SCHEDULER INPUT. NOTE THAT A VIRTUAL OUTPUT PORT SHOULD BE CONFIGURED AFTER ITS ASSOCIATED SCHEDULER INPUT HAS BEEN CONFIGURED. EXACTLY ONE SCHEDULER INPUT IN EACH PATH THROUGH THE SCHEDULER HIERARCHY MUST BE FLOW-CONTROLLED BY A VIRTUAL OUTPUT PORT. | 2703 |
| LEVEL | 15:14 | LEVEL-THIS FIELD SPECIFIES THE DEQUEUE SCHEDULING HIERARCHY LEVEL OF THE SCHEDULER INPUT TO BE FLOW-CONTROLLED BY THIS VIRTUAL OUTPUT PORT. VALID RANGE IS 0-2. LEVEL 3 SCHEDULER INPUTS CANNOT BE FLOW-CONTROLLED BY VIRTUAL OUTPUT PORTS. | 2707 |
| BASE INPUT OFFSET D4 | 13:6 | BASE INPUT OFFSET DIVIDE BY 4-THIS FIELD SPECIFIES THE BASE INPUT OFFSET, DIVIDE BY 4, OF THE SCHEDULER WHOSE INPUT WILL BE FLOW-CONTROLLED BY THIS VIRTUAL OUTPUT PORT. THIS FIELD IS UNUSED WHEN INITIALIZING A VIRTUAL OUTPUT PORT THAT CONTROLS A LEVEL 0 SCHEDULER INPUT. VALID RANGES FOR THIS FIELD PER LEVEL ARE A FOLLOWS:<br>• LEVEL 0 (UNUSED)<br>• LEVEL 1:0-252/4<br>• LEVEL 2:0-1020/4 | 2709 |
| INPUT NUMBER | 5:0 | INPUT NUMBER-SPECIFIES THE NUMBER OF THE SCHEDULER INPUT TO BE FLOW-CONTROLLED BY THIS VIRTUAL OUTPUT PORT. | 2711 |

521(1)

VOP LOCATION INFO 2705

FIG.27

| WORD OFFSET 603 | FIELD NAME 605 | BIT POSITION 607 | DESCRIPTION 609 |
|---|---|---|---|
| 0 | START WHEN LOW (STARTX) | 0 | INDICATOR SET LOW TO IDENTIFY THE FIRST WORD OF A DEQUEUE ACKNOWLEDGE MESSAGE. |
| | VIRTUAL OUTPUT PORT IDENTIFIER BIT 0 (VODID[0]) | 1 | THE LEAST SIGNIFICANT BIT OF THE VIRTUAL OUTPUT PORT IDENTIFIER. |
| 1 | VIRTUAL OUTPUT PORT IDENTIFIER BITS 2 AND 1 (VODID[2:1]) | 1:0 | BITS 2 AND 1 OF THE VIRTUAL OUTPUT PORT IDENTIFIER. |
| 2 | VIRTUAL OUTPUT PORT IDENTIFIER BITS 4 AND 3 (VODID[4:3]) | 1:0 | BITS 4 AND 3 OF THE VIRTUAL OUTPUT PORT IDENTIFIER. |
| 3 | VIRTUAL OUTPUT PORT IDENTIFIER BITS 6 AND 5 (VODID[6:5]) | 1:0 | BITS 6 AND 5 OF THE VIRTUAL OUTPUT PORT IDENTIFIER. |
| 4 | VIRTUAL OUTPUT PORT IDENTIFIER BITS 8 AND 7 (VODID[8:7]) | 1:0 | BITS 8 AND 7 OF THE VIRTUAL OUTPUT PORT IDENTIFIER. |

| FIELD NAME | BIT POSITION | DESCRIPTION | |
|---|---|---|---|
| DISCARD DQID | 35:31 | DESTINATION BASED DISCARD TQ ID. | 2903 |
| GROUP SCHEDULER TYPE | 30 | SCHEDULER IS OPERATING IN GROUPED MODE, TQ MUST SAVE PER TQ SCHEDULER STATE. | 2905 |
| SCHEDULER TYPE | 29:27 | 3 BIT SCHEDULER TYPE = 111 FOR FBDRR SCHEDULERS, ALL OTHER VALUES INDICATES NON-FBDRR. | 2907 |
| DUAL SHARPER | 26 | WHEN ONE INDICATES ALL INPUT TO SCHEDULER ARE OPERATING IN DUAL SHAPING MODE. | 2909 |
| TYPE | 25:24 | 2 BIT TRAFFIC QUEUE TYPE SPECIFIES AS FOLLOWS:<br>• 00 = VARIABLE LENGTH TRAFFIC QUEUE.<br>• 01 = FIXED LENGTH TRAFFIC QUEUE.<br>• 10 = SEGMENTING TRAFFIC QUEUE.<br>• 11 = REASSEMBLING TRAFFIC QUEUE. | 2911 |
| SEGMENT SIZE | 23:16 | INDICATES THE SEGMENT SIZE FOR ALL TRAFFIC QUEUE TYPES EXCEPT VARIABLE LENGTH. FOR VARIABLE LENGTH TRAFFIC QUEUES, THIS IS A DON'T CARE. | 2913 |
| PAYLOAD SIZE | 15:8 | FOR SEGMENTING TRAFFIC QUEUES, THIS INDICATES THE NUMBER OF BYTES SERVED BY EACH OUTPUTED PACKET. | 2915 |
| OVERHEAD SIZE | 7:0 | AN OPTIONAL CONSTANT TO BE ADDED TO THE LENGTH OF ANY PASSED IN PACKET. USUALLY ZERO EXCEPT WHEN SEGMENTING. | 2917 |

| FIELD NAME | BIT POSITION | DESCRIPTION |
|---|---|---|
| TYPE | 33:32 | 00 INDICATES FIXED ALGORITHM |
|  | 31:5 | UNUSED |
| INPUT | 4:0 | INPUT NUMBER ON 12C |

*FIG.30*

| WORD OFFSET | FIELD NAME | BIT POSITION | DESCRIPTION |
|---|---|---|---|
| 2-12 | DESCRIPTOR (DESC) | 23:0 | DESCRIPTOR DATA. THE NUMBER OF 24-BIT WORDS REQUIRED FOR DESCRIPTOR DATA IS VARIABLE DEPENDING ON THE CONFIGURED DESCRIPTOR SIZE, AS FOLLOWS:<br>1. 12 BYTE DESCRIPTORS REQUIRE 4 WORDS.<br>2. 16 BYTE DESCRIPTORS REQUIRE 6 WORDS. THE LAST BYTE OF THE DESCRIPTOR IS CONTAINED IN BITS 23:16 OF THE LAST WORD.<br>3. 24 BYTE DESCRIPTORS REQUIRE 8 WORDS.<br>4. 32 BYTE DESCRIPTORS REQUIRE 11 WORDS. THE LAST TWO BYTES OF THE DESCRIPTOR ARE CONTAINED IN BITS 23:8 OF THE LAST WORD. |

*FIG.31*

| WORD OFFSET | FIELD NAME | BIT POSITION | DESCRIPTION | |
|---|---|---|---|---|
| 0 | VIRTUAL QUEUE (VIRTUALQ) | 15 | INDICATES THAT THE ASSOCIATED VIRTUAL OUTPUT PORT IS A MEMBER OF A GROUP OF VIRTUAL OUTPUT PORTS THAT REPRESENT A DCP VIRTUAL QUEUE. THE DCP ASSIGNS SEQUENCE NUMBERS TO DESCRIPTORS DESTINED FOR A VIRTUAL QUEUE. | 711 |
| | MULTICAST REPLICATION IDENTIFIER (MCASTREPID) | 23:16 | IDENTIFIER USED TO DISTINGUISH BETWEEN MULTIPLE MULTICAST DESTINATIONS WITHIN A SINGLE MULTICAST GROUP WITH TARGET THE SAME VIRTUAL OUTPUT PORT. 8 BITS SUPPORTS UP TO 256 MULTICAST REPLICATIONS PER VIRTUAL OUTPUT PORT MULTICAST GROUP. | 713 |
| 1 | PACKET BYTE REMAINDER (PKTBYTE REMAINDER) | 15:0 | PACKET BYTE REMAINDER USED FOR PACKET SEGMENTATION. USED TO SPECIFY HOW MANY BYTES ARE REMAINING IN THE PACKET BEING SEGMENTED. | 715 |
| | DISCARD PRIORITY (DISCARD PRIORITY) | 16 | IDENTIFIES ONE OF THE TWO DISCARD PRIORITIES, DETERMINED, AT THE TIME OF ENQUEUE, BY THE TRAFFIC QUEUE'S CONFIGURED DISCARD ALGORITHM. A VALUE OF ZERO USUALLY MEANS THAT THE PACKET IS LESS LIKELY TO BE DISCARDED. THIS FIELD IS COMMONLY USED TO REPRESENT ATM CELL LOSS PRIOTRITY (CLP). | 717 |
| | CONGESTION INDICATOR(CI) | 17 | INDICATOR SET HIGH TO INDICATE THAT THE TRAFFIC QUEUE IS IN A CONGESTED STATE, DETERMINED, AT THE TIME OF ENQUEUE, BY THE TRAFFIC QUEUE'S CONFIGURED DISCARD ALGORITHM. THIS FIELD IS COMMONLY USED TO REPRESENT THE ATM CELL HEADER EXPLICIT FORWARD CONGESTION INDICATOR (EFCI) BIT. | 719 |
| | | 20:18 | SET TO ZERO. RESERVED | 721 |

| WORD OFFSET | FIELD NAME | BIT POSITION | DESCRIPTION |
|---|---|---|---|
| 1 | DISCARD REASON (DISCARD REASON) | 23:21 | DISCARD REASON. SPECIFIED AS FOLLOWS:<br>• B000 = NO DISCARD REASON. THIS DESCRIPTOR IS NOT MARKET FOR DISCARD.<br>• B001 = DISCARDED WITH REASON ALREADY SPECIFIED BY THE TYPE FIELD.<br>• B010 = POLICING VIOLATION OF THE FIRST LEAKY BUCKET PARAMETER SET.<br>• B100 = BUFFER POOL MAXIMUM THRESHOLD EXCEEDED.<br>• B101 = PARENT BUFFER POOL MAXIMUM THRESHOLD EXCEEDED.<br>• B110 = RANDOM EARLY DETECTION (RED) BUFFER POOL DISCARD.<br>• B111 = EARLY OR PARTIAL PACKET DISCARD (EPD/PPD) CONTINUATION FOLLOWING THE DISCARD OF A PREVIOUS MESSAGE BELONGING TO THE SAME PACKET. |
| 2-12 | DESCRIPTOR (DESC) | 23:0 | DESCRIPTOR DATA. THE NUMBER OF 24-BIT WORDS REQUIRED FOR DESCRIPTOR DATA IS VARIABLE DEPENDING ON THE CONFIGURED DESCRIPTOR SIZE, AS FOLLOWS:<br>1. 12 BYTE DESCRIPTORS REQUIRE 4 WORDS.<br>2. 16 BYTE DESCRIPTORS REQUIRE 6 WORDS. THE LAST BYTE OF THE DESCRIPTOR IS CONTAINED IN BITS 23:16 OF THE LAST WORD.<br>3. 24 BYTE DESCRIPTORS REQUIRE 8 WORDS.<br>4. 32 BYTE DESCRIPTORS REQUIRE 11 WORDS. THE LAST TWO BYTES OF THE DESCRIPTOR ARE CONTAINED IN BITS 23:8 OF THE LAST WORD. |

*FIG.33*

| WORD OFFSET | FIELD | BIT POSITION | DESCRIPTION | |
|---|---|---|---|---|
| 1 | POLICING TIMESTAMP 1 (POLCE1) | 31:0 | TIME STAMP USED WITH THE FIRST LEAKY BUCKET FOR RATE POLICING. THE HOST SHOULD INITIALIZE THIS FIELD TO 0. | 815 |
| | POLICING TIMESTAMP 2 (POLICE2) | 63:32 | TIME STAMP USED WITH THE SECOND LEAKY BUCKET FOR RATE POLICING. THE HOST SHOULD INITIALIZE THIS FIELD TO 0. | 816 |
| | DISCARD CONFIGURATION IDENTIFIER (DISCARDCFGID) BITS 10:5 | 69:64 | HIGH 6 BITS OF THE 11-BIT IDENTIFIER FOR THE DISCARD CONFIGURATION USED BY THIS TRAFFIC QUEUE. | 814 |
| | DISCARD QUEUE SELECT MODE (DISCARDQSEL) | 70 | A 1 IN THIS FIELD INDICATES THAT THE DISCARD QUEUE USED FOR THIS TRAFFIC QUEUE IS THE DISCARD IDENTIFIER IN THE I2C CONFIGURATION BLOCK POINTED TO BY THE I2CID FIELD IN THIS TRAFFIC QUEUE PARAMETER BLOCK. IF THIS BIT IS ZERO, THE DISCARD QUEUE USED FOR THIS TRAFFIC QUEUE IS THE DISCARD IDENTIFIER ASSOCIATED WITH THE ENQUEUE SOURCE, WHICH IS SET PER SOURCE IN THE ENQUEUE SOURCE DISCARD QUEUE INITIALIZATION REGISTER, DESCRIBED IN THE HOST INTERFACE CHAPTER. | 871 |
| | ODD PARITY-WORD 1 | 71 | ODD PARITY ON BITS 70:0 OF WORD 1. | |
| 2 | SCHEDULER SIZE | 31:0 | 32 BIT HELD USED BY HARDWARE TO KEEP TRACK OF SCHEDULER STATE ON A PER TQ BASIS. THE HOST SHOULD INITIALIZE THIS FIELD TO 0. | 845 |
| | HEAD DESCRIPTOR IDENTIFIER (HEADDESCID) | 52:32 | DESCRIPTOR IDENTIFIER OF THE FIRST DESCRIPTOR IN THE TRAFFIC QUEUE'S LINKED LIST OF DESCRIPTORS. | 823 |
| | INFORMATION FIELD (INFOFIELD) | 68:53 | A 16 BIT THAT CONTAINS INFORMATION ABOUT THE DESCRIPTOR AT THE HEAD OF THE TRAFFIC QUEUE. THE HOST SHOULD INITIALIZE THIS FIELD TO 0. THE HARDWARE SETS THIS FIELD WHEN TRAFFIC IS ENQUEUED TRAFFIC TO THIS TQ. | 836 |
| | EMPTY | 69 | THE HOST SHOULD INITIALIZE THIS FIELD TO 1. | |
| | MCAST INDICATOR | 70 | MCAST TABLE INDICATOR. FOR A TQ PARMS BLOCK THIS FIELD MUST BE 0. | 857 |
| | ODD PARITY-WORD 2 | 71 | ODD PARITY ON BITS 70:0 OF WORD 2. | |

*FIG.34*

| WORD OFFSET | FIELD | BIT POSITION | DESCRIPTION |
|---|---|---|---|
| | | 7 | SET TO ZERO. RESERVED. |
| | TRAFFIC QUEUE IDENTIFIER 1 VALID (TQIDVALID1) | 8 | VALID INDICATOR FOR TRAFFIC QUEUE IDENTIFIER 1. |
| | TQID2 | 26:9 | TRAFFIC QUEUE IDENTIFIER 2. |
| | | 27 | SET TO ZERO. RESERVED. |
| | TQIDVALID2 | 28 | TRAFFIC QUEUE IDENTIFIER 2 VALID. |
| | TQID3 | 46:29 | TRAFFIC QUEUE IDENTIFIER 3. |
| | | 47 | SET TO ZERO. RESERVED. |
| | TQIDVALID3 | 48 | TRAFFIC QUEUE IDENTIFIER 3 VALID. |
| | TQID4 | 66:49 | TRAFFIC QUEUE IDENTIFIER 4. |
| | | 67 | SET TO ZERO. RESERVED. |
| | TQIDVALID4 | 68 | TRAFFIC QUEUE IDENTIFIER 4 VALID. |
| | TQID5[1:0] | 70:69 | TRAFFIC QUEUE IDENTIFIER 5 BITS 1:0. |
| | ODD PARITY (ODDPARITY) | 71 | ODD PARITY ON BITS 70:0. |
| 2 | TQID5[17:2] | 15:0 | TRAFFIC QUEUE IDENTIFIER 5 BITS 17:2. |
| | | 16 | SET TO ZERO. RESERVED. |
| | TQIDVALID5 | 17 | TRAFFIC QUEUE IDENTIFIER 5 VALID. |
| | | 35:18 | TRAFFIC QUEUE IDENTIFIER 6. |
| | TQID6 | 36 | SET TO ZERO. RESERVED. |
| | TQIDVALID6 | 37 | TRAFFIC QUEUE IDENTIFIER 6 VALID. |
| | TQID7 | 55:38 | TRAFFIC QUEUE IDENTIFIER 7. |
| | | 56 | SET TO ZERO. RESERVED. |
| | TQIDVALID7 | 57 | TRAFFIC QUEUE IDENTIFIER 7 VALID. |
| | | 70:58 | SET TO ZERO. RESERVED. |
| | ODD PARITY (ODDPARITY) | 71 | ODD PARITY ON BITS 70:0. |

| FIELD NAME | BIT POSITION | DESCRIPTION |
|---|---|---|
| TYPE | 26:24 | TYPE-VALID VALUES FOR THE SCHEDULER TYPE ARE AS FOLLOWS:<br>• B000 = STRICT PRIORITY (SP)<br>• B001 = ROUND-ROBIN (RR)<br>• B010 = WORK CONSERVING WEIGHTED FAIR QUEUEING (WFQ)<br>• B011 = NON-WORK CONSERVING WEIGHTED FAIR QUEUEING (N-WFQ)<br>• B100 = GUARANTEED N-WFQ, EXCESS SP (GE-SP)<br>• B101 = GUARANTEED N-WFQ, EXCESS RR (GE-RR)<br>• B110 = GUARANTEED N-WFQ, EXCESS WFQ (GE-WFQ)<br>• B111 = FRAME-BASED DEFICIT ROUND-ROBIN (FB-DRR). ONLY VALID FOR A LEVEL 3 SCHEDULER. |
| RESERVED | 23:18 | READ AS ZERO. |
| STRICT PRIORITY INPUTS | 17:16 | STRICT PRIORITY INPUTS-SCHEDULERS OF TYPES RR, WFQ, GE-RR, AND GE-WFQ CAN BE MODIFIED TO SCHEDULE BETWEEN ZERO AND THREE OF THE LOWEST NUMBERED INPUTS IN A STRICT PRIORITY MANNER OVER THE OTHER SCHEDULER INPUTS. IN A GE-RR OR GE-WFQ SCHEDULER, THIS FIELD MODIFIES THE BEHAVIOR OF THE EXCESS SCHEDULER ONLY. THIS FIELD SPECIFIES HOW MANY OF THE LOWEST NUMBERED SCHEDULER INPUTS WILL BE GIVEN STRICT PRIORITY OVER ALL OTHER INPUTS. OF THESE STRICT PRIORITY INPUTS PRIORITY IS GIVEN TO THE INPUT WITH THE LOWER NUMBER. |
| RESERVED | 15:9 | READ AS ZERO. |
| GROUPED | 8 | GROUPED-THIS FIELD IS ONLY VALID FOR A LEVEL 3 SCHEDULER OF ONE OF THE FOLLOWING TYPES:WFQ, N-WFQ, GE-SP, GE-RR, AND GE-WFQ. WHEN SET TO ONE, THIS FIELD SPECIFIES THAT A "GROUPED" WEIGHTED FAIR QUEUEING ALGORITHM BE USED. GROUPED WFQ IS ONLY VALID FOR FIXED LENGTH PACKET TRAFFIC. |
| RESERVED | 8 | READ AS ZERO. |
| INPUTS | 5:0 | INPUTS-NUMBER OF INPUTS ALLOCATED TO THE SPECIFIED SCHEDULER. THIS FIELD IS NOT USED WHEN INITIALIZING THE LEVEL 0 SCHEDULER, WHICH SUPPORTS UP TO 64 INPUTS. IN GENERAL, THE NUMBER OF INPUTS FOR SCHEDULERS IN LEVELS 1-3 CAN BE ANY MULTIPLE OF 4 UP TO A MAXIMUM OF 32 INPUTS. THE ACTUAL MAXIMUM NUMBER OF INPUTS IS FURTHER RESTRICTED FOR CERTAIN SCHEDULER TYPES. SCHEDULERS THAT REQUIREA NON-MULTIPLE OF 4 INPUTS MUST ALLOCATE A MULTIPLE OF 4 INPUTS AND LEAVE SOME OF THE INPUTS UNUSED. LEVEL 3 FB-DRR SCHEDULERS REQUIRE EXACTLY 4 INPUTS.<br>A GE-WFQ SCHEDULER IN LEVELS 1-3 REQUIRES TWICE AS MUCH STORAGE PER INPUT. FOR A GE-WFQ SCHEDULER IN LEVELS 1-3, SET THIS FIELD TO BE THE DESIRED NUMBER OF INPUTS, BUT TREAT THE SCHEDULER AS IF TWICE AS MANY INPUTS HAVE BEEN ALLOCATED. FOR EXAMPLE, A GE-WFQ SCHEDULER IN LEVEL 2 WITH 12 INPUTS UTILIZES 24 INPUT OFFSETS, RESTRICTING ITS BASE INPUT OFFSET TO OFFSETS 0, 4, OR 8. ALSO NOTE THAT THE MAXIMUM NUMBER OF INPUTS FOR A GE-WFQ SCHEDULER IN LEVELS 1-3 IS 16. |

| FIELD NAME | BIT POSITION | DESCRIPTION |
|---|---|---|
| RESERVED | 31:3 | READ AS ZERO. |
| GUARANTEED EXCESS SELECT | 27:16 | GUARANTEED EXCESS SELECT-IN GUARANTEED/EXCESS SCHEDULERS, EACH SCHEDULER INPUT FEELS INTO BOTH A GUARANTEED AND AN EXCESS SUB-SCHEDULER. THIS FIELD SPECIFIES WHICH SUB-SCHEDULER'S INPUT IS BEING INITIALIZED AND WHETHER OR NOT THE SUB-SCHEDULER INPUT IS CONNECTED. THE VALID VALUES FOR THIS FIELD ARE AS FOLLOWS:<br>• B000 = NOT A GUARANTEED/EXCESS SCHEDULER INPUT.<br>• B100 = SELECT THE GUARANTEED SUB-SCHEDULER INPUT.<br>• B101 = DISCONNECT INPUT FROM GUARANTEED SUB-SCHEDULER.<br>• B110 = SELECT EXCESS SUB-SCHEDULER INPUT.<br>• B111 = DISCONNECT INPUT FROM EXCESS SUB-SCHEDULER.<br>NOTE THAT TWO SCHEDULER INPUT INITIALIZATION OPERATIONS ARE REQUIRED FOR EACH GUARANTEED/EXCESS SCHEDULER INPUT, ONE FOR THE GUARANTEED SUB-SCHEDULER AND ONE FOR THE EXCESS SUB-SCHEDULER. |

FIG.37

| FIELD NAME | BIT POSITION | DESCRIPTION |
|---|---|---|
| TYPE | 33:32 | 01 INDICATES DUAL SHAPING ALGORITHM. |
| BURST_SIZE | 31:18 | LEAKY BUCKET BURST SIZE IN 14 BIT FLOATING POINT, 5 BIT EXPONENT, 9 BIT MANTISSA. |
| SUSTAINED_RATE | 17:5 | LEAKY BUCKET PERIOD IN 13 BIT FLOATING POINT, 4 BIT EXPONENT, 8 BIT MANTISSA. |
| INPUT | 4:0 | INPUT NUMBER ON 12C (MUST BE AN EVEN NUMBER) |

*FIG. 40*

| FIELD NAME | BIT POSITION | DESCRIPTION |
|---|---|---|
| TYPE | 33:32 | 10 INDICATES FIXED ALGORITHM |
| MIN QUANTUM | 31:18 | 14 BIT MIN QUANTUM |
| QUANTUM | 17:0 | 18 BIT QUANTUM |

*FIG. 41*

MANIPULATING DATA STREAMS IN DATA STREAM PROCESSORS

CROSS-REFERENCE TO RELATED APPLICATIONS

This patent application is a divisional of U.S. patent application Ser. No. 10/475,066, filed Jul. 26, 2004, which is a National Stage of PCT/US02/11509, filed Apr. 11, 2002. This patent application claims priority from U.S. Provisional Patent Application 60/283,746, filed Apr. 13, 2001.

BACKGROUND

1. Field of the Invention

The invention relates generally to the processing of streams of digital data in devices such as packet switches and routers and more specifically to processing such as multicasting packets to a number of streams, discarding packets in a stream, and scheduling, including shaping output streams and segmenting or reassembling them.

2. Description of Related Art: FIG. 1

Packets and Protocols

Communication among digital systems is generally by means of packets. A packet is shown at 113 in FIG. 1. A packet is simply a sequence of bits whose meaning is determined by a protocol. The protocol defines how the digital devices which process the packet are to interpret the bits in the packet. Regardless of protocol, most packets have a header 115, which indicates how that particular packet is to be processed according to the protocol, and a payload 117, which is the actual information being communicated by the packet. A packet may also have a trailer 119, which may simply indicate the end of the packet, but may also contain information which permits detection and/or correction of errors that have occurred during transmission or processing of the packet. Depending on the protocol which defines it, a packet may have a fixed length or a varying length. In the following discussion, the contents of the header 115 and trailer 119 will be termed protocol data, since the manner in which these contents are interpreted is determined completely by the protocol, and the contents of payload 117 will be termed payload data. Packets for certain protocols are often termed frames or cells.

Packets are used for communication in digital systems at many different levels. Thus, the payload of a group of packets at one level of the digital system may be a packet at a higher level. That is shown at 137 in FIG. 1. IP packet 121 is a packet which is interpreted according to the IP protocol. IP packets 121 have an IP header 123 and a varying-length IP payload 125. Included in the information in IP header 123 is the length of IP payload 125. When IP packet 121 is transported across a physical network, it is carried in the payload of a stream 135 of transport packets 127. Each transport packet 127 has its own header 129, payload 131, and trailer 133. What are termed transport packets herein are packets at the link layer of the ISO seven-layer model. Transport packets may have fixed or varying lengths, depending on the protocol used in the link layer.

The devices that deal with the transport packets do so as indicated by header 129 and trailer 133 in the packets, and do not examine the contents of payload 131. When a transport packet reaches its destination, the payload is passed to the part of the system for which it is intended, in this case, a component which operates according to the IP protocol, and this component deals with IP packet 121 as indicated in IP header 123. Of course, IP payload 125 may be a packet for another, still higher level. For example, it may be a packet destined for a decrypter, and the payload of that packet may be an encrypted IP packet 121. In such a case, the component that deals with IP packet 121 passes the payload to the decrypter, which decrypts the encrypted IP packet 121 and returns the decrypted IP packet to the component that deals with IP packets for further processing. That processing may of course include sending the decrypted IP packet to another destination, and if communication with that destination is via the protocol for transport packets 127, the component that deals with IP packets will provide the decrypted IP packet to the component that produces transport packet streams and the decrypted IP packet will be carried in the payload of the transport packets 127.

Packet Switches

When packets are used to communicate between digital systems that are located remotely from each other, the packets move on digital networks that connect the systems. At the physical level, the digital network may employ any medium to transmit a signal between two devices, for example, the ether, a conducting wire, or an optical cable. Packets are routed among transmission paths by packet switches. The packet switch routes the packet according to information that is typically contained in the packet header.

As one would expect, each kind of protocol has its own routing rules. For example, the IP protocol uses logical routing; each source or destination of an IP packet has a logical IP address, and an IP packet intended for a given destination has that destination's logical IP address in its header. The header does not indicate the physical location of the destination. The IP packet switch must translate the IP address into a physical address that will get the packet at least part of the way to its destination and must also make a stream 135 of transport packets directed to that physical address that carry the IP packet as their payload 131. Thus, IP node 109(*n*) is on Ethernet node 107(*n*) on Ethernet LAN 105(*a*) and an IP packet switch that is connected to LAN 105(*a*) must respond to an IP packet addressed to IP node 109(*n*) by making a stream of Ethernet packets directed to Ethernet node 107(*n*) that carry the IP packet as their payload.

A typical packet switch is shown at 103. Packet switch 103 is connected to a number of physical media 106, by means of which packet switch 103 may receive and transmit data. Examples of such media may be fiber optic cables or cables made up of electrical conductors. Each such medium 106 has its own protocol for defining the data sent via the medium; for example, one widely-used protocol for sending data via an optical cable is the SONET protocol. In FIG. 1, media 106(*a* . . . *m*) are optical cables using the SONET protocol, while media 106(*n* . . . *z*) are electrical cables. Packets at the level of the medium, termed herein medium packets, have as their payload transport packets. In terms of the ISO 7-layer model, the medium packets are physical-layer packets. In switch 103, the transport packets that are sent and received on the optical cables are packets made according to the ATM protocol used in ATM wide-area network 111, while the transport packets that are sent and received on the electrical cables are made according to the Ethernet™ protocol used in local area networks 109. In many cases, the transport packets have IP packets as their payloads, and in those cases, packet switch 103 routes the IP packets to IP nodes 109. As described above, it does so by determining the medium 106(*i*) upon which the IP packet should move to reach its destination and then making a stream of packets according to the protocol required for the medium that have the transport packet stream used with that medium as their payloads, and these in turn have the IP packet as their payload. Thus, if packet switch 103 receives an IP packet from WAN 111 that is directed to IP node 109(*n*) and IP node 109(*n*) is in Ethernet node 107(*n*) on Ethernet LAN 105(*a*), packet switch 103 must make a stream of packets in the form required by medium 106(*n*) whose payload is a stream of Ethernet packets directed to Ethernet node 107(*n*) that in turn carry the IP packet as their payload.

The functions performed by a packet switch 103 depend on the network environment in which the packet switch is operating and the capabilities of the packet switch. The functions that are important for the following discussion will be termed herein traffic management functions. There are three general groups of traffic management functions:

routing packets received from a particular source to one or more different destinations.

transforming packet streams as required for the routing.

controlling traffic, so that neither switch 103 nor the devices it transmits data to is overwhelmed and so that switch 103 and the networks it serves are fairly and efficiently utilized.

Continuing with these functions in more detail, routing includes filtering and multicasting. Filtering is performed at network boundaries. Packet switch 103 is shown here as being at the boundary between a private network 104 and a public network 102. The header of each IP packet 121 contains the source IP address and destination IP address for the packet, and the security policies of private network 104 bar access by IP packets from public network 102 with certain source addresses to private network 104 and also bar access by packets from private network 104 with certain source addresses to public network 102. Switch 103 filters each incoming IP packet by comparing its source address with a list of source addresses which are to be barred, and if the incoming packet is on the list, it is discarded. Switch 103 filters outgoing packets in a similar fashion. Multicasting is sending copies of a packet received from a source to multiple destinations.

Stream transformation includes operations such as the one described above of transforming an IP packet that is received as a stream of ATM transport packets into an IP packet that is output to it its destination as a stream of Ethernet transport packets. Such operations typically involve reassembling the higher-level packet from the payloads of its transport packets when the higher-level packet is received in the switch and segmenting the higher-level packet into transport packets when it is transmitted from the switch. Stream translation also includes encryption and decryption of payloads. One place where encryption or decryption occurs is at network boundaries. For example, a security policy of private network 104 may require that IP packets sent to certain destinations in public network 102 be encrypted, and the encryption may be done in switch 103. Switch 103 may also decrypt packets coming from those destinations when they enter private network 104.

Controlling traffic includes protecting switch 103 and destinations downstream of it from being overloaded by discarding packets and scheduling output of packets from switch 103 so that output bandwidth is efficiently used and so that to the extent possible, the requirements of each output stream with regard to network resources and timing can be satisfied. The requirements of an output steam in this regard are called its service class. The packet switch must be able to handle service classes ranging from e-mail where all that is required is that the e-mail arrive at a reasonable time (measured in hours) after it has been posted through digital TV, in which the packets must arrive at their destination within fixed time intervals of each other, to packet telephony, where there are strict constraints not only on the time intervals between packets, but also on the total length of time it takes a packet to traverse the network from its source to its destination.

BRIEF DESCRIPTION OF THE DRAWINGS

FIG. 1 is a diagram of a packet network and packets;

FIG. 6 is a detailed diagram of the format of the enqueue data message;

FIG. 7 is a detailed diagram of the format of the dequeue data message;

FIG. 8 is a detailed diagram of the format of traffic queue parameter block 403;

FIG. 9 is a detailed diagram of the format of multicast elaboration table 421;

FIG. 10 is a detailed diagram of the format of discard configuration block 431;

FIG. 11 is a detailed diagram of the format of buffer pool specification 433;

FIG. 13 is a detailed diagram of the format of a commit enqueue data message;

FIG. 14 is a diagram of the primitives from which schedulers may be configured in a preferred embodiment;

FIG. 19 is a detailed view of the signals on TMI bus 1507;

FIG. 23 is a detailed diagram of the data structure used to configure a scheduler;

FIG. 24 is a detailed diagram of the data used to define a scheduler input;

FIG. 25 is a high-level block diagram of TMC 203 and QMU 211; and

FIG. 27 is a diagram of the data structure that configures a virtual output port 521;

FIG. 28 is a diagram of a dequeue acknowledge message;

FIG. 29 is a diagram of a data structure that is used to configure a traffic class scheduler 503; and FIG. 30 is a diagram of the data structure used to relate traffic queues 204 to input scheduler queues for traffic class schedulers 503.

FIG. 31 is a continuation of FIG. 6;
FIG. 32 is a continuation of FIG. 7;
FIG. 33 is a further continuation of FIG. 7;
FIG. 34 is a continuation of FIG. 8;
FIG. 35 is a continuation of FIG. 9;

FIG. 36 is a continuation of FIG. 23;
FIG. 37 is a continuation of FIG. 24;
FIG. 40 is a continuation of FIG. 30;
and
FIG. 41 is a further continuation of FIG. 30.

Figure 2:
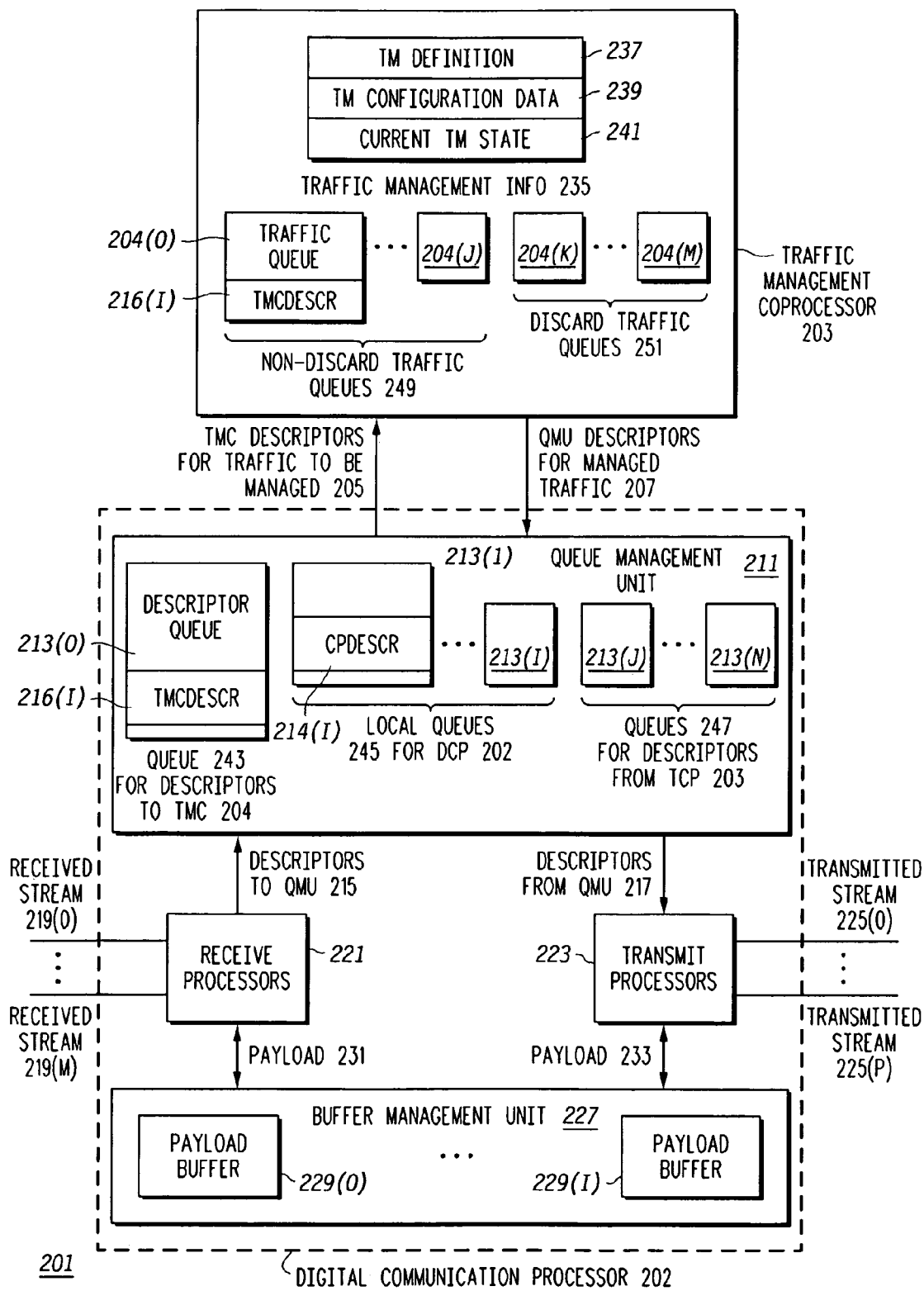
FIG. 2 is a block diagram of a digital communications processor which employs look-aside data stream management and a traffic management processor that is used with the digital communications processor.

Reference numbers in the drawing have three or more digits: generally, the two right-hand digits are reference numbers in the drawing indicated by the remaining digits. Thus, an item with the reference number 203 first appears as item 203 in FIG. 2. Exceptions to this rule are indicated in the following table:

| Reference Numbers | Figures |
| --- | --- |
| 6xx | 6, 31 |
| 7xx | 7, 32, 33 |
| 8xx | 8, 34 |
| 9xx | 9, 35 |
| 20xx | 20, 38, 39 |
| 23xx | 23, 36 |
| 24xx | 24, 37 |
| 30xx | 30, 40, 41 |

DESCRIPTION OF THE DRAWINGS

The following Detailed Description begins with an overview of an environment in which the techniques disclosed herein may be practiced and then presents a detailed disclosure of a traffic manager that practices the technique, and finally presents an implementation of the traffic manager that employs a traffic manager integrated circuit and external memory ICs.

Look-Aside Data Stream Manipulation

The techniques for data stream manipulation disclosed herein are practiced in an environment that employs look-aside data stream manipulation. In look-aside data stream manipulation, a packet's payload is received from a network input and stored until it is output to a network output. When the packet is received, a descriptor is made that represents the packet; as the term is used herein, a descriptor includes an identifier for the stored payload and additional information which controls the manner in which the environment manipulates the packet stream to which the payload belongs. Manipulation of the data stream is done using the descriptor instead of the packet it represents. For example, switching a packet from an input to an output is done by placing the descriptor on a queue that is serviced by the output; when the descriptor reaches the head of the queue, the output uses the manipulation information and the payload descriptor to output the payload associated with the descriptor in the form required for the output. Other operations such as multicasting, rate policing, discard due to congestion, scheduling, or segmentation and reassembly are similarly performed in whole or in part by manipulating descriptors rather than payloads.

An Environment for Look-Side Data Stream Manipulation: FIG. 2

FIG. 2 shows an environment 201 in which look-aside data stream manipulation is practiced. Environment 201 has two main components: a digital communications processor (DCP) 202 which manipulates descriptors separately from the payloads they represent and a traffic management coprocessor (TMC) 203 which performs higher-level data stream manipulation tasks such as multicasting, rate policing and discard, scheduling, shaping, and reassembly and segmenting for digital communications processor 202. In one embodiment, DCP 202 and TMC 203 are implemented as integrated circuits with additional external memory IC's; in other embodiments, they may not be so implemented, and in others, TMC 203 may be integrated with DCP 202. One example of an IC implementation of DCP 202 is the C-5™, available from C-Port Corporation, 120 Water St., Andover, Mass. 01845. A prototype implementation of the C-5 is described in detail in published PCT patent application WO 99/59078, C-Port Corporation, Digital Communications Processor, published 18 Nov. 1999.

Continuing in more detail with DCP 202, DCP 202 receives data streams from one or more networks at inputs 219(0 . . . m) and transmits data streams to one or more networks at outputs 225(0 . . . p). The internal components of DCP 202 which are of interest in the present context are the following:

channel processors, which process data streams. The channel processors include
  receive processors 221, which process the data streams received on inputs 219(0 . . . m) and
  transmit processors 223, which process the data streams being transmitted to outputs 225 (0 . . . p).
Channel processors may also be used to process payloads internally to DCP 202.
buffer management unit 227, which stores the payloads received via inputs 219(0 . . . m) in payload buffers 229 until they are output via outputs 225(0 . . . p).
queue management unit 211, which stores queues 213 of descriptors.

The channel processors are configurable to deal with different kinds of transport packets and physical layer data representations. Descriptors are made and read by the channel processors. In most cases, a descriptor represents a payload stored in buffer management unit 227 and contains an identifier for the payload buffer 229(i) that contains the payload the descriptor represents. As long as a descriptor remains within DCP 202, its contents are determined solely by the needs of the channel processor which makes the descriptor and the channel processor that reads it. Descriptors that remain within DCP 202 are termed in the following channel processor descriptors. One such descriptor is shown at 214. When a descriptor is to be processed by TMC 203 as well as the channel processors, the descriptor must contain additional information for use by TMC 203. Descriptors which contain such additional information are termed TMC descriptors 216 in the following.

The manner in which the components of DCP 202 interact to process a data stream may be demonstrated with the example of receiving an IP packet from a network that uses ATM packets as transport packets and has an optical physical layer and outputting the IP packet to a network that uses Ethernet packets as transport packets and has an electronic physical layer. Received stream 219(i) is received in a receive processor 221(i) that has been configured to handle data streams that have an optical physical layer and an ATM transport layer and to process IP packets. As receive processor 221(i) receives stream 219(i), it extracts the IP packet payload from the stream, writes the IP packet payload to a payload buffer 229(j) in buffer management unit 227, and retains an identifier for payload buffer 229(j). The identifier is placed in a channel processor descriptor 214(k). The descriptor may additionally contain other protocol data from the IP packet. Receive processor 221(i) further processes the address information in the IP packet's header to determine what descriptor queue(s) 213(l) in queue management unit 211 the descriptor for the IP packet should be placed in and places the descriptor 214(k) at the tail of the queue. This queue 213(l) is read by transmit processor 223(j) that outputs to the desired network. Transmit processor 223(l) has been configured to output the IP packet using an Ethernet transport layer and an electronic physical layer. When descriptor 214(k) reaches the head of queue 213(l), transmit processor 223(j) uses the information in descriptor 214(k) to locate buffer 229(j) and outputs the payload as an IP packet using the proper transport layer and physical layer.

Traffic Management in Environment 201

As will be apparent from the above description of the operation of DCP 202, DCP 202 has sufficient resources of its own for only the simplest traffic management functions. It can route a data stream received at a particular input 219(i) to a particular output 219(j) and can transform the data stream as required for this routing. Recirculation capabilities in the channel processors further permit data stream transformations such as encryption and decryption. There are, however, not sufficient resources in DCP 202 for performing "higher" traffic management functions for which knowledge of the state of DCP 202 itself or of the requirements of devices in the networks connected by DCP 202 is required. Examples of such functions are packet discard, scheduling, shaping, and packet reassembly and segmentation.

In environment 201, such higher traffic management functions are performed by traffic management coprocessor 203, which, in a preferred embodiment is an IC that has external memory and is designed to work with the IC embodiment of DCP 202. When DCP 202 is used with a TMC 203, queue management unit includes not only local queues 245 that are used as described above by DCP 202, but also a queue 243 for TMC descriptors 216 that are to be sent to TMC 203 and one or more queues 247 for descriptors received from TMC 203. When a data stream being processed by DCP 202 requires one or more higher traffic management functions, the receive processor 221(i) that is receiving the data stream provides a TMC descriptor 216 to QMU 211 to be added to the tail of queue 243. Coprocessor 203 places this TMC descriptor 216(i) in a traffic queue 204(m) for its data stream and often other data streams whose traffic must be managed together with the data stream with which descriptor 216(i) is associated. The traffic queue a TMC descriptor is placed in determines what TMC 203 does with the descriptor and how it does it. Seen broadly, a traffic queue thus relates a set of descriptors to a set of traffic management functions in TMC 203; as will be seen in more detail later, a traffic queue also relates a set of descriptors to a set of packet processing functions in DCP 202.

There are two general classes of traffic queues: non-discard traffic queues 249 for descriptors for packets that are not to be discarded by DCP 202 and discard traffic queues 251 for descriptors for packets that TMC 203 has determined ought to be discarded. TMC 203 reads a TMC descriptor 216 from the head of a particular traffic queue 204(m), adds information needed by QMU 211 to process the TMC descriptor 216, making the TMC descriptor into a QMU descriptor, and provides the QMU descriptor to queue management unit 211, as shown at 207. Queue management unit 211 then places the cp descriptor contained in the QMU descriptor at the tail of descriptor queue 213(n) for the further processing that needs to be done in DCP 202 for the packet represented by the descriptor. As will be explained in more detail later, inputs of descriptors to TMC 203 and outputs of descriptors from TMC 203 are flow controlled. In the latter case, the flow control not only controls flow from TMC 203 to QMU 211, but flow of descriptors to individual queues 213 in queues 247.

For example, if the traffic queue is a discard traffic queue, queue management unit 211 places the descriptor in a queue 213 that is serviced by a channel processor that does the processing necessary to discard the packet represented by the queue from buffer management unit 227. If, on the other hand, the traffic queue is a non-discard traffic queue, queue management unit 211 may put the descriptor in the descriptor queue 213 for a transmit processor 223(j) that is outputting the stream to transmitted stream 225(i). Since any one of the transmit or receive processors in DCP 202 can read descriptors from and write descriptors to the queues managed by QMU 211, arbitrarily complex interactions between coprocessor 203 and DCP 202 are of course possible. Examples of such complex interactions will be given in due course.

Traffic management coprocessor 203 can apply a number of different traffic management techniques to a traffic queue 204. How the techniques are applied is highly configurable with regard to each traffic queue 204. The information which determines what traffic management techniques are applied to a traffic queue 204(i) is contained in traffic management information 235. In logical terms, traffic management information 235 falls into three categories:

traffic management definitions 237, which define the available techniques. In a preferred embodiment, these definitions are built into TMC 203; in other embodiments, the user may be able to modify definitions 237 or add new definitions.

traffic management configuration data 239, which defines how the techniques defined at 237 are to be applied to sets of traffic queues 204; and current traffic management state 241, which contains the current state of each traffic queue 204 and of other components of TMC 203 and DCP 202 which are relevant to traffic management.

Traffic management is done in TMC 203 by applying the traffic management definitions 235 as configured by configuration data 239 to the current traffic management state 241 to select a traffic queue 204, and the payload associated with the TMC descriptor 216 at the head of the selected traffic queue is treated as required by the traffic management definitions, the configuration, and the current traffic management state.

Figure 3:
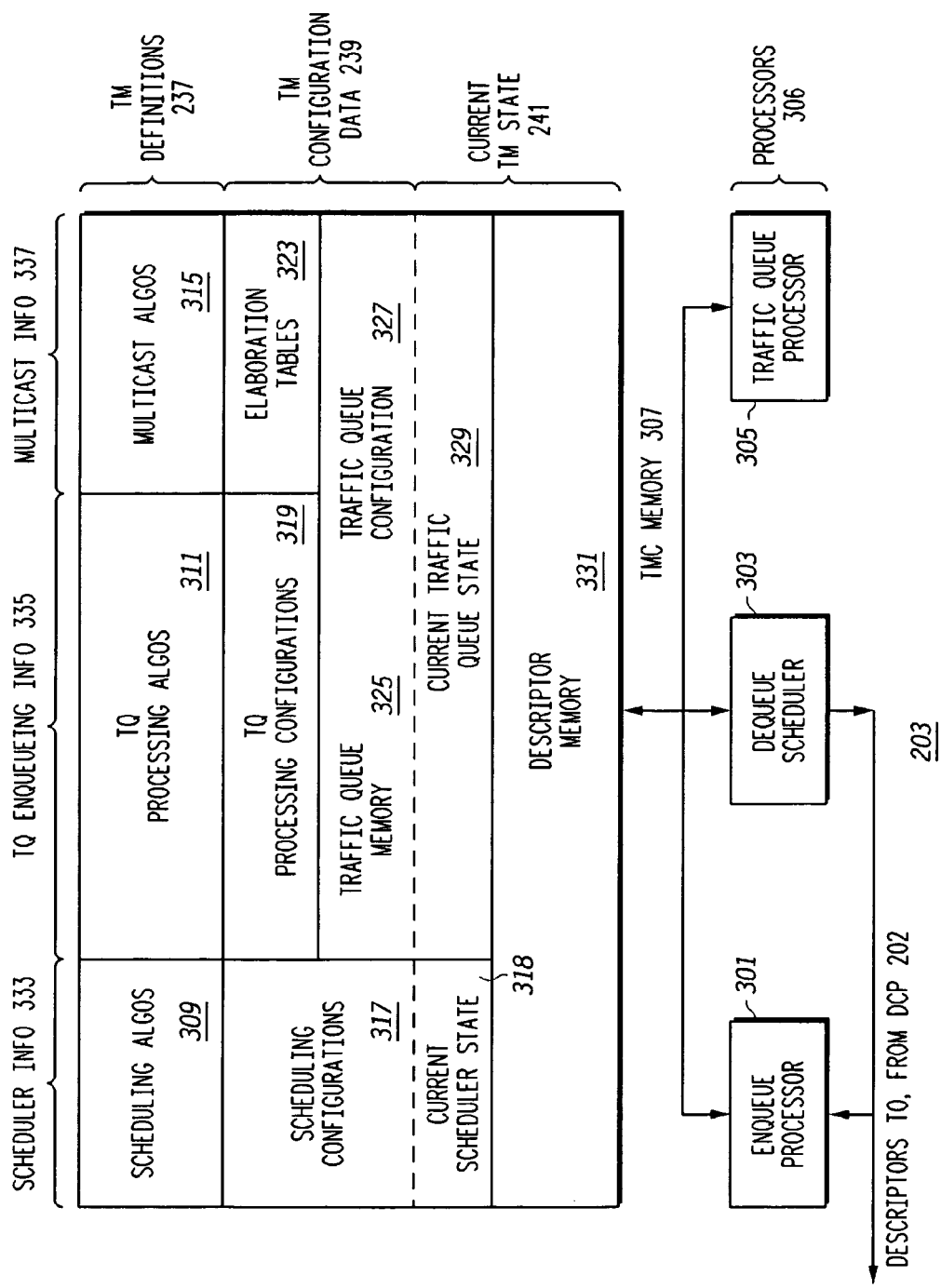
FIG. 3 is a conceptual overview of traffic management processor 203.

Logical Overview of TMC 203: FIG. 3

FIG. 3 shows a logical overview of the components of traffic management coprocessor 203. In a preferred embodiment, there are two major subdivisions of TMC 203: processing components 306, which may be embodied in one or more processing elements, and TMC memory 307. In a preferred embodiment, all of the processing components 306 are implemented in a single IC. Processing components 306 fall into three functional groups: enqueue processor 301, traffic queue processor 305, and dequeue scheduler 303. Enqueue processor 301 receives a TMC descriptor 216 from QMU 211 and determines what traffic queue(s) the descriptor is to be placed in. Part of this task is determining whether the descriptor and the packet it represents are to be discarded. If the descriptor is to be discarded, enqueue processor 301 specifies that it be placed in a discard traffic queue. Traffic queue processor 305 receives the descriptor 216 from enqueue processor 301 and links the descriptor 216 into the traffic queue 204 specified by enqueue processor 301. Dequeue scheduler 303 determines the next traffic queue 204 from which a descriptor 216 shall be provided to QMU 211 and provides the descriptor which is at the head of that traffic queue to QMU 211. In a preferred embodiment, all three of these processors operate in parallel, thereby permitting pipelined processing of descriptors.

In a preferred embodiment, TMC memory 307 includes both memory which is internal to the IC in which the processors 306 are implemented and memory which is external to that IC. In other embodiments, the distribution of memory between the IC and external memory may vary. In functional terms, the memory is divided into storage for tm definitions 237, tm configuration data 239, and current tm state 241. The functions of the contents of these parts of memory 307 have already been explained in overview.

There are three broad classes of content in TMC memory 307: scheduler information 333, which is used in scheduling, TQ enqueuing information 335, which is used to enqueue descriptors 216 into traffic queues 204, and multicast information 337, which is used in multicasting. Continuing in more detail, there are three broad classes of tm definitions 237 in a preferred embodiment: scheduling algorithms 309, which specify techniques for selecting the next descriptor 216 to be provided to DCP 202; traffic queue enqueuing algorithms 311, which specify techniques for determining whether a TMC descriptor 216 received from DCP 202 is to be discarded; and multicast algorithm 315, which describes how a single TMC descriptor 216 is to be copied to multiple traffic queues. There is configuration data 239 corresponding to each of the classes of definitions. Scheduler configurations 317 define individual schedulers and the manner in which the schedulers are arranged in a scheduler hierarchy; traffic queue enqueuing configurations 319 define the conditions under which discards will be made; elaboration tables 323 specify what traffic queues a descriptor for a packet that is to be multicast is to be placed on. Additionally, there is configuration data 327 for each traffic queue 204. Configuration data 239 may be set by a user of TMC 203 to determine what TM definitions will apply to a particular traffic queue and the manner in which these definitions will be applied. To give an example, a discard configuration in TQ processing configurations 319 will specify parameters that determine the conditions under which a descriptor 216 will be discarded instead of being placed at the tail of a particular traffic queue 204. In a preferred embodiment, the configuration data 239 may be set only when TMC 203 is initialized; in other embodiments, dynamic setting of the configuration data 239 may be permitted.

Current tm state 241 contains data which specifies the current state of each of the traffic queues 213 and of schedulers in the scheduler hierarchy. Included in current TM state 241 are current traffic queue state 329 and current scheduler state 318. Current traffic queue state 329 includes the descriptors 216 currently contained in each queue, the size of the packets represented by the descriptors in the queue, and the current state of the payload buffers 229 in which the packets are stored. The size of the packets and the current state of the payload buffers 229 are used to determine whether a descriptor 216 should be discarded instead of being placed on a traffic queue 204 and which traffic queue 204 is selected next by dequeue scheduler 303. Current scheduler state 318 determines which TMC descriptor 216 is selected for output to DCP 202 by dequeue scheduler 303.

General Operation of TMC 203: FIG. 25

FIG. 25 is a block diagram showing how the components of TMC 203 and of QMU 211 interact to schedule a cp descriptor 214's arrival in a descriptor queue 213 being used by a transmit processor 223 and thereby to schedule output of the payload represented by the descriptor by a transmit processor 223.

As already indicated, a channel processor which is making a TMC descriptor 216 that is to be scheduled by TMC 203 must add additional information to the cp descriptor 214. Effectively, the channel processor encapsulates the cp descriptor 214, as shown in the detail of TMC descriptor 214 by adding TMC information 2513 to it. Similarly, when TMC 203 returns the cp descriptor 214 to QMU 211, it encapsulates it by adding BMU information 2515 to it, as again seen in the detail of BMU descriptor 2508. At a minimum, TMC information 2513 includes an identifier for a traffic queue 204 in TMC 203; and when the descriptor represents a varying-length packet, the length in bytes of the packet represented by the descriptor 213.

Additional information may be required for certain operations performed by TMC 203. QMU information 2515 includes at a minimum a virtual output port identifier that QMU 211 uses to determine which of descriptor queues 247 the encapsulated cp descriptor 214 is to be placed in. Of course, which of the descriptor queues 247 the encapsulated cp descriptor 214 is placed in determines the manner in which the packet represented by descriptor 214 is further processed in DCP 202.

FIG. 25 further shows the architecture of TMC 203 and the interface between QMU 211 and TMC 203 at a level of detail greater than that of FIG. 3. As shown in FIG. 25, QMU 211 sends the TMC descriptor at the head of TMC input queue to TMC 203 via an enqueue data message 601 which contains descriptor 216. When TMC 203 receives the enqueue data message, it places the descriptor 216 from the message in the tail of input queue 2501.

Enqueue processor 301 reads TMC descriptors 216 from the head of input queue 2501. If the descriptor 216 indicates that the packet it represents is to be multicast, enqueue processor 301 uses multicast information 327 to determine which traffic queues 204 are to receive copies of the descriptor 216. Otherwise, TMC descriptor 216 directly specifies the traffic queue that is to receive the descriptor 216. When enqueue processor 301 knows what traffic queue 204 a descriptor 216 is to be placed in, it uses TQ enqueue information 335 to determine whether the state of the traffic queue requires the descriptor 216 and the packet represented by the descriptor to be discarded. When that is the case, enqueue processor 301 substitutes a discard traffic queue in DTQS 251 for the traffic queue originally specified in TMC descriptor 216. When enqueue processor 301 has finally determined the traffic queue 204 that is to receive descriptor 216, enqueue processor 301 provides the descriptor 216 to traffic queue processor 305 for enqueuing at the tail of the traffic queue specified by enqueue processor 301.

For scheduling purposes, traffic queues 204 in TMC 203 are organized into scheduler queues, shown at 523 in FIG. 25. A scheduler queue 523 contains a queue of traffic queues 204. Dequeue scheduler 303 uses scheduler information 333 to select one of a set of non-empty scheduler queues 523 for scheduling. When dequeue scheduler 303 has selected a scheduler queue 523 for scheduling, the traffic queue 204(i) that is currently at the head of the selected scheduler queue 523 is serviced, that is, the descriptor 216 that is currently at the head of traffic queue 204(i) is output as a QMU descriptor 2508 to output queue 2507. From there, TMC 203 outputs the QMU descriptor 2508 as a dequeue data message 701 to QMU 211. QMU 211 places the descriptor 2508 in TMC output queue 2509, and then places the cp descriptor 214 contained in the QMU descriptor 2508 in the proper descriptor queue 213 in queues 247.

Continuing in more detail with scheduling, traffic queue processor 305 is responsible for placing traffic queues 204 in the scheduler queues 523 and removing them from scheduler queues 523. A traffic queue 204 may be at the head of a scheduler queue 523 only if the traffic queue can be serviced. A traffic queue that can be serviced is termed herein an eligible traffic queue. Empty traffic queues are of course not eligible. Other situations in which a traffic queue 204 is not eligible will be disclosed in detail in the following. If a traffic queue 204 is not presently eligible, traffic queue processor 305 does not place it in a scheduler queue, but instead leaves it in a set of ineligible traffic queues 2511. A traffic queue 204 may also become ineligible between the time it is placed in the scheduler queue 523 and the time it would be serviced. In that case, traffic queue processor 305 removes the ineligible traffic queue 204 from the head of scheduler queue 523 before it is serviced, returning it to ineligible traffic queues 2511. A scheduler queue 523 that has an eligible traffic queue at its head is termed an active scheduler queue. Dequeue scheduler 303 schedules only active scheduler queues.

As mentioned above, QMU descriptor 2508 includes a virtual output port identifier which associates the descriptor with a queue 213 in descriptor queues 247. One of the tasks of dequeue scheduler 303 is to associate each QMU descriptor 2508 with the proper virtual output port. How this is done will be described in detail in the following. The virtual output port mechanism is also used to flow control the operation of dequeue scheduler 303 at the level of the descriptor queues 213 in queues 247. Each virtual output port is associated with a credit value which indicates how many cp descriptors 214 the descriptor queue 213 in descriptor queues 247 that corresponds to the virtual output port will currently accept for enqueuing. If the credit value is 0, dequeue scheduler 303 does not schedule scheduler queues which will output QMU descriptors 2508 intended for the descriptor queue associated with the virtual output port. Every time dequeue scheduler 303 schedules a scheduler queue that outputs a descriptor intended for a given output port, the credit value is decremented; every time a cp descriptor 214 is removed from a descriptor queue 213 in queues 247, QMU 211 sends a dequeue acknowledgement message 1925 to TMC 203 that specifies the virtual output port corresponding to the descriptor queue and dequeue scheduler 303 responds to message 1925 by incrementing the virtual output port's credit value. A scheduler queue 523 that is active and is not barred from being scheduled by a virtual output port with a credit value of 0 is termed a schedulable scheduler queue. Thus, dequeue scheduler 303 selects the descriptor queue for output to QMU 211 that is at the head of an eligible traffic queue 204(*i*) that is in turn at the head of an active and schedulable scheduler queue 523(*j*). It should also be pointed out here that as long as removing the descriptor from the head of traffic queue 204(*i*) that is at the head of scheduler queue 523(*j*) does not render traffic queue 204(*i*) ineligible, traffic queue 204(*i*) goes to the end of scheduler queue 523(*j*). An active scheduler queue thus serves its eligible traffic queues in round robin order. Additionally, traffic queue processor 305 may add descriptors 216 to traffic queues while the traffic queues are in scheduler queues 523.

As mentioned above, discarded descriptors are placed in discard traffic queues that are scheduled like non-discard traffic queues. A QMU descriptor 2508 from a discard traffic queue indicates that the packet represented by the descriptor 2508 is to be discarded and also indicates the reason for the discard. QMU 217 responds to a discard dequeue data message containing a descriptor from a discard traffic queue by placing the descriptor 2508 in a queue for a channel processor in DCP 202 which returns buffer identifiers to buffer management unit 227 for reuse, thereby effectively discarding the contents of the buffer identified by the buffer identifier.

FIG. 25 also gives an overview of the hardware interface between TMC 203 and QMU 211 in a preferred embodiment. When there is room in input queue 2501, TMC 203 asserts an input queue ready signal 1915 and QMU 211 outputs the enqueue message at the head of TMC IQ 243 to TMC 203; when there is room in TMC output queue 2509, QMU 211 asserts an DQRDY signal 1919 and TMC 203 outputs the QMU descriptor at the head of output queue 2507. DQARDY 1923 and DQACK 1921 are used to acknowledge dequeuing of descriptors from descriptor queues 213 in queues 247. Each DQACK message contains the virtual output port specifier from a dequeue message whose cp descriptor 214 has just been dequeued by a channel processor from the descriptor queue 213 in which it was placed after QMU 211 received it from TMC 203. As already described, TMC 203 uses the returned virtual output port specifiers to control flow of QMU descriptors 2508 to their destination descriptor queues 247.

Figure 4:
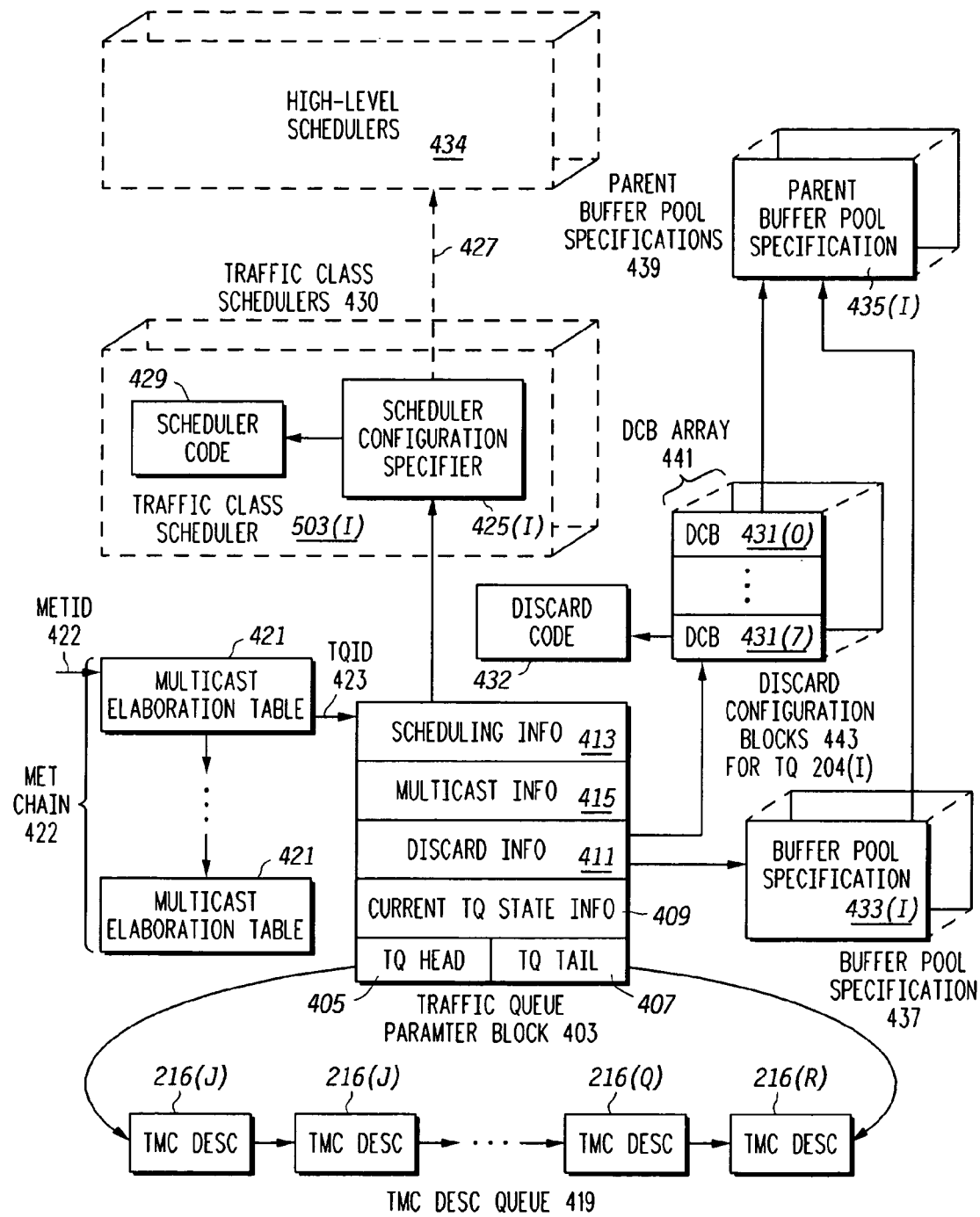
FIG. 4 is an overview of a traffic queue 204 and data structures associated therewith.

Traffic Queues and Related Data Structures: FIG. 4

All of the activities of traffic management coprocessor 203 involve traffic queues 204. The traffic queue a TMC descriptor is placed in determines the discard policy that will be applied to the descriptor, the manner in which the descriptor will be scheduled, and the QMU queue that the descriptor will be output to. FIG. 4 shows a traffic queue 204 and its related data structures. Each traffic queue 204 has a traffic queue identifier 423 and is defined by a traffic queue parameter block 403. The TMC descriptors 216 belonging to the traffic queue are linked together in a TMC descriptor queue 419; traffic queue parameter block 403 has a tq head pointer 405 pointing to the head descriptor 216 in queue 419 and a tq tail pointer 407 pointing to the tail descriptor 216 in queue 419. The remaining information in parameter block 403 includes information about the current state of the traffic queue 204 represented by parameter block 403, information 411 used to determine whether a descriptor 216 should be added to the traffic queue or discarded, information 415 which is used in multicasting, and information 413 which is used in scheduling the traffic queue.

The related data structures contain additional information that is used in operations involving the traffic queue. When a packet is to be multicast, its descriptor is placed in each traffic queue of a group of traffic queues; the group is defined by a chain 422 of one or more multicast elaboration tables 421. There is a tqid 423 in table 421 for each traffic queue in the group. A given multicast table 421 is identified by its metid 420. When a packet is to be multicast, its TMC descriptor 216 contains the metid of the head multicast elaboration table in MET chain 422 that specifies the group of traffic queues.

The decision whether to discard a descriptor is made using one of several algorithms 311. Some of these take the state of buffers 229 in buffer management unit 227 into account. That state information is maintained in traffic management coprocessor 203 in terms of pools of buffers and sets of pools of buffers. The buffer pools and sets of buffer pools function as a model in TMC 203 of the state of certain buffers in DCP 202. Each buffer pool for which TMC 203 maintains state has a buffer pool specification 433 that specifies an amount of buffer space in DCP 202; a traffic queue parameter block 403 specifies one such buffer pool specification. Each buffer pool specification 433(*i*) specifies a parent buffer pool specification for the set of buffer pools that the buffer pool represented by buffer pool specification 433(*i*) belongs to. Each buffer pool has a minimum amount of buffer space reserved for it; the parent buffer pool specification indicates an amount of buffer space over and above the total of the minimum buffer space for the buffer pools which is available to be shared among the buffer pools belonging to the parent buffer pool.

Discard configuration block 431 contains the configuration information for the discard method used by the given traffic queue 204, and discard code 432 is the code for the method. Discard configuration blocks 431 are organized into an array 441 in TMC 203's memory, and a given traffic queue 204(i) may select among 8 discard configuration blocks 431. As with buffer pool specifications 437, many traffic queue parameter blocks 403 may specify a given discard configuration block 431. When a descriptor is to be added to the given traffic queue 204, the information in the buffer pool specifications 433 and 435 is used together with information in discard configuration block 431 by discard code 432 to determine whether the descriptor should be discarded. If the descriptor is discarded, it is placed in a discard traffic queue 251.

The decision as to when the TMC descriptor 216 that is currently at the head of a given traffic queue 204(i) is to be output to DCP 202 is made using a hierarchy of schedulers. Functionally, the hierarchy of schedulers takes as its input a set of active and schedulable scheduler queues 523 and selects one of the set as the source of a traffic queue 204 whose head descriptor 216 is to be output to DCP 203. The manner in which the scheduler hierarchy selects scheduler queues thus determines how much of the bandwidth of TMC 203 and ultimately of TMC-DCP system 201 is available to the packets represented by the descriptors in the traffic queues of the scheduler queues.

As shown at 430, in a preferred embodiment, a scheduler is defined by a scheduler configuration specifier 425 and by scheduler code 429 that is executed using the information in the scheduler configuration specifier. Scheduling info 413 in traffic queue parameter block 403 associates a given traffic queue 204 with a single schedule configuration specifier 425 (i) belonging to a single scheduler 430; that scheduler defines a traffic class to which all of the traffic queues that have scheduler configuration specifiers 425 for the given scheduler 430 belong. Scheduler 430 is thus termed a traffic class scheduler 503. In a preferred embodiment, traffic class schedulers also handle segmentation and reassembly. A traffic class scheduler is a leaf scheduler in the scheduler hierarchy, and there must always be at least one other interior scheduler in the hierarchy, as indicated at 427 and 434 in FIG. 4.

Figure 5:
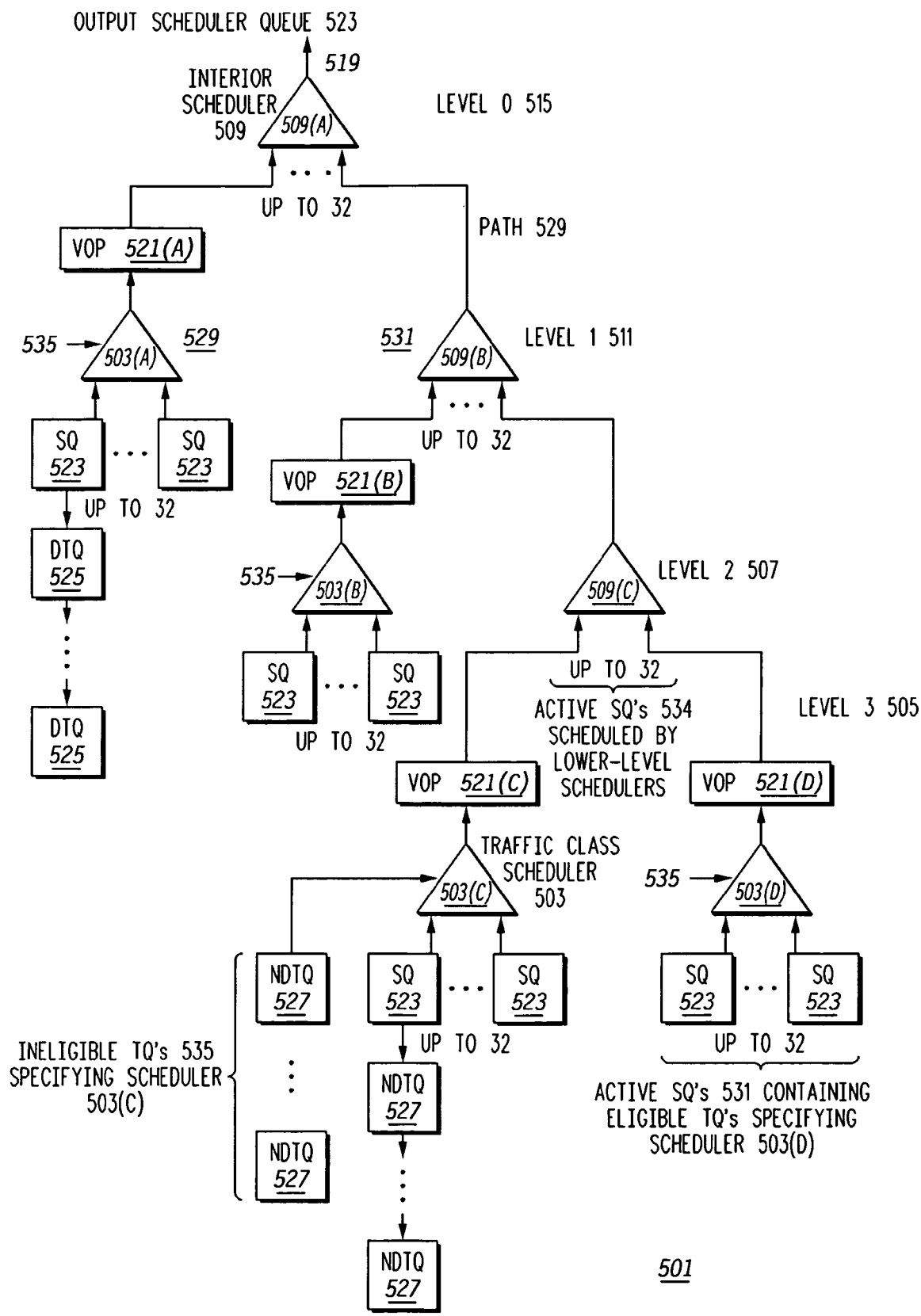
FIG. 5 is a diagram showing a scheduler hierarchy.

Scheduler Hierarchy: FIG. 5

FIG. 5 provides an overview of scheduler hierarchy 501. The input of scheduler hierarchy 501 is a set of active scheduler queues 523; the output of scheduler hierarchy 501 is one of the set of active scheduler queues 523. TMC 203 outputs a QMU descriptor 2508 containing the cp descriptor 214 in the TMC descriptor 216 that is at the head of the traffic queue 204 that is at the head of the scheduler queue that is output by scheduler hierarchy 501. Scheduler hierarchy 501 forms a tree whose nodes are traffic class schedulers 503 or interior schedulers 509. Each scheduler in the hierarchy takes a set of active scheduler queues as its input and selects one of the input set as its output.

Hierarchy 501 is a tree. The leaf nodes of the tree are always traffic class schedulers 503; the interior nodes are always interior schedulers 509. A single interior scheduler at level 0 515 of the hierarchy forms the root of the tree. When scheduler hierarchy 501 schedules a given active scheduler queue 523(i), the schedulers that schedule queue 523(i) form a path through the hierarchy from a traffic class scheduler 503 to the root of the tree; one such path is marked with heavy arrows at 529 in FIG. 5. The maximum depth of the hierarchy in a preferred embodiment is four schedulers.

As can be seen from FIG. 5, in a preferred embodiment, the root scheduler 509(a) at level 0 can be configured to receive output scheduler queues from up to 32 schedulers as inputs, and thus can have an input set of up to 32 scheduler queues; each interior scheduler at the other levels can each be configured to have input scheduler queues from up to 32 scheduler queues as inputs and can thus have input sets of up to 32 scheduler queues; each traffic class scheduler 503 may have up to 32 scheduler queues as inputs and may thus have an input set of up to 32 scheduler queues. The actual number of scheduler queues for a traffic class scheduler 503 depends on the kind of traffic class scheduler.

An important difference between interior schedulers 509 and traffic class schedulers 503 is that in a given traffic class scheduler 503(j), the input set of scheduler queues is active scheduler queues that contain traffic queues specifying traffic class scheduler 5039(j). In a given interior scheduler 509(k), the input set of scheduler queues is the scheduler queues that have been scheduled by the lower-level schedulers which provide inputs to interior scheduler 509(k). All scheduler queues that are available as inputs to interior scheduler queue 509(k) will be active, but may not be schedulable by interior scheduler queue 509(k). That is the case when a virtual output port 521 is on an input to scheduler queue 509(k) and will not permit further outputs of descriptors from the virtual output port to QMU 211.

When scheduler hierarchy 501 is in operation, each scheduler selects one of its current set of active and schedulable input scheduler queues as its output. Thus, traffic class scheduler 503(c) selects one of its active scheduler queues 523 as its output, as does scheduler 523(d), and these two scheduler queues, along with any others provided by schedulers 503 that output to interior scheduler 509(c) and are not made unschedulable by a virtual output port are the scheduler queues 523 which are the input to interior scheduler 509(c); interior scheduler 509(c) selects one scheduler queue 523 from among those input to it for output to interior scheduler 509(b), which in turn selects one scheduler queue 523 from the ones input to it for output to root interior scheduler 509(a). Root interior scheduler 509(a) selects one scheduler queue 523 from its inputs, and the cp descriptor 214 in TMC descriptor 216 at the head of the traffic queue 204 which is at the head of the selected scheduler queue is output in a QMU descriptor 2508. QMU descriptor 2508 then is made into a dequeue data message 701 which goes to queue management unit 211 of DCP 202. Unless the traffic queue from which the descriptor was taken has become ineligible, the traffic queue 504 goes to the tail of its scheduler queue. If the traffic queue is ineligible, it is removed from the scheduler queue and is not again placed in a scheduler queue until it becomes eligible. As shown at 535 in FIG. 501, ineligible traffic queues 204 remain associated with their traffic class schedulers 503; upon again becoming eligible, the traffic queue is placed at the tail of one of the scheduler queues 523 that serve as inputs to the traffic queue's traffic class scheduler.

Two levels of flow control in scheduler hierarchy 501 prevents TMC descriptors 216 from being output to QMU 217 before QMU 217 can handle them. One level deals with the inability of QMU 217 to handle any more descriptors from TMC coprocessor 203 at all; this level operates at the hardware interface between TMC 203 and DCP 202; TMC coprocessor 203 sends a descriptor to DCP 202 only when DCP 202 indicates that it is ready to receive such a descriptor. The other level of flow control deals with the situation where there is not enough room in a particular descriptor queue 213 for additional descriptors from TMC 203. This level of flow control is dealt with by virtual output ports 521 in hierarchy 501.

Each path between a leaf scheduler 503 and root scheduler 509 in hierarchy 501 must have a virtual output port 521 and no path may have more than one virtual output port 521. Each virtual output port has an identifier which uniquely identifies it. A virtual output port 521 has two functions:

Each virtual output port relates a part of the output of scheduler hierarchy 501 to a descriptor queue 213 in descriptor queues 247 of QMU 211.

Each virtual output port also indicates how many descriptors its corresponding descriptor queue 213 can presently take.

The first function is performed by including an identifier for a virtual output port in each QMU descriptor 2508 that is output from TMC 203 to QMU 211. The identifier is that of the virtual output port 521 on the path 529 through scheduler hierarchy 501 of the scheduler queue 523 that includes the traffic queue 204 to which the cp descriptor 214 in the QMU descriptor 2508 belonged.

The second function is performed as follows: If the descriptor queue 213 corresponding to the virtual output port 521 does not have room for the descriptor(s) to be output from the traffic queue 204 at the head of the scheduler queue 523 selected by the scheduler for which the virtual output port controls output, the virtual output port 521 does not permit the scheduler queue to be scheduled by the scheduler at the next level of the hierarchy. When the corresponding descriptor queue 204 again has room, the virtual output port permits output to the next scheduling level. An active scheduler queue 523(*i*) is unschedulable when a virtual output port 521(*j*) on the path 529 between the traffic class scheduler 503 which is the source of the active scheduler queue and the scheduler that is presently scheduling scheduler queue 523(*i*) indicates that the descriptor queue 213 corresponding to virtual output port 521(*j*) currently has no room for an additional descriptor.

As mentioned in the discussion of traffic queues 204, there are two classes of traffic queues: discard traffic queues 251 and non-discard traffic queues 249. Typically, the two classes are scheduled on separate paths through hierarchy 501 to ensure that events which prevent transmission of the packets represented by a descriptor queue 213 that is accepting descriptors from TMC 203 and thus result in blockage by a virtual output port 521 of a path through scheduler hierarchy 501 do not result in the blockage of descriptors from discard traffic queues, since processing of descriptors from discard traffic queues is completely internal to DCP 202 and can continue regardless of the blockage of a transmitted stream 225. The form of hierarchy 501, the scheduling algorithms of the schedulers 503 and 509 in the hierarchy, and the position of virtual output ports 521 in the hierarchy are all configurable by users of TMC 203.

Details of Enqueue Data Messages: FIGS. 6 and 31

As described above, the TMC descriptors 216 which QMU 211 provides to TMC 203 are contained in enqueue data messages. FIGS. 6 and 31 show the details of an enqueue data message 601 in the preferred embodiment. In the preferred embodiment, the enqueue data message is made up of up to 13 24-bit words. The length of enqueue data message 601 depends on the length of a cp descriptor 214 which is contained in words 2-12 of the enqueue data message. In FIG. 6, there is a row for each field of the enqueue data message; column 603 indicates the word offset of the word containing a field, column 605 indicates the field name, column 607 indicates the bit position of the field in the word, and column 609 describes the field's content and purpose. The rows for the fields are indicated at 611-627. It should be noticed that field 615 may contain either a tqid 423 or a metid 420, the latter being the case when the packet represented by the descriptor is being multicast.

In general, the nature and purpose of the fields of enqueue data message 601 are clear from FIGS. 6 and 31; the values for all of the fields but type field 611 when it indicates no message come from TMC descriptor 216; descriptor field 627 contains the cp descriptor 214 that is encapsulated in TMC descriptor 216. Further comment may be required with regard to speculative enqueuing and to discard priority field 625. Speculative enqueue is a mechanism for enqueuing a packet descriptor for a packet that has not yet been fully received by DCP 202. When the speculatively enqueued packet has been fully received by DCP 202, a second one-word long enqueue message called the committed enqueue message is transferred to TMC 203 to commit the speculative enqueue. Type field 611 in an enqueue message is used to identify a speculative or committed enqueue message. Speculative enqueuing will be described in more detail in the following. Discard priority field 625 is used to select one of the up to 8 discard configuration blocks 431 associated with the traffic queue for which the TMC descriptor 216 is intended.

Details of Dequeue Data Messages: FIGS. 7, 32, and 33

FIGS. 7, 32, and 33 show the format of the dequeue messages 701 which TMC 203 sends to buffer management unit 211. Each of these messages contains a QMU descriptor 2508. As before, each field has a row, with 603-609 indicating columns and 701-725 indicating rows. The purpose and content of most fields is clear from FIG. 7; with regard to discard reason field 723, this field is set when enqueue processor 301 discards the descriptor; when a QMU descriptor 2508 from a discard traffic queue 251 is output to queue management unit 211, type field 703 and discard reason field 723 indicate that the payload of the packet represented by cp descriptor 214 in the QMU descriptor is to be discarded and why. The contents of the fields are divided into discard reasons to which DCP 202 may need to respond by taking an action, in field 703, and reasons which serve informational purposes, in field 723. Again, all of the field values in dequeue data message 701 except that of the idle message are contained in QMU descriptor 208; field 725 contains the encapsulated cp descriptor 214.

Details of Traffic Queue Parameter Block 403: FIGS. 8, and 34

FIGS. 8, and 34 show the format of traffic queue parameter block 403 in a preferred embodiment. The formats are represented as before, with 801-809 indicating columns and 811-869 representing fields. The descriptions of the fields in column 809 are largely self-explanatory; in the following the fields will be related to the logical subdivisions of FIG. 4.

Scheduling Info 413

The fields that provide this information include field 819, which identifies the traffic class scheduler 503(*i*) for the traffic queue 204 represented by traffic queue parameter block 403, field 831, which determines what scheduler queue 523(*j*) belonging to traffic class scheduler 503(*i*) the traffic queue 204 is to be placed in when it is eligible, and field 845, which contains information about the head TMC descriptor 216 in traffic queue 204 that is used to determine whether traffic queue 204 is eligible and if it is, how its scheduler queue should be scheduled. The information varies with the kinds of packets represented by the traffic queue 204's descriptors and with the scheduling algorithm used by scheduler queue 523(*i*). Two examples can serve here: with descriptors representing varying-length packets, field 845 includes the packet's length; with descriptors representing fixed-length packets, field 845 includes an end-of-message indicator (eom) indicating whether the descriptor for the last packet in the message being carried by the fixed-length packets has been received in the traffic queue.

Multicast Info 415

In a preferred embodiment, TQ tag field 865 is an identifier that specifies a traffic queue 204 to QMU 211. The traffic queue is specified in two circumstances:

When the packet represented by cp descriptor 214 is being multicast, the identifier specifies the traffic queue 204 in which enqueue processor 301 placed this particular copy of the TMC descriptor 216; and When the packet represented by cp descriptor 214 is to be discarded, the identifier specifies the traffic queue 204 that was specified in the TMC descriptor 216 containing the cp descriptor 214 when the TMC descriptor was received in TMC 203.

Discard Info 411

Fields 813 and 814 identify discard configuration blocks 443 for the traffic queue; these fields plus discard priority field 625 in TMC descriptor 216 identify the actual discard configuration block 431 in blocks 443 to be used with a given descriptor. Fields 815, 816, 869, and 827 all contain data used in various discard techniques.

Current tq State Info 409

This information is contained in field 836. That field contains information about the descriptor at the head of the traffic queue. What information is in the field depends on the kind of packet being represented by the descriptor at the head of the traffic queue. If it is a varying-length packet, field 836 includes the packet's length; if it is a fixed-length packet, field 836 indicates the state of the packet with regard to a multipacket message: whether the last packet in the message has arrived, and if it has, whether the packet represented by the descriptor is the last packet in the message. In the preferred embodiment, each TMC descriptor 216 in the traffic queue has prepended to it a field like field 836 that contains the current TQ state information for the next descriptor in the traffic queue.

Tq Head 405 and Tq Tail 407

These are implemented in fields 823 and 811, respectively. In the preferred embodiment, the identifiers are simply pointers to the descriptors. A feature of the design of TMC 203 is that to the extent possible, pointers are manipulated rather than descriptors, traffic queues, or scheduler queues.

Details of Operations Performed by TMC 203

In the following, examples of the operations performed by enqueue processor 301, traffic queue processor 305, and dequeue scheduler 303 will be described in detail, beginning with the multicast operation performed by enqueue processor 301. It is to be understood that the operations may be performed in different ways in other embodiments.

Multicasting: FIGS. 9 and 35

A packet is multicast when it comes into a switching device at one input point and is output at multiple output points. In system 201, multicasting may be done either in QMU 211 or in traffic management coprocessor 203; what is described here is multicasting in traffic management coprocessor 203, where it is done by adding copies of a TMC descriptor 216 received in an enqueue data message 601 to the traffic queues 204 specified in a multicast elaboration table 421.

Multicast Elaboration Table Details

Details of the multicast elaboration table in a preferred embodiment are shown in FIGS. 9 and 35. Format is again a table, with each row representing a field of the table and columns 903-909 indicating information about the fields. As already mentioned, TMC 203 maintains linked lists of multicast elaboration tables 421; field 911 contains the metid 420 of the next multicast elaboration table 421 in the list. If a given elaboration table 421 is the last one in the linked list, that fact is indicated by the value of field 913. An elaboration table 421 may specify up to 8 traffic queues to which copies of the descriptor may be added. The entry for a single traffic queue is shown in detail at 915; there are two fields that are of interest: 916, which contains a tqid 423 for a traffic queue 204 and 917, which indicates the whether the contents of field 916 are valid. The remainder of the table, shown at 919, is traffic queue entries 915 for the remaining traffic queues.

When multiple copies of an enqueued descriptor are multicast elaborated to multiple traffic queues destined for the same virtual output port, QMU 211 may need to be able to determine which traffic queue the copy of the descriptor came from. The field which identifies the traffic queue is traffic queue tag field 865 of the parameter block. The destination traffic queue's tag is placed in field 713 of each of the QMU descriptors made from descriptors contained in the traffic queue.

Details of Processing a Multicast Enqueue Data Message

Whether an enqueue data message 601 is unicast or multicast is indicated by field 619 of the enqueue data message. When field 619 indicates multicast, field 615 contains metid 420 for the first multicast elaboration table 421 in the MET chain to be used in the multicast. Multicast enqueue messages require extra processing time to perform multicast elaboration. The extra processing time requires that enqueue data messages 601 be buffered up while they wait to be processed by enqueue processor 301. In general, enqueue processor 301 gives strict priority to the processing of unicast enqueue data messages. There is, however, a user-configurable mechanism that guarantees that a fixed portion of the total number of descriptors processed by enqueue processor 301 will be multicast descriptors. The portion may be configured over a range extending from 1 of every 2 descriptors processed to 1 of ever 256 descriptors processed. Multicast enqueue messages that are waiting to be processed are stored in a buffer that holds up to 32 multicast enqueue messages. If a multicast enqueue message is received and the multicast enqueue message buffer is full, the multicast message will be discarded to the discard queue associated with the enqueue message source identifier (field 623 of the enqueue data message). Otherwise, the decision to discard a multicast descriptor is made independently by enqueue processor 301 for each destination traffic queue in the multicast group.

Enqueue processor 301 does not process multicast enqueue messages that are speculatively enqueued until the associated commit enqueue message is received. Thus, a speculatively enqueued multicast message will block all subsequent multicast enqueue messages until the associated commit enqueue message is received. This blocking is required to maintain dequeue packet descriptor ordering.

One use for multicast replication is in a system 201 where DCP 202 is driving a time-division multiplexed, channelized interface device that does not itself support multicast elaboration. Multicast replication can be used to transmit one copy of a packet for each destination channel.

Details of Descriptor Discard Operations

As already set forth, before enqueue processor 301 provides a descriptor to traffic queue processor 305 to be linked into a traffic queue, enqueue processor 301 determines whether the packet represented by the descriptor is to be discarded or tagged in order to avoid congestion, manage existing congestion, or recover from past congestion.

Discard and Tagging Operations

The techniques used by enqueue processor 301 to determine whether there is congestion include buffer thresholding, random early detection, and policing algorithms. What technique enqueue processor 301 uses for a particular traffic queue is determined by the traffic queue's discard configuration block 431. Congestion is dealt with as follows:

1. Selecting packet descriptors for discard in order to recover from periods of congestion.

2. Selecting non-conforming packet descriptors for discard to avoid congestion.

3. Tagging non-conforming packet descriptors, so that non-conforming packets can be selectively discarded by a downstream network element that is trying to avoid becoming congested.

4. Marking packet descriptors that have experienced congestion, so that downstream network elements can notify the originating traffic sources to slow down.

Buffer Pools and Parent Buffer Pools: FIG. 4

The buffer pool information that enqueue processor 301 uses determine whether a packet should be discarded is kept in buffer pool and parent buffer pool data structures. These structures are shown in FIG. 4. For each buffer pool, buffer pool specification 433($i$) indicates a minimum threshold, a maximum threshold, and a minimum threshold for the buffer pool's parent. These values in a buffer pool 433($j$) used by a traffic queue 204($i$) are used by enqueue processor 301 to decide whether to discard a descriptor intended for traffic queue 204($i$). Buffer pool specification 433 and parent buffer pool specification 435 are updated each time a TMC descriptor 216 is enqueued in traffic queue 204 or dequeued from traffic queue 204.

Discard Traffic Queues

Descriptors from all discard operations performed in traffic management coprocessor 203 go to one of 32 discard traffic queues 251 maintained by TMC 203. Discard traffic queues are scheduled like non-discard traffic queues. The scheduler hierarchy is commonly configured such the outputs of schedulers for discard queues go to virtual output ports dedicated to the servicing of discard traffic. These virtual output ports thus are not blocked when outbound packet traffic backs up, causing the virtual output ports 251 associated with the descriptors representing the outbound traffic packets to block scheduling of those descriptors. The packet lengths associated with discarded packet descriptors are not used in scheduler bandwidth calculations, because the time required by DCP 202 for processing discarded packet descriptors is independent of packet length. Instead, a configurable packet length ranging from 0 to 255 bytes is assigned to discard queue descriptors for scheduling purposes.

The destination discard queue for a discarded packet descriptor is chosen from one of the following sources, listed in priority order:

1. A discard queue identifier can optionally be specified in a traffic queue's discard configuration block 431.

2. If not specified by the traffic queue discard configuration, TMC 203 obtains the discard queue identifier from a table that relates sources of TMC descriptors 216 to discard queues. The identifier for the source of a TMC descriptor is obtained from field 603.

3. If not specified by the previous two sources, the discard queue identifier is specified in the traffic queue's class scheduler 503.

Overview of Kinds of Discard Algorithms

A preferred embodiment provides a number of different discard algorithms; overviews are provided here; a detailed example for one of the algorithms will be given later. There is a different format for discard configuration block 431 for each of the different discard algorithms.

Thresholding

Thresholding is used for selectively discarding packet descriptors based on buffer pool and parent buffer pool sizes under the following conditions:

1. If the traffic queue's associated buffer pool size is less than the minimum threshold, do not discard the descriptor;

2. If the traffic queue's associated buffer pool size is greater than the maximum threshold, discard the descriptor; or 3. If the buffer pool size is between the minimum and maximum thresholds and the parent buffer pool's size is greater than the parent buffer pool threshold specified by the traffic queue's selected discard configuration data, select the packet descriptor for discard; otherwise do not discard the descriptor.

Random Early Detection (RED)

Buffer pools can be configured to use random early detection (RED) for selective discard of packet descriptors associated with adaptive traffic sources. The implementation of RED used in the preferred embodiment is based on the following reference:

Floyd, Sally, and Jacobson, Van, "Random Early Detection for Congestion Avoidance," IEEE/ACM Transactions on Networking, August 1993.

The RED algorithm calculates a probability of random discard that depends on the exponentially weighted average buffer pool size and a minimum and maximum average buffer pool size threshold. Average buffer pool size is used instead of instantaneous size so that temporary bursts of traffic are not unnecessarily discarded. When RED is used with IP packets, the value of discard priority field 625 of enqueue message 601 can be used to select different RED threshold and probability parameters based on a precedence specified for the IP packet.

Policing

Rate policing is used per traffic queue to identify traffic queues whose packets are being received at a rate higher than the traffic queue's allocated or guaranteed transmission rate. Rate policing ensures that a traffic queue using more than its guaranteed rate does not adversely affect the guaranteed rates of other complying traffic queues. Rate policing can be used in conjunction with buffer pool and parent buffer pool thresholding algorithms.

Rate policing parameters include one or two sets of leaky bucket parameters: maximum sustainable rate and burst tolerance and/or maximum peak rate and delay variation tolerance. The leaky bucket conformance definitions are as defined by the ATM Forum™ 4.0 specification, extended to support variable length packets, as well as fixed length packets. The leaky buckets implemented in the TMC policing function can be configured to support all six of the ATM Forum™ 4.0 conformance definitions. The leaky buckets are another example of TMC 203's use of models of conditions outside the TMC.

Each rate policing traffic queue maintains one or two credit bucket states for enforcing rate and tolerance. When a traffic queue is initialized, each bucket is credited with its full tolerance. A credit bucket loses one byte credit for each enqueued packet byte and gains byte credits at its configured byte rate. An enqueued packet's byte count comes from the packet byte length field of its associated enqueue message, which is received through the traffic management interface.

The ATM Forum™ 4.0 conformance definitions define the action to be taken, discard or tag, when a leaky credit bucket does not have enough byte credit to accommodate an enqueued packet byte length. For example, when a peak rate leaky bucket does not have enough credit to accommodate a packet, the associated packet descriptor is always selected for discard. When a sustainable rate bucket does not have enough credit to accommodate a packet, the packet descriptor is either tagged or selected for discard depending on the conformance definition.

Message Discard Modes

When a message is carried in a sequence of fixed-length packets, each packet will have its own descriptor. In such sequences of fixed-length packets, the header of the last packet has an end-of-message (eom) flag set to indicate the packet is carrying the end of the message. There is no corresponding start-of-message flag; instead, the packet that starts the next message is identified by the fact that it follows immediately after a packet whose eom flag is set. TMC descriptors 216 representing fixed length packets have an end-of message flag which is set when the descriptor represents the last packet in the message. The EOM flag is in field 613 of the TMC descriptor. A descriptor for the start of a message is similarly identified by the fact that it follows immediately after a descriptor that has its EOM flag set.

In systems that use sequences of packets to carry a message, it is assumed that if any one of the packet descriptors that make up a message is discarded, the entire message cannot be reconstructed and all of the packets belonging to the message should be discarded. For this reason, performance can be improved if discard of the remaining packets in the message can begin immediately when a first discard has occurred. A challenge in doing this kind of discard in the context of look-aside data stream processing is making sure that the QMU descriptor 2508 corresponding to the first packet to be discarded in the message has its eom flag set, so that the channel processor processing the packet corresponding to the descriptor can properly mark the packet and recognize the QMU descriptor for the first packet of the next message.

Traffic management co-processor 203 can operate in four different messages discard modes:
  non-message discard mode,
  early packet discard mode,
  partial packet discard mode, and
  modified partial packet discard mode.

Discard modes are configured on a per-traffic queue basis. Each traffic queue may employ a number of discard modes. The discard modes are specified for the traffic queue in discard configuration blocks 433, and which discard mode of those available to a given traffic queue is to be used for a packet represented by a given descriptor in the traffic queue is specified by a field in the descriptor. Any of the modes may employ any of the techniques for deciding whether a discard is necessary.

In non-message discard mode, the end of message indicator plays no role in determining how to discard the remaining packets of a message.

In Early Packet Discard mode, the decision to accept or discard a larger message is done when the descriptor for the first packet of the message is received. When the first descriptor is discarded, so are all of the remaining descriptors for the packet's message and vice-versa. If there is more than one packet in the message, the first descriptor will not have its EOM flag set. To discard the remaining descriptors, enqueue processor 301 sets flags in traffic queue state field 861 to indicate that a descriptor for a packet belonging to a multi-packet message has been discarded and the descriptor with its EOM flag set has not yet been received. As each descriptor for a packet of the message comes in, enqueue processor 301 checks field 613 for the end of message flag. If none is set, the descriptor is discarded; if the EOM flag in field 613 is set, enqueue processor 301 discards the descriptor and sets the flags in traffic queue state field 861 to indicate that a descriptor with an EOM flag has been received. To increase the chances that an entire multi-packet message can be handled, enqueue processor 301 may discard the first packet unless the buffer pool and parent buffer pool specification indicate that large amounts of buffer space are available.

Partial Packet Discard (PPD) mode works like EPD mode if a first packet is discarded. However, it also permits discard decisions to be made on "middle packets" if the first packet was not discarded. When this is done, the packet on which the decision is made and all of the following packets except the last packet are discarded. The last packet cannot be, because it has the EOM flag required to identify the start of the next message. The last packet further contains error detection information that will indicate to the ultimate receiver of the shortened message that the message is defective.

In the look aside data stream processing context, the decision to discard a packet is of course made not on the packet itself, but rather on the TMC descriptor 216 that represents the packet. When enqueue processor 301 chooses a descriptor representing a middle packet for discard, enqueue processor 301 sets the flags in traffic queue state field 861 to indicate that a descriptor for a packet in a multi-packet message has been discarded and a descriptor with its EOM flag set has not yet been received. Enqueue processor 301 then discards descriptors up to, but not including the descriptor with the EOM flag set and resets the flags in field 861 as described above. Not discarding the last descriptor guarantees that the message as output from DCP 202 will have a last packet with its EOM flag set. Regardless of the discard mode specified for a traffic queue that is receiving multi-packet messages, enqueue processor 301 uses PPD to discard the rest of the packets belonging to a message when there are no longer any buffers in DCP 202 for storing further packets of the message. This condition is of course indicated by the buffer pool and parent buffer pool information for the traffic queue which is receiving descriptors for the message's packets.

The last message discard mode is Modified Partial Packet (MPP) mode. MPP is a special message discarding policy that is used in conjunction with packet reassembly. In reassembly, all of the descriptors that correspond to packets that make up a multi-packet message are held in TMC 203 until the last packet for the message is received and are then output in a burst to DCP 202, which assembles the packets represented by the burst of descriptors into a single packet. The fact that the packets represented by the burst of descriptors are assembled into a single packet in DCP 202 can be taken advantage of to solve a problem of PPD, namely that the truncated message produced by the PPD technique continues to use resources in system 201 and in the remainder of the network until it reaches its destination and is determined to be defective. The difference between PPD and MPPD is the treatment of the packet with the EOM flag. In MPPD, the descriptor for the "middle packet" that is being discarded not only has EOM flag 705 set, but also type field 703 set to indicate that it is a discard of a middle packet. The descriptor for the middle packet is then placed in the traffic queue 204 in which the message is to be reassembled. The remainder of the descriptors for the packets of the message, including the last packet of the message, are discarded. The descriptors representing the packets for the partial message are allowed to be scheduled. As will be explained in detail later, the descriptors are output without interleaving to the descriptor queue 247 specified by the virtual port 251 for the traffic class scheduler specified by the traffic queue. The channel processor which serves the descriptor queue 247 then reassembles the payload from the packets represented by the descriptors into the payload of a single packet. When the channel processor encounters the descriptor with the EOM flag and the middle packet discard indication, it discards the single packet with the reassembled payload.

Detailed Example of Discard: FIGS. 10 and 11

The following detailed example gives details of discard configuration block 431, buffer pool specification 433, and parent buffer pool specification 435 of and the operation of enqueue processor 301 for the case where the modified partial packet discard mode is being employed and the random early discard detection (RED) technique is being used to determine whether a packet should be discarded.

Detail of Discard Configuration Block 431

FIG. 10 shows the fields of discard configuration block 431 for this case. Discard configuration block 431 has two parts: a part 1001 and 1019 whose fields are common to all discard configuration blocks and a part 1003 whose fields 1023-1029 are particular to one of the techniques for determining when a packet should be discarded. Beginning with the common fields of part 1001 and field 10019, the format of the common part of parameter block 431 is shown at 1002 in the usual manner, with columns 1004-1006 and a row for each field. Beginning with field 1019, this field contains a code that indicates the technique used to determine whether a packet should be discarded. Here, the code is 011b, indicating that the RED discard technique is being applied.

Field 1017 may contain a tqid 423 for a discard traffic queue that is associated with discard configuration block 431; when a descriptor is discarded as specified in discard configuration block 431, it is discarded to the discard traffic queue specified in field 1017. Field 1015 indicates whether there is in fact a valid tqid in field 1017. eomControl field 1013 contains a code which specifies which of the message discard modes is to be employed with the traffic queue. Fields 1011-1008 specify threshold values for the buffer pool to which the traffic queue 204 belongs and for that buffer pool's parent. The buffer pool maximum threshold specified by fields 1010 and 1011 specify the maximum total size of the packets which may be contained in the buffer pool; if adding a new packet to the queue would exceed that limit, the descriptor for the packet is not added to the traffic queue, but is instead placed in a discard queue.

The parent buffer pool maximum threshold specified by fields 1008 and 1009 specify the amount of packet storage which is available to be shared among the buffer pools that are children of the parent buffer pool; if there is not enough shared storage for the incoming packet represented by the descriptor, the descriptor is not added to the traffic queue, but placed in a discard queue.

Field 1007 contains the part of discard configuration block 431 whose contents vary with the technique used to detect when a packet must be discarded. In FIG. 10, these fields are fields 1023-1029 of RED part 1003. The RED technique employs a minimum threshold value to determine when the technique should be applied; if the total size of the packets in the traffic queue's buffer pool is less than that after the incoming packet is added to the traffic queue, the incoming packet will not be discarded, regardless of the condition of the parent buffer pool. Fields 1027 and 1029 contain this minimum threshold value. When the total size of the packets in the traffic queue's buffer pool is between the buffer minimum threshold value and the buffer pool maximum threshold value, the RED technique uses the probability term defined in fields 1023 and 1025 together with other information stored in the buffer pool specification 403 to determine whether the packet should be discarded. Field 1021 is unused in this configuration.

Detail of Buffer Pool Specification 433: FIG. 11

Like discard configuration block 431, buffer pool specification 433 has two parts: one, shown at 1102, which is common to all buffer pool specification, and one, shown at 1103, which is particular to a given technique for determining when a packet is to be discarded. Part 1103 in FIG. 11 is the part required for the RED technique. Buffer pool specification 433 is represented in the same manner as discard configuration block 433.

Beginning with the common fields in 1102, 1107 is the field in which part 1103 is placed; 1108 contains the instantaneous (i.e. current) size of the buffer pool represented by specification 433. The value in the field is updated to track additions of descriptors to traffic queues belonging to the buffer pool or removals of descriptors from those traffic queues. In the first case, the size of the packet represented by the descriptor is added to the buffer pool instantaneous size, and in the second case, the size of the packet is subtracted from the buffer pool instantaneous size. Fields 1109 and 1110 specify the buffer pool size below which packets will not be discarded from the traffic queues belonging to the buffer pool.

sizeinPacketsNotBytes field 1111 indicates whether the buffer pool sizes are to be specified in terms of number of bytes or number of packets. Parent buffer pool identifier 1113 is the identifier for the buffer pool's parent buffer pool. Discard data configuration type 1115, finally, specifies the discard technique that is to be used by the traffic queues belonging to the buffer pool. It must specify the same technique as does field 1019 in these traffic queues. In field 1115 in the present example, it specifies the RED discard technique.

1103 shows the fields that are peculiar to the RED discard technique. The RED technique employs the average buffer size in its computations, and field 1117 is the time that value was last updated, while field 1119 contains the value itself. Fields 1121-1129 all contain values used in the RED discard technique. Fields 1101 and 1115 contain the information from common portion 1102 of buffer pool specification 433.

Figure 12:
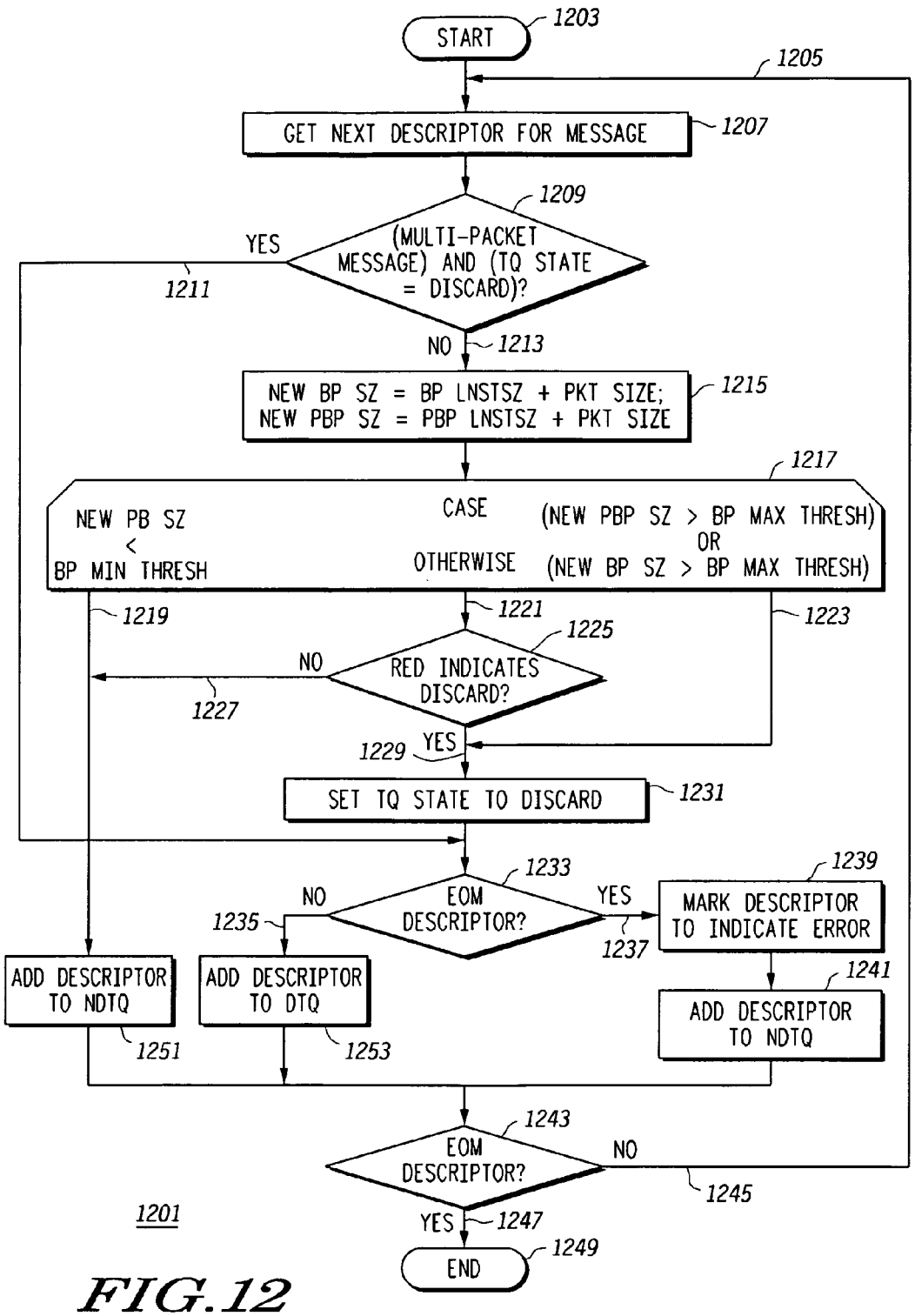
FIG. 12 is a detailed flowchart of a discard operation.

Details of the Discard Operation: FIG. 12

FIG. 12 is a flowchart of how enqueue processor 301 deals with multi-packet messages when a traffic queue's discard configuration block 431 has a type in discardDataType field 1019 indicating that the RED technique will be used to determine whether a packet should be discarded and an eomControl field 1013 indicating that the modified PPD form of partial packet discard is to be employed. As long as the traffic queue is receiving descriptors for packets in the message, enqueue processor 301 executes loop 1205 with regard to the traffic queue.

As previously explained, when enqueue processor 301 is using the MPPD algorithm to discard packets, it outputs the TMC descriptors 214 representing the packets in the message to a non-discard traffic queue 204 until one of the TMC descriptors 214 must be discarded. From this point on, enqueue processor 301 discards descriptors for the remaining packets to a discard traffic queue until it receives the descriptor for the last packet of the message. This descriptor has its EOM flag set, and enqueue processor 301 marks it to indicate an error and outputs it to the non-discard traffic queue that contains the packets of the messages that were not discarded. When a channel processor in DCP 202 that is reassembling the payloads of the packets into a single packet encounters the descriptor that has its EOM flag set and is marked defective, it discards the reassembled packet.

Continuing with details of the implementation of the algorithm in a preferred embodiment shown in flowchart 1201 of FIG. 12 and beginning with start 1203 and entering loop 1205, enqueue processor 301 first gets the next descriptor for the message. If traffic queue state fields 837 and 853 in the traffic queue's traffic queue parameter block 401 indicate that the queue is receiving descriptors for packets of a multi-packet message and that the message is to be discarded (1209), the packet represented by the descriptor will be added to a discard traffic queue; to achieve this, branch 1211 is taken; otherwise, branch 1213 is taken to block 1215. The case of a descriptor that is not part of a multi-packet message is not relevant to the present example. In block 1215, the size of the packet represented by the next descriptor is added to the value in BpSize field 1108 of the traffic queue's buffer pool specification to obtain the new value newBPsz and to the corresponding value in parent buffer pool specification 435 to obtain the value new PBPsz. These values are used together with threshold values in discard configuration block 431 for the buffer pool and parent buffer pool in case statement 1217 to determine how the descriptor will be treated.

There are three possibilities:

newBPsz is less than the value of the minimum allowance threshold of fields 1027 and 1029 of discard configuration block 431; in that case, the packet will not be discarded (branch 1219).

new PBPsz is more than the value of the maximum threshold fields 1008 and 1009 for the parent buffer pool in discard configuration block 4310R new BPsz is more than the value of the maximum threshold fields for the buffer pool in discard configuration block 431; in that case, the packet will be discarded (branch 1223).

Otherwise, the RED technique is used to determine whether the packet is to be discarded (branch 1221). The RED technique uses the probability term information in buffer pool specification 431 to make the determination.

With the first possibility, the descriptor is simply added to the non-discard traffic queue, as shown at 1251. With the third possibility, if the RED technique indicates that the packet is not to be discarded (block 1225), branch 1227 is taken to branch 1219 and the descriptor is added to the non-discard traffic queue; with the second possibility or if the RED techniques indicates that the packet is to be discarded, branch 1229 is taken, since in both cases, traffic queue state field 836 must be set to indicated that this descriptor and following descriptors are to be discarded. The state is set in block 1231.

With descriptors that are to be discarded, the next step is checking whether the descriptor has its EOM flag set (decision block 1233). When it does (branch 1237), the MPPD technique requires that the descriptor be marked as having an error and be placed on the non-discard traffic queue, which is done at 1239 and 1241. Otherwise, branch 1235 is taken and the descriptor is added to the discard traffic queue. In all cases, the descriptor is then again examined to see whether it is an EOM descriptor. If not, loop 1205 continues (branch 1245); otherwise, it terminates (branch 1247) and the processing ends (1249).

Speculative Enqueuing: FIG. 13

Speculative enqueuing is a technique which permits a receive processor 221 to provide a TMC descriptor 216 to a traffic queue 204 before receive processor 221 has received the entire packet that is represented by the descriptor 216. TMC 203 guarantees that the cp descriptor 214 contained in the TMC descriptor 216 will not be output to QMU 211 until after the entire packet has been either successfully or unsuccessfully received by receive processor 221. The receive processor does speculative enqueuing using a pair of enqueue data messages 601. The first enqueue data message contains the TMC descriptor 216 for the packet and indicates in field 611 that the packet represented by the descriptor 216 is being speculatively enqueued. When receive processor 221 has finished processing the packet, a second enqueue data message, the commit message, follows. Again, field 611 indicates that the message is a commit message. Only after the commit message has arrived will TMC 203 output the cp descriptor 214 contained in the first enqueue data message.

Speculative enqueuing is useful for guaranteeing a fixed latency for a TMC descriptor 216 from the start of the reception of the packet it represents in a receive processor 221 to being provided to a traffic queue 204. Such a fixed latency is important to applications running in DCP 202 which distribute processing of packets received from a single, high bandwidth stream of packets (like an OC48c packet stream) among a number of receive processors 221. With distributed receive packet processing, care must be taken to ensure that descriptors are provided to the traffic queues in the same order in which they were received. Within DCP 202, the order is preserved by setting up the receive processors so that they process the packets in strict round-robin order and output the TMC descriptors 216 for the packets they are processing to QMU 215 in the same strict round-robin order, so that the order of the descriptors in the descriptor queues 213 is correct. The fixed latency between start of packet reception and enqueue in a traffic queue 204 provided by the speculative enqueue mechanism decouples receiving the entire packet from providing the descriptor to TMC 203 and thus enables this strict round-robin processing of descriptors to take place without the reduction in receive bandwidth that would occur if a channel processor receiving a smaller packet were blocked until a channel processor receiving a larger packet had received its entire packet.

Continuing in more detail, in a preferred embodiment, field 623 of the commit enqueue data message identifies the source of the packet being speculatively enqueued, i.e., the receive processor that received the packet represented by the descriptor. When the entire packet has been received in receive processor 221, receive processor 221 sends the commit enqueue data message. The commit enqueue data message is shown in detail at 1301 in FIG. 13. Commit enqueue data message 1301 contains only type field 611 and source identifier field 623. Type identifier field 611 can be set either to indicate either commit with success, indicating that the packet was correctly received, or commit with failure, indicating that the packet was not correctly received. Since the same receive processor receives the entire packet, source identifier field 623 in the dequeue data message is set to the same value as in the enqueue data message for the descriptor representing the packet.

When the commit enqueue message comes in, traffic queue processor 305 uses the value of source identifier field 623 in the TMC descriptor sent in the commit enqueue message to match the commit enqueue message with the TMC descriptor 216 from the corresponding speculative enqueue message. In a preferred embodiment, the process of matching is simplified by the fact that there are only a small number of receive processors in DCP 202 and the fact that a given source can have only one outstanding TMC descriptor 216 from a speculative enqueue message in a given traffic queue. When the match is made, traffic queue processor 305 sets the value of field 611 in the speculatively-enqueued TMC descriptor 216 as determined by the value of field 611 in the commit message; if the field in the commit message indicates "commit with success", traffic queue processor 305 sets the value of field 611 in the speculative enqueue message to indicate a normal enqueue message; if the field indicates "commit with failure", traffic queue processor 305 sets the value of field 611 in the speculative enqueue message to indicate a normal enqueue message with failure. When the modified speculative enqueue message's descriptor reaches the head of its traffic queue, is scheduled, and is dequeued to queue management unit 211, the dequeue data message for the descriptor has a value in field 703 which corresponds to the value to which field 611 was set by the commit message. Queue management unit 211 in a preferred embodiment passes field 611 on to the channel processor which is processing the descriptor and the channel processor determines what to do if field 611 indicates that the speculative enqueue failed. In most cases, of course, the channel processor will cause the packet to be discarded.

An important aspect of speculative enqueuing is its effect on scheduling. Since the cp descriptor 214 in a speculatively-enqueued TMC descriptor 216 cannot be output to QMU 211 until the commit message has been received, a traffic queue 204 whose head TMC descriptor 216 is a speculatively-enqueued descriptor for which no commit message has yet been received is ineligible for scheduling. Consequently, when such a traffic queue reaches the head of a scheduler queue 523, traffic queue processor 305 removes the traffic queue 204 from the scheduler queue 523 before the TMC descriptor 216 is serviced, placing it in the ineligible traffic queues associated with the traffic queue's traffic class scheduler 503. When traffic queue processor 305 receives the commit message that makes the traffic queue 204 eligible, traffic queue processor 305 returns the traffic queue 204 to a scheduler queue for the traffic class scheduler.

Details of Operations Performed by Dequeue Scheduler 303

Dequeue scheduler 303 executes the schedulers in scheduler hierarchy 501 and thereby performs TMC 203's scheduling, shaping, and segmenting and reassembly functions. The discussion will begin with a general discussion of the schedulers available in a preferred embodiment of TMC 203, will then discuss the scheduling, shaping, and segmenting and reassembly algorithms employed by the schedulers of the preferred embodiment, and will finally provide detailed examples of schedulers and the manner in which they are implemented and executed.

Schedulers in TMC 203

As already pointed out in overview, dequeue scheduling is done by a scheduling hierarchy 501 that is extensively configurable by users of TMC 203; in the following, the kinds of schedulers, the ways in which they are configured, and the manner in which they operate will all be described in detail.

As shown in the overview, schedulers are classified in hierarchy 501 according to their positions in the hierarchy: traffic class schedulers 503 are at the leaf nodes and interior schedulers 509 are in the interior nodes. A scheduler in the preferred embodiment may use the following kinds of scheduling algorithms to select a scheduler queue 523 for output from among the scheduler's input scheduler queues 523:

strict priority, in which the output scheduler queue 523 is selected according to a strict priority among the input scheduler queues 523;

round robin;

weighted fair share, where each input scheduler queue is given a weight and the share of bandwidth received by a given input scheduler queue is determined by the relationship between the given input scheduler queues weight and the total weights of all of the input scheduler queues.

frame-based deficit round-robin, which provides weighted fair share scheduling based on packet byte length; and grouped weighted fair queuing, which apportions available bandwidth among input traffic queues whose descriptors represent fixed-size packets.

In the preferred embodiment, a traffic class scheduler 503 may be configured to use any of the above scheduling algorithms, but an interior scheduler 509 may be configured to use only the strict priority, round-robin, or weighted fair share algorithms. Of course, different kinds of schedulers may be employed at different points along the path 209 taken by a scheduler queue through hierarchy 501.

Configuring Schedulers: FIG. 14

FIG. 14 shows the resources that are available in a preferred embodiment to a user who is configuring a scheduler. These resources make up what will be termed in the following a logical scheduler 1401. A user configures a traffic class scheduler or an interior scheduler by selecting among the resources offered by logical scheduler 1401. The resources include a strict priority scheduler 1407, an excess scheduler 1415, and a guaranteed scheduler 1413.

The three schedulers 1413, 1415, and 1407 relate to each other as follows: guaranteed scheduler 1413 guarantees that a portion of the total bandwidth available to be scheduled by scheduler 1401 will be available to be shared among the input scheduler queues for logical scheduler 1401. If the guaranteed portion shares does not completely use up the bandwidth, each of the scheduler queues is further eligible to receive and use part of the unguaranteed portion of the bandwidth. Excess scheduler 1415 may be used to schedule this unguaranteed portion of the bandwidth. Thus, if a scheduler queue 523 cannot be selected by scheduler 1413 because it has already used its guaranteed bandwidth, the scheduler queue is still eligible to be selected by excess scheduler 1415, which schedules the unguaranteed portion of the bandwidth. Output 1409 of scheduler 1413 and output 1411 of scheduler 1415 go to strict priority scheduler 1407, which gives any scheduler queue selected by scheduler 1413 priority over any scheduler queue selected by scheduler 1415. The scheduler queue output by logical scheduler 1401 at output 1403 is the one selected by scheduler 1407.

Continuing in more detail with possible configurations, in a preferred embodiment, the guaranteed scheduler is always configured as a non-work conserving weighted fair queuing scheduler; a form of weighted fair queuing scheduler which is of particular interest in the preferred embodiment is the frame-based deficit round robin scheduler. The excess scheduler may be configured as a strict priority scheduler, a round-robin scheduler, or a work-conserving weighted fair queuing scheduler. When the guaranteed scheduler is configured as a non-work-conserving weighted fair queuing scheduler, the excess scheduler may be configured as a strict priority scheduler, a round-robin scheduler, or a weighted fair queuing scheduler.

Details of the Algorithms Used by Schedulers

Of the algorithms used by schedulers in the preferred embodiment, round robin and strict priority need no further explanation; in the following, weighted fair queuing, frame-based deficit round robin, and grouped weighted fair queuing are discussed in more detail.

Weighted Fair Queuing

Weighted fair queuing dynamically applies priorities, or weights, to different flows of traffic passing through system 201. Flows of traffic which have lower weights get a greater share of the bandwidth available to all of the flows, and the amount of bandwidth available to a given flow varies with the current number and weights of the flows. The advantage of weighted fair queuing is that traffic such as interactive traffic which requires immediate transmission can receive lower weights, while traffic which does not require immediate transmission can receive higher weights. None of the varieties of traffic will block the other and all will get the type of access they require. In general terms, the fractional amount of service or bandwidth that an input session receives when a weighted fair queuing algorithm is used is equal to that session's weight divided by the sum of the weights of all input sessions. In TMC 203, each of the scheduler's active and schedulable input scheduler queues 523 represents an input session.

Many papers have been published that define variations of a "weighted fair queuing" algorithm for packet traffic. These variations of a weighted fair queuing algorithm are all derived from the generalized processor sharing (GPS) model and all have different fairness characteristics. The variation of the algorithm used in a preferred embodiment of TMC 203 attempts to achieve the best delay and fairness properties with the least complexity.

A weighted fair queuing scheduler in the preferred embodiment may be configured as either a work-conserving or a non-work-conserving scheduler. A work conserving scheduler will always service an input scheduler queue if the scheduler queue is active and schedulable. The goal with the work conserving scheduler is to provide perfect interleaving of scheduler inputs to generate constant rates at which the scheduler's input scheduler queues are serviced with minimal burstiness. The work conserving scheduler assumes that the rate at which a scheduler may output a scheduler queue may be variable, and thus the system potential or virtual time function used in the preferred embodiment's weighted fair queuing algorithm does not advance at the rate of real time, but instead advances by the amount of service provided. In a non-work-conserving scheduler, the input scheduler queue is not serviced until a particular moment in real time has occurred. Until that moment occurs, the traffic queue that will be the next to receive service remains at the head of the scheduler queue, unless it is removed because it has become ineligible.

Frame-Based Deficit Round Robin

The frame-based deficit round robin scheduling algorithm is used for traffic streams consisting of variable-length packets. It provides weighted fair share apportioning of available service bandwidth among traffic queues that typically don't require bandwidth guarantees or have strict jitter and delay requirements. The algorithm is particularly useful for TCP traffic, which typically consists of a mixture of long message packets and much shorter acknowledgement packets.

In the preferred embodiment, the algorithm is employed in a traffic class scheduler 503. A frame-based deficit round robin traffic class scheduler has three input scheduler queues: one is termed the high priority scheduler queue; the other two are termed the current scheduler queue and the next scheduler queue. The traffic class scheduler 503 schedules only the high-priority scheduler queue and the current scheduler queue, with the high-priority scheduler queue having priority over the current scheduler queue. Scheduler 503 schedules the current scheduler queue until it becomes empty; at that point, it swaps the current scheduler queue and the next scheduler queue. Traffic queues that become eligible are added to the next scheduler queue and traffic queues that have received their share of service over a time interval are removed from the current scheduler queue or the high priority scheduler queue and added to the next scheduler queue. Traffic queues that become ineligible are removed from the high priority or current scheduler queue.

The FBDRR algorithm moves traffic queues between the high priority scheduler queue and from both of those scheduler queues to the next scheduler queue. The traffic queues are moved according to two traffic queue parameters in the FBDRR scheduler and two counter values in each traffic queue. The parameters are the following:

a maximum quantum which specifies the maximum amount of service the traffic queue may receive before it is moved from the high priority scheduler queue or the current scheduler queue to the next scheduler queue and a minimum quantum, which specifies the amount of service the traffic queue will receive before it is moved from the high priority queue to the current scheduler queue.

The counters are a deficit counter and a BytesServedThisRoundCounte-r. The values are stored in scheduler state field 845 in the traffic queue's parameter block 403.

When the scheduler begins scheduling the current scheduler queue, the deficit counter for each traffic queue in the current scheduler queue is set to the current value of the deficit counter plus maximum quantum and the BytesServedThisRoundCounter for the traffic queue is set to 0. Each time a given traffic queue reaches the head of the current scheduler queue or the high priority queue, the packet length specified in the head descriptor is subtracted from the current value of the deficit counter and the packet length is added to the BytesServedThisRoundCounter. There are three results of interest:

If the result of the subtraction is positive and the result of the addition is less than minimum quantum and the given traffic queue is not already in the high priority scheduler queue, the given traffic queue is moved from the current scheduler queue to the high priority scheduler queue.

If the result of the subtraction is positive and the result of the addition is more than minimum quantum, the traffic queue remains in the current scheduler queue if it is already there; otherwise, it is moved to the tail of the current scheduler queue; in either case, BytesServedThisRound is set to 0.

If the result of the subtraction is negative, the given traffic queue is removed from the current scheduler queue or the high priority queue and placed in the next scheduler queue. When this is done, deficit counter is set to deficit counter plus maximum quantum and BytesServedThisRound is set to 0. Adding deficit counter to maximum quantum gives the traffic queue the opportunity to receive the service in the next round that it could not receive in this round.

The high priority scheduler queue and the rules for placing traffic queues on and removing them from the high priority scheduler ensure that traffic queues whose head descriptors represent packets that are smaller than the minimum quantum parameter get priority service. This in turn ensures that descriptors for TCP acknowledgement packets are quickly scheduled. Another version of the FBDRR algorithm requires only the current scheduler queue and the next scheduler queue. In this version, a traffic queue that would have satisfied the conditions for being moved to the high priority scheduler queue simply remains at the head of the current scheduler queue until it satisfies the conditions for being moved to the next scheduler queue.

Grouped Weighted Fair Queuing

A traffic class scheduler may employ a grouped weighted fair queuing algorithm. This algorithm is similar to the weighted fair queuing algorithm but has been modified for apportioning service bandwidth among groups of traffic queues that have a common service weight and packet service interval. This algorithm allocates a weighted fair share per traffic queue, as opposed to a weighted fair share per input scheduler queue.

The grouped weighted fair queuing scheduler functions as follows:

1. All traffic queues assigned to the same input scheduler queue share the same service weight and the same packet service interval. In other words, the scheduler supports a fixed set of weights, one weight for all the traffic queues in each input scheduler queue, and it is assumed that all traffic queues belonging to the same input scheduler queue carry packets of the same size. 2. The scheduler guarantees a weighted fair share for each eligible traffic queue, but a traffic queue's guaranteed bound on worst-case initial latency can be affected by the number of eligible traffic queues in that traffic queue's scheduler queue. This scheduling algorithm is useful for guaranteeing bandwidth or apportioning available bandwidth among traffic queues that carry fixed size packets, such as ATM cells.

Details of Shaping

Shaping in TMC 203 is defined as the mechanism used to delay dequeuing of packet descriptors from traffic queues or aggregations of traffic queues to achieve desired dequeue transmission rate characteristics. In TMC 203, shaping is implemented in schedulers that use non-work conserving weighted fair queuing algorithms. Such schedulers can be configured to delay service to an active traffic stream so that the traffic stream's dequeue service rate is no greater than a specified maximum rate over a given time period. With all shaped scheduling, short-term dequeue rates are likely to be bursty and at times exceed the desired rate limit, due to the jitter and delay introduced by the multiplexing of large numbers of active scheduler inputs.

Configuring Schedulers for Shaping

A number of techniques can be used to configure logical scheduler 1401 for shaping. The basis for all of them is configuring guaranteed scheduler 1413 as a non-work-conserving scheduler and allocating no bandwidth to excess scheduler 1415. In particular, when a grouped weighted fair queuing algorithm is used in guaranteed scheduler 1413, each traffic queue input is shaped to the rate specified by the weight of the input scheduler queue to which the traffic queue belongs.

when the traffic class scheduler is scheduling variable-length packet traffic, the traffic queues carrying the traffic can be individually shaped by configuring the traffic class scheduler as a weighted fair queuing scheduler and limiting each input scheduler queue to a single traffic queue carrying variable packet length traffic.

Shaping Using Dual Leaky Buckets

Dual leaky bucket scheduling in the Q5 is limited to scheduling fixed length traffic in a manner that restricts the dequeuing to both a peak rate in the short term, and a sustained rate over some longer term. It is supported through pairs of scheduler queues 523 connected to a non-work-conserving-weighted-fair-queuing traffic class scheduler 503 operating in grouped mode. The even numbered scheduler queue of each pair should be configured to output packets at the desired primary rate. The odd numbered scheduler queue should be configured to output packets at the sustained rate. When a traffic queue needs to be added to a scheduler queue, a sustained rate leaky bucket algorithm is used to determine whether, if the packet were transmitted now, it would violate the sustained rate leaky bucket. The state information for the sustained rate leaky bucket is saved on a per traffic queue basis in the traffic queue's parameter block 403 in police2 field 816. For this reason, traffic queues 504 for which the discard policy is dual policing cannot specify schedulers that schedule according to the dual shaping algorithm. The traffic queue 504 must further specify dual shaping in its scheduler input configuration 3011 (FIG. 30) and must select appropriate constants in the input configuration. The constants must define which pair of scheduler inputs are being used, the leaky bucket period measured in packets, and the leaky bucket limit.

When a traffic queue 204 initially becomes eligible, it will placed on the scheduler queue configured at the primary rate, and leaky bucket state information will be saved in the traffic queue's police2 field 816. The traffic class scheduler will return schedule state information when the descriptor is served that will be stored in the traffic queue's schedule state field 845. The stored value will be passed back to the traffic class scheduler the next time the traffic queue is at the head of its scheduler queue. The schedule state information contains an enable time that will prevent the traffic queue from being served until the appropriate time for that rate.

Every time a traffic queue becomes eligible and is added to a scheduler queue, the leaky bucket state in the police2 field is investigated to determine if servicing the packet represented by the descriptor at the head of the traffic queue now would violate the sustained rate leaky bucket. If it would violate the rate, the packet's descriptor is placed on the sustained rate scheduler queue instead of the primary rate queue. Additionally, an eligible time value is set in the traffic queue's parameter block 403 that prevents the traffic queue from being serviced before the eligible time is reached. When the eligible time is reached and the traffic queue is serviced, the traffic queue (if still eligible) will be returned to the end of the sustained rate queue.

Segmentation and Reassembly

System 201 can transform a message carried in a long packet into a message carried in a sequence of short packets and a message carried in a sequence of short packets into a message carried in a long packet. The first of these transformations is called segmentation and the second is called reassembly. An example is an IP packet that is carried as the payload of a sequence of ATM packets. In segmentation, the IP packet is segmented into the payloads of the sequence of ATM packets; in reassembly, the payloads of the sequence of ATM packets are reassembled into the IP packet.

In system 201, both segmentation and reassembly involve operations on cp descriptors 214. In the case of segmentation, a single descriptor 214 for the long packet becomes a sequence of descriptors for the short packets; in the case of reassembly, a sequence of descriptors 214 for the short packets becomes a single descriptor 214 for the long packet. In the preferred embodiment, both of these operations involve traffic queues in TMC 203 and are done in traffic class schedulers 503. A traffic class scheduler used for segmentation is termed a segmenting scheduler and one used for reassembly is termed a reassembling scheduler. In the preferred embodiment, the user can configure a traffic class scheduler to be a segmenting or reassembling scheduler. Traffic queues that are configured to specify segmenting or reassembling schedulers are further termed segmenting or reassembling traffic queues respectively. With segmentation, parameter values used in the segmentation are specified when the segmenting scheduler is configured; with reassembly, parameters for the reassembly operation are specified when the reassembling traffic queue is configured.

Details of Segmentation

With a segmenting traffic queue, a single TMC descriptor 216 that has reached the head of the segmenting traffic queue will cause a sequence of QMU descriptors 2508 to be generated. Each QMU descriptor in the sequence will contain a copy of the enqueued descriptor and a progress indicator (field 715) that allows the channel processor in DCP 202 that is transmitting the packets corresponding to the QMU descriptors in the sequence to be able to determine which bytes of the payload of the packet represented by the single TMC descriptor from which the sequence of QMU descriptors is generated need to be fetched to form the packet represented by each QMU descriptor in the sequence.

The number of QMU descriptors in the sequence and the value of the progress indicator in each of the QMU descriptors are determined using the following information:

info field 836 in the traffic queue's traffic queue parameter block 403; in a reassembling traffic queue, the value of this field is the length of the packet represented by the descriptor presently at the head of the traffic queue;

a segment size field in the segmenting scheduler; the value of this field is the total size of each packet in the sequence;

a payload size field in the segmenting scheduler; the value of this field is the maximum size of the payload in each packet of the sequence; and an overhead size field in the segmenting scheduler; the value of this field is the difference between the sizes specified in the segment size field and the payload size field.

All sizes are measured in bytes.

The number of dequeue data messages which the segmenting scheduler generates from an enqueue message for a descriptor representing a single variable length packet is calculated as follows:

number of segments=ceiling((packet length+segmentation overhead size)/segment payload size)

Each dequeue data message 701 belonging to the sequence includes a packet byte remainder value in field 715 that which indicates how much of the payload of the packet being segmented remained before this descriptor of the segment was produced.

To provide an example: the descriptor at the head of the segmenting traffic queue represents a packet with a total length of 157 bytes; it will be segmented into a sequence of fixed-length packets, each of which has a total length of 60 bytes, of which 48 is payload. The result of the segmentation is the following sequence of 60-byte packets:

| Packet No. | Payload bytes in packet | Remainder |
|---|---|---|
| 1 | 0-47 | 157 |
| 2 | 48-95 | 109 |
| 3 | 96-143 | 61 |
| 4 | 144-157 | 13 |

In this example, the channel processor in DCP 202 which is receiving the QMU descriptors 2508 from produced by the segmenting scheduler is programmed to produce 60-byte packets with the appropriate headers and trailers. Using the remainder value from the QMU descriptor and the length of the original packet (contained in the QMU descriptor's cp descriptor 214), the channel processor can determine which bytes of the original packet's payload need to be fetched from buffer management unit 227 to be incorporated into the 48-byte payload of each 60-byte packet and whether a given 60-byte packet is the first packet in the sequence containing the original packet's payload, a middle packet, or the final packet.

As may be seen from the fact that segmentation is performed by the traffic class scheduler, the decision to discard a packet is unaffected by whether its destination is a segmenting traffic queue. With regard to scheduling, the descriptor in each separate dequeue data message is separately scheduled; consequently, dequeue data messages containing QMU descriptors for packets in the sequence of packets may be interleaved with other dequeue data messages. The scheduling mechanisms used for descriptors made by segmenting traffic queues are the same as for other descriptors. The only difference is that the packet length value used to schedule the descriptor is retrieved from the segment size field instead of from the size specified in the TMC descriptor 216.

Reassembly

Reassembly involves combining the payloads of a sequence of packets to form the payload of a single packet. DCP 202 does the combining. To do the combination on its own, DCP 202 must maintain various pieces of state in order to correctly reconstruct the large packet out of the sequence of smaller packets. TMC 203 minimizes the state required in DCP 202 to do combination by organizing the dequeuing of QMU descriptors 2508 for the sequence of packets from TMC 203 such that the QMU descriptors representing the packets required for the large packet are output via the virtual output port 521 for the reassembling scheduler without being interleaved with other QMU descriptors output via the virtual output port. The role of the reassembling traffic queue in reassembly is to provide the sequence. A problem with reassembly is the amount of resources in TMC 203 that are tied up in storing descriptors until all of the descriptors in the sequence have been received and the descriptors can be output. Reassembly as implemented in TMC 203 deals with this problem in two ways:

employing the modified PPD discard algorithm to discard all of the received descriptors in a sequence as soon as one of the descriptors in the sequence has been discarded; and employing a timeout mechanism to determine that the flow of packets in a sequence has been interrupted; when the interruption is detected, the descriptors for the sequence are discarded using the modified PPD discard algorithm.

When TMC 203 has output the sequence of QMU descriptors 2508 in a single non-interleaved burst to the descriptor queue specified by the reassembling scheduler's VOP 251, a channel processor in DCP 202 can process the QMU descriptors 2508 to combine the payloads of the sequence of packets into a single large packet and can provide the TMC descriptor 216 for the large packet to TMC 203 in an enqueue data message 601 for scheduling in the usual fashion. When TMC 203 outputs the dequeue data message containing the QMU descriptor 2508 for the large packet, the large packet is output by another channel processor in DCP 202. Reassembly thus provides a good example of the kinds of complex interactions between TMC 203 and DCP 202 that are possible in system 201.

In the kinds of traffic with which reassembly is employed, the packets belonging to the sequence of packets whose payload is to be reassembled into a larger packet arrive in DCP 202 from their source in a stream of traffic which has the following characteristics:

packets are received in the order in which they are sent by the source;

the source does not interleave packets belonging to different sequences of packets; and packets belonging to sequences sent by different sources may be interleaved.

The last packet in a sequence is marked as containing the end of the message.

TMC 203 has been configured such that there is a traffic queue corresponding to each source of sequences of packets to be reassembled in TMC 203 and the receive processor(s) handling the stream of traffic that includes the sequences specify the traffic queues corresponding to the sources in the TMC descriptors 216 that they send to TMC 203. Thus, the traffic queue that is receiving the TMC descriptors 216 for a sequence from a given source receives the TMC descriptors in the order in which they were received in DCP 202, but without any interleaved TMC descriptors from other sources. The channel processor marks the TMC descriptor for the last packet in the sequence to indicate that its packet is an EOM (end of message) packet. The traffic queue that receives the descriptors for the packets that are to be reassembled thus contains one or more non-interleaved sequences of TMC descriptors, each sequence of descriptors corresponding to a sequence of packets from the source to which the traffic queue corresponds and representing a sequence of packets which has been received in DCP 202 and has not yet been reassembled. If the packets belonging to the last sequence of packets have not yet all arrived in DCP 202, the last sequence of descriptors will not include a descriptor that indicates that its packet is an EOM packet.

A reassembling traffic queue 204 is ineligible for scheduling if the TMC descriptor 216 at the head of the traffic queue belongs to a sequence of TMC descriptors 216 which does not yet include a TMC descriptor 216 that is marked as representing an EOM packet. Like any other ineligible traffic queue, a reassembling traffic queue that is ineligible when it is to be serviced is removed from the scheduler queue. When the EOM descriptor arrives, traffic queue processor 305 again places the traffic queue in a scheduler queue. The state information that traffic queue processor 305 uses to determine whether the EOM descriptor for a sequence has arrived is contained in field 861 of the traffic queue's parameter block 403.

When the traffic queue 204 is at the head of the scheduler queue and scheduler hierarchy 501 selects the scheduler queue, the output of the sequence of descriptors at the head of the traffic queue begins. At this time, the schedulers in the path 209 taken through the scheduler hierarchy by scheduler queues from the reassembling traffic class scheduler 293 up to the virtual output port are locked, to keep other scheduler queues that use the same virtual output port from being scheduled, and the traffic queue remains at the head of its scheduler queue until all of the descriptors in the sequence have been output. When the descriptor that is marked EOM is output, the locked schedulers are unlocked and the traffic queue is removed from the head of its scheduler queue. The sequence of descriptors at the head of the traffic queue is thus output from its traffic queue 204 to the descriptor queue 213 in QMU 217 corresponding to the path's virtual output port in the order in which the sequence of packets to which the sequence of descriptors correspond was received in DCP 202. TMC descriptors 216 intended for enqueuing in traffic queues belonging to reassembling schedulers may be discarded in the same fashions as descriptors intended for enqueuing in other traffic queues. The discard mode used in a preferred embodiment is the MPPD mode.

A problem with the reassembly technique as just described is detecting descriptors from a malformed message, i.e., a message that does not have an EOM marker. The sequence of TMC descriptors representing such a message will never receive a marked last descriptor, and consequently, when the first TMC descriptor in the sequence reaches the head of the traffic queue, the traffic queue will become ineligible and will remain so forever. Traffic queue processor 305 detects this situation using a generalized method for tracing inactivity of traffic queues that can assist in locating malformed sequences and releasing their resources. The generalized inactivity tracing is an implementation of the "clock sweep" method. Periodically, field 869 of the traffic queue's parameter block 403 is marked as having been swept a first time. Any enqueue activity on the traffic queue will clear the "swept once" indication. When the "clock sweep" passes a traffic queue on the next pass of clock sweeping, field 869 is either remarked as having been swept once if it had been cleared by enqueue activity since last sweep, or marked as having been swept two or more times if it had not been cleared. Any traffic queue that is marked as having been swept two or more times must have been idle for at least as long as the periodicity of the sweep.

With a reassembly traffic queue, the generalized clock sweep is used to cause a traffic queue to "timeout" a reassembly in progress after field 869 has been marked as having been swept twice. When a timeout happens, field 861 is set to indicate that the traffic queue is disabled and the traffic queue is placed in an active scheduling queue. The sequence of descriptors for the malformed message is dequeued from TMC 203 as described above, but when the final packet of the malformed sequence is dequeued, the fact that field 861 has been set to indicate that the traffic queue is disabled causes dequeue scheduler 303 to mark the final packet with a special EOM indicator that indicates that the sequence terminated early and that the traffic queue has been disabled. When the channel processor in DCP 202 that is receiving the descriptors for the payloads to be reassembled receives the descriptor with the EOM indicating a malformed message, the channel processor discards the payloads corresponding to the descriptors. As a consequence of the need to maintain per-traffic queue state for reassembly, reassembling traffic class schedulers may not use scheduling algorithms that also require per-traffic queue state for scheduling. In the preferred embodiment, the frame-based deficit round-robin and grouped weighted fair queuing algorithms require per-traffic queue state for scheduling.

Details of the Implementation of Schedulers

In a preferred embodiment, schedulers are implemented in scheduler memory 1515 internal to TMC IC 1503 and are configured by setting scheduler state in memory 1515. Each scheduler is referred to by its level in scheduler hierarchy 501 and its number in the level, and a given input to a scheduler is referred to by the scheduler's level, number in the level, and number of the input. In a preferred embodiment, each level has a range of values which can be used to specify scheduler inputs at that level, the scheduler's number is an offset in the range, and the inputs belonging to the scheduler are the inputs between the offset and (number of the scheduler's inputs—1). An input may belong to only one scheduler. In a preferred embodiment, 32 inputs are available to the single level 0 scheduler, 512 inputs are available to level 1 schedulers, 4K inputs are available to level 2 schedulers, and 8K inputs are available to level 3 schedulers. As previously mentioned, the leaves of the scheduler hierarchy are always traffic class schedulers 503 and the interior nodes interior schedulers 509.

Figure 21:
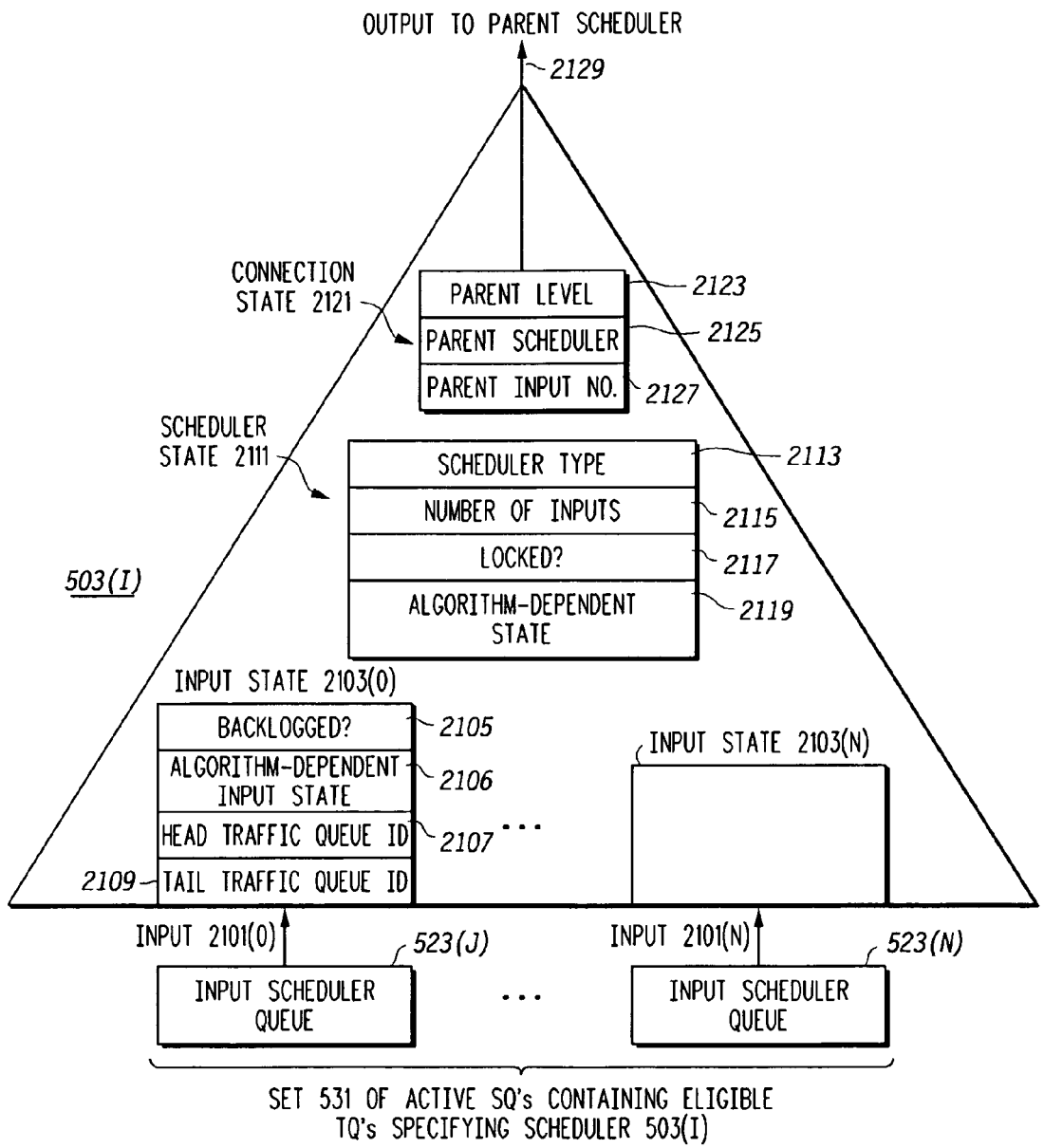
FIG. 21 is a detailed diagram of a traffic class scheduler 503.

Details of traffic Class Schedulers 503: FIG. 21

FIG. 21 shows the information which defines a particular traffic class scheduler 503(*i*)'s position in hierarchy 501 and its behavior in a preferred embodiment. Since traffic class scheduler 503(*i*) is a leaf in the hierarchy, its set of input scheduler queues is a set 531 of active scheduler queues 523 whose traffic queues 204 specify traffic class scheduler 503(*i*). For each of its inputs 2101, traffic class scheduler 503(*i*) maintains input state 2103 for the scheduler queue 523 associated with input 2101. The input state 2103(*i*) for a given input 2101(*i*) includes whether the input is backlogged (field 2105), i.e., whether the input's associated scheduler queue 523(*j*) is active, algorithm-dependent input state 2106, and the identifiers 2107 and 2109 of the head traffic queue and the tail traffic queue in the scheduler queue 523 associated with the input 2101 Algorithm-dependent input state 2106 is state concerning the input scheduler queue that varies according to the scheduling algorithm used by the scheduler.

The place of traffic class scheduler 503(*i*) in hierarchy 501 is specified by connection state 2121, which defines the interior scheduler 509 and input thereof to which scheduler 503(*i*) outputs the backlogged scheduler queue 523 selected by scheduler 503(i). That interior scheduler is termed the parent of scheduler 503(i). Connection state 2121 includes the level 2123 in hierarchy 501 to which the parent belongs, the number 2125 of the scheduler in that level, and the input 2127 of the parent to which scheduler 503(i) is outputting the scheduler queue that it selects.

How traffic class scheduler 503(i) schedules the scheduler queues associated with its inputs is determined by scheduler state 2111. Scheduler type 2113 specifies the scheduler type, and consequently the algorithm used by the traffic class scheduler, as well as whether it is a segmenting or reassembling scheduler; number of inputs 2115 specifies the number of inputs 2101 belonging to the traffic class scheduler; locked? 2117 is used to lock scheduler 503(i) while a reassembling scheduler 503 whose path through hierarchy 501 includes the same virtual output port 521 as scheduler 503(i) is outputting a sequence of descriptors. The contents of algorithm-dependent state 2119 depends on the scheduler type specified at 2113 and includes the information needed to configure the scheduler type and state needed to execute its scheduling algorithm.

Figure 22:
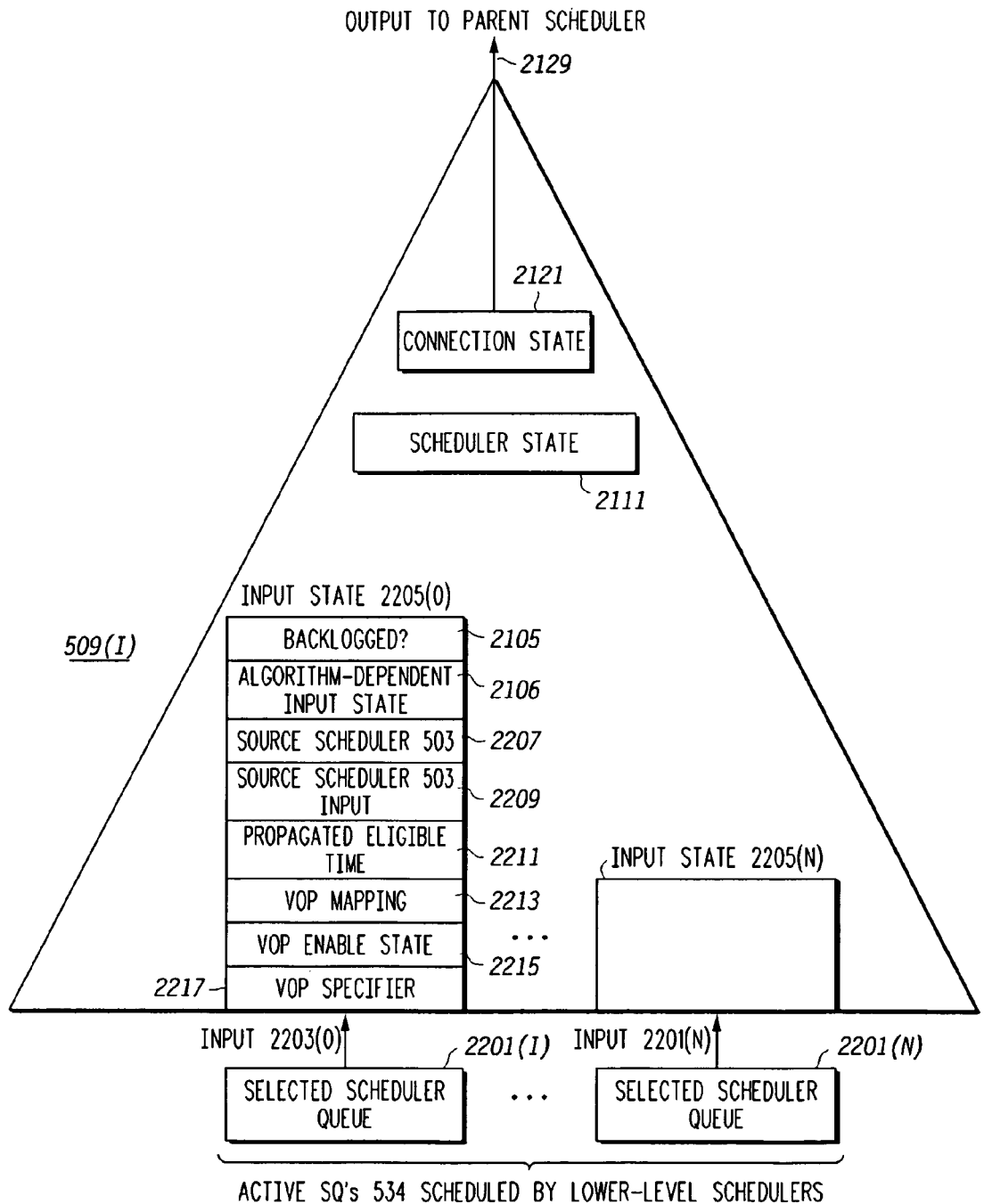
FIG. 22 is a detailed diagram of an interior scheduler 509.

Details of Interior Schedulers 509: FIG. 22

FIG. 22 is a detailed block diagram of an interior scheduler 509(i). Connection state 2121 and scheduler state 2111 are the same for interior scheduler 509(i) as for a traffic class scheduler 503. The functional difference between interior scheduler 509(i) and a traffic class scheduler 503 is that interior scheduler 509(i) is an interior node of scheduler hierarchy 501, and consequently, interior scheduler 509(i) schedules a set 534 of scheduler queues whose membership is determined by the activities of schedulers that are below scheduler 509(i) in hierarchy 501. This functional difference is reflected in input state 2205, which contains information that permits scheduler 509(i) to locate the scheduler queue 523 which is currently bound to the input and to determine whether that scheduler queue is not only active, but also schedulable.

Input state 2205 for input 2203(0) is shown in detail at 2205(0). Field 2105 indicates whether selected scheduler queue 2201(i) is active and schedulable. Field 2106 contains algorithm-dependent input state, as described with regard to FIG. 21. Fields 2207-2209 contain information about scheduler queue 2201(i) that is propagated from the scheduler queue's traffic class scheduler 503. Source scheduler field 2207 and source scheduler input field 2209 permit location of the head and tail pointers for the scheduler queue; propagated eligible time 2211 indicates the time at which scheduler queue 2201 is next eligible to be scheduled in non-work-conserving scheduling algorithms.

Fields 2213-2217 contain information about any virtual output port 521(k) that is on the path between scheduler 509(i) and the traffic class scheduler 503 which is the source of scheduler queue 2201(i). Field 2213 indicates whether there is such a virtual output port; if there is such a virtual output port, field 2215 indicates whether the descriptor queue 213 corresponding to virtual output port 521(k) can take further descriptors, and thus whether scheduler queue 2201(i) is schedulable. VOP specifier field 2217 contains the identifier for the virtual output port; when a QMU descriptor 2508 is output from TMC 203, this field in the scheduler 509 at level 0 is the source of the VOP identifier specified in field 707 of QMU descriptor 2508.

Details of Virtual Output Ports: FIG. 27

FIG. 27 shows the data structured employed in a preferred embodiment to implement a virtual output port 521(i). Field 2701 contains the current credits available to virtual output port 521(i), that is, the number of descriptors which may currently be added to the descriptor queue 213 corresponding to virtual output port 521(i). Field 2701 is configured with a maximum dequeue credit that is calculated to ensure that the virtual output port's full bandwidth can be maintained, given the round-trip latency of the dequeue/dequeue acknowledge loop. Whenever TMC 203 outputs a descriptor from a traffic queue belonging to a scheduler queue whose path 529 through scheduler hierarchy 501 includes virtual output port 521(i), the value of field 2701 is decremented; whenever QMU 217 sends TMC 203 a dequeue data message acknowledgement 1921 indicating that a descriptor has been removed from the descriptor queue 213 corresponding to virtual output port 521(i), the value of field 2701 is incremented. The mechanism for passing these messages will be described later. When current credit field 2701 has the value 0, none of the scheduler queues whose paths 529 pass through virtual output port 521(i) is schedulable. Field 2703 is an identifier for virtual output port 2703; in a preferred embodiment, the identifier is simply the identifier for descriptor queue 213 corresponding to the virtual output port. Fields 2701 and 2703 are propagated to schedulers 509 that are above virtual output port 521(i) in scheduler hierarchy 501, as shown in FIG. 22. The fields grouped together at 2705 specify the location of virtual output port 521(i) in scheduler hierarchy 501. The location is specified by specifying an input to a particular scheduler 509(j). Scheduler 509(j) is specified by its level in the hierarchy (field 2707) and its location in the level (field 2709), and field 2711 specifies the input to scheduler 509(j).

Details of Operation of Scheduler Hierarchy 501

Scheduler hierarchy 501 schedules scheduler queues 523 in response to scheduler events that change the state of scheduler hierarchy 501. Whenever such an event occurs, dequeue scheduler 303 first changes the state of hierarchy 501 as required by the event and then schedules the scheduler queues 523 in the parts of hierarchy 501 affected by the changes in the state of hierarchy 501. There are three types of scheduler events:

Scheduler queue enqueue event. A scheduler queue enqueue event occurs when there is a change in the traffic queue 204 that is at the head of a scheduler queue or in the TMC descriptor 216 at the head of the head traffic queue.

Scheduler queue dequeue event. A scheduler queue dequeue event occurs whenever scheduler hierarchy 501 has selected a scheduler queue 523 for dequeue.

Virtual output port enable event. A virtual output port enable event occurs when the reception of a dequeue acknowledge message 1921 from DCP 202 causes a virtual output port's dequeue credit to transition from zero to non-zero.

Occurrence of a scheduler event causes changes in values in the state of schedulers and virtual output ports, and when the changes caused by the event have been made in the values, the schedulers in the path 529 affected by the event begin scheduling, starting with the path's traffic class scheduler 523 and ending with the level 0 scheduler.

State Changes Resulting from Scheduler Events.

Continuing in more detail with the state affected by a scheduler event, a scheduler queue enqueue event can result from a scheduler queue becoming non-empty and therefore active, from a scheduler queue dequeue operation causing a new traffic queue to become the head of the input scheduler queue, or a new descriptor to become the head of the traffic queue at the head of the input scheduler queue. In the latter case, if the new descriptor cannot be dequeued and therefore renders the traffic queue ineligible, the scheduler queue enqueue event will result in the ineligible traffic queue being removed from the scheduler queue. That in turn may render the scheduler queue empty and therefore inactive. The value of backlogged? 2105 will of course change as the scheduler queue becomes active or inactive as a consequence of the scheduler queue enqueue event.

A dequeue event may cause a traffic queue to become empty, which may in turn render a scheduler queue inactive. That will in turn result in an update of the traffic class scheduler 503's backlogged? field 2105 in input state 2103 for the scheduler queue from which the descriptor was dequeued. The dequeue event further updates virtual output port enable fields 2215 in the schedulers following the virtual output port along the scheduler queue's path 529 through scheduler hierarchy 501. A virtual output port enable event, finally, also updates virtual output port enable fields 2215 in the schedulers following the virtual output port along the scheduler queue's path 529 through scheduler hierarchy 501.

Scheduling in Response to a Scheduler Event

After the updates of state in hierarchy 501 that are required by the event have been made, scheduling begins with the lowest-level scheduler in hierarchy 501 whose state is affected by the event and continues in the schedulers on path 529 through the hierarchy from the lowest-level affected scheduler through the level 0 scheduler. Thus, with scheduler queue enqueue and dequeue events, scheduling begins with the traffic class scheduler 503 affected by the event, and with the virtual output port enable events, scheduling begins with the scheduler whose input is controlled by the virtual output port whose state was affected by the event. At each scheduler on the path, selection of a scheduler queue 523 from the set of scheduler queues defined by the scheduler's input is made according to the following rules:

if the lowest-level scheduler affected by the event is a traffic class scheduler 503, an input scheduler queue cannot be selected by the traffic class scheduler unless the input scheduler queue is backlogged, as indicated by field 2105.

If the scheduler is a interior scheduler 509 that has an input scheduler queue that is controlled by a virtual output port, the input scheduler queue cannot be selected by the scheduler unless virtual output port enable state 2215 indicates that the input scheduler queue is schedulable.

If the scheduler is a interior scheduler 509 and the input scheduler queue has a value in propagated eligible time field 2211 that is not in the future, selection among the schedulable input scheduler queues is governed by the scheduler's configured scheduling algorithm (example: a strict priority scheduling algorithm would select the lowest numbered active scheduler input).

if all input scheduler queues have times in field 2211 that are in the future, the schedulable input scheduler queue with the nearest eligible time is selected.

The scheduler queue selected for dequeue to DCP 202 is identified by the propagated scheduler/input state 2207 and 2209 in input state 2205 associated with the input 2203 selected by the level 0 scheduler and the virtual output port 521 for the path taken by the selected scheduler queue is identified by propagated virtual output port specifier 2217 in input state 2205 associated with the input 2203.

Details of Scheduler Configuration: FIGS. 23, 24,29 36 and 37

FIGS. 23 and 36 show scheduler configuration data 2301 which is used to configure both traffic class schedulers 503 and interior schedulers 509. Configuration of some kinds of traffic class schedulers requires additional traffic class scheduler configuration data 2901, shown in FIG. 29. The data contained in specifier 2301 is used to construct a scheduler configuration specifier 425 for a scheduler. As before, the figures show tables, with each row of the table representing a field in configuration data 2301 or 2901. The uses of the fields are specified in row 1006. FIG. 23 is for the most part self-explanatory; fields 2303 and 2305 specify the level and position in the level of the scheduler, and thereby identify the scheduler being configured; fields 2307 through 2311 define how the scheduler is connected to its parent; fields 2313-2317 define the scheduler's type in terms of logical scheduler 1401; field 2319 defines the number of inputs for the scheduler's input. The number varies with the kind of scheduler. Associated with each of a scheduler's inputs is input configuration data, shown in FIG. 24.

FIG. 29 shows traffic class scheduler configuration data 2901. Field 2903 is a tqid 423 for a discard traffic queue associated with the traffic class scheduler 503 being defined; grouped scheduler type flag 2906 indicates whether the scheduler is operating in grouped mode; scheduler type field 2907 indicates whether the scheduler is an FBDRR scheduler; dual shaper flag 2909 indicates that all of the scheduler's inputs are operating in dual shaping mode. Type field 2911 specifies the type of traffic queues being scheduled by the scheduler. The field indicates whether the traffic queues 204 have varying length or fixed length packets, and if they have fixed-length packets, whether the scheduler is to segment or reassemble the packets in the traffic queue. When type field 2911 indicates a segmenting traffic queue, fields 2913-17 specify the parameters used in segmenting.

FIGS. 24 and 37 show scheduler input initialization data 2401, which is used to initialize the inputs of the schedulers; this data, too, is part of scheduler configuration specifier 425. Again, the figures show tables, with each row representing a field in input initialization data. Fields 2407 and 2409 specify the scheduler to which the input belongs, while field 2411 indicates the number of the input being initialized in the specified scheduler. Which of the remaining fields are used depends on the type of the scheduler. Fields 2403 and 2405 specify the byte service interval in scheduler types that use weighted fair queuing; field 2413 is used in guaranteed-excess select schedulers of the type shown in FIG. 14 to specify how the input is connected to guaranteed scheduler 1413 and excess scheduler 1415.

FIGS. 30, 40, and 41 show the data 3001 used to relate traffic queues to input scheduler queues 523 for traffic class scheduler 503. For a given traffic queue, this data is referred to by field 831 in the traffic queue's parameter block 403. The contents of the data depend on the scheduling algorithm used by the traffic class scheduler. The contents shown at 3003 are used for all scheduling algorithms where the traffic queue remains assigned to a single input scheduler queue belonging to the traffic class scheduler. The data consists of a type flag 3005, which is set to 00, indicating that the algorithm retains the traffic queue in a fixed scheduler queue, and field 3009, which contains the number of the fixed input scheduler queue in the traffic class scheduler. Examples of traffic class schedulers which use data 3003 are round-robin and strict priority schedulers.

Data 3011 is used for dual shaping leaky bucket schedulers, in which a traffic queue is moved between members of a pair of input scheduler queues. The value of the type field specifies this kind of scheduling, fields 3015 and 3017 contain parameters for the leaky bucket scheduling, and field 3019 specifies the even input scheduler queue of the pair. Data 3021 is used for FBDRR schedulers. Type field 3023 indicates this with the value '10', field 3025 is the minimum quantum parameter for the traffic queue, and field 3027 is the maximum quantum parameter for the traffic queue. Of course, many different traffic queues 204 may share data 3021.

EXAMPLE

Figure 26:
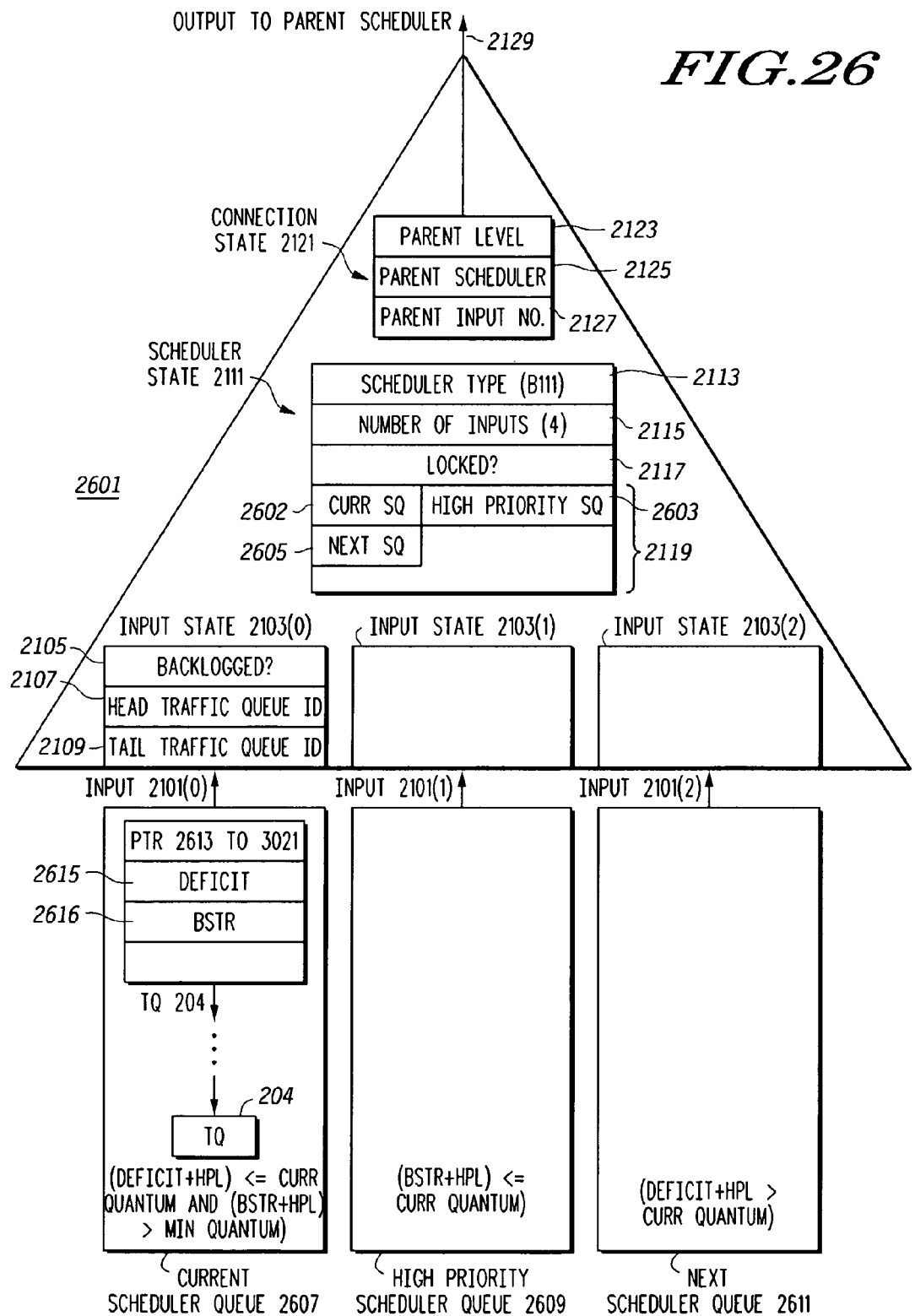
FIG. 26 is a detailed diagram of a traffic class scheduler that employs a frame-based deficit round robin scheduling algorithm.

Configuration and Operation of a Scheduler that Uses the Frame-Based Deficit Round-Robin Scheduling Algorithm: FIG. 26

FIG. 26 shows the detailed configuration of a traffic class scheduler 503 that has been configured as a frame-based deficit round-robin scheduler 2601. As previously explained, the FBDRR algorithm schedules according to packet size, and consequently allocates bandwidth effectively when the traffic consists of variable-sized packets such as those typical of the TCP protocols. A novel feature of the present version of FBDRR is the manner in which it makes provision for the fact that many of the messages in the TCP protocols are relatively short acknowledgement messages.

In scheduler 2601, connection state 2121 and input state 2103 for each input are as previously described. Scheduler type field 2113 has the value b111, indicating the deficit round-robin scheduling algorithm, and number of inputs 2115 has the value 4, of which three inputs 2103(0 . . . 2) actually have scheduler queues 523 associated with them: In the implementation of the FBDRR algorithm employed in a preferred embodiment, two of the scheduler queues, in this case, the scheduler queues 2607 and 2611 attached to inputs 2101(0) and 2101(2) respectively alternate as the current scheduler queue 2607 and the next scheduler queue 2611. When the current scheduler queue is empty, it becomes the next scheduler queue and the next scheduler queue becomes the current scheduler queue. The third scheduler queue is high priority queue 2609. Algorithm-dependent state 2119 includes an item of state for each of the three scheduler queues; item 2601 indicates which of queues 2607 and 2611 is the current scheduler queue; item 2605 indicates which is the next scheduler queue; item 2603 indicates which scheduler queue is high priority queue 2609. As described in the discussion of the FBDRR algorithm, which scheduler queue a traffic queue is placed in is determined by the traffic queue's maximum quantum and minimum quantum parameters and its deficit counter 2615 and BytesServedThisRound (BSTR) counter 2616. The parameter values are contained in input data 3021 (FIG. 30), which is pointed to by field 831 in the traffic queue's parameter block, as shown at 2613. The counter values are stored in field 845.

How the values of max quantum 2615, min quantum 2613, deficit counter 2615 and BSTR counter 2616 relate to which scheduler queue the traffic queue is in is shown by the expressions at the bottom of each of the traffic queues. As explained in the discussion of the algorithm, when a descriptor is removed from the traffic queue 204 at the head of either current scheduler queue 2607 or high priority scheduler queue 2609, the traffic queue's deficit counter 2615 is decremented by the length of the descriptor's packet and its BSTR counter 2616 is incremented by that amount. When a traffic queue is moved from high-priority scheduler queue 2609 to current scheduler queue 2607, BSTR 2616 is set to 0; when a traffic queue is moved from either high-priority scheduler queue 2609 or current scheduler queue 2607 to next scheduler queue 2611, the traffic queue's deficit counter 2615 is set to maximum quantum plus deficit counter and its BSTR counter 2616 is set to 0. When a traffic queue that is at the head of current scheduler queue 2607 or high priority scheduler queue 2609 is or becomes ineligible, it is removed from the scheduler queue; when a traffic queue becomes eligible, it is placed in next scheduler queue 2611.

Physical Implementation of TMC 203: FIGS. 15-20

Figure 15:
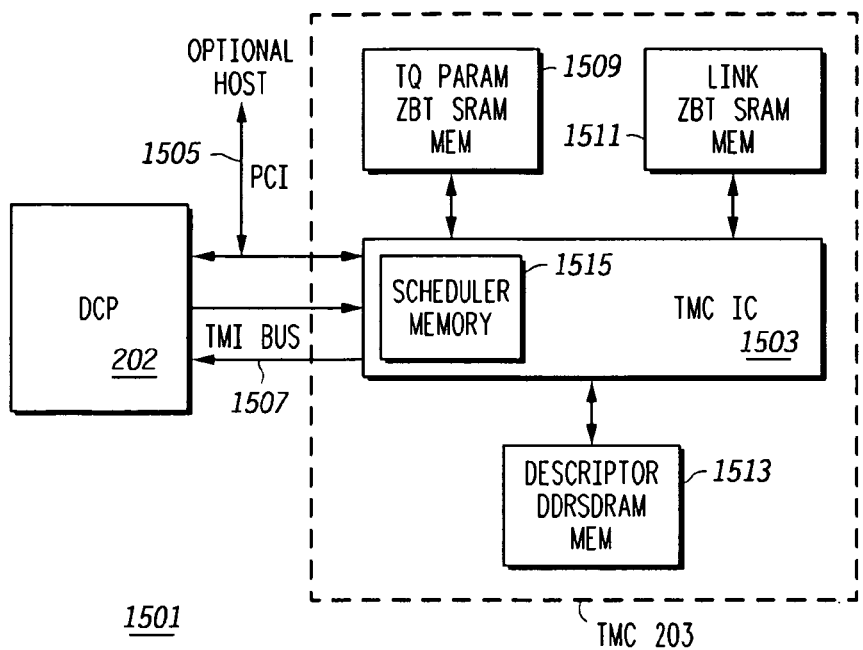
FIG. 15 is a block diagram of a presently-preferred implementation of system 201.

Overview of the physical implementation: FIG. 15 FIG. 15 is a block diagram of physical implementation 1501 of system 201. As indicated in the discussion of system 201, there are two main components: DCP 202 and TMC 203. As shown here in more detail, TMC 203 includes TMC IC 1503, in which are implemented enqueue processor 301, dequeue scheduler 303, and traffic queue processor 305, together with part of TMC memory 307, including scheduler memory 1515, in which scheduler hierarchy 501 is configured, and external memories 1509, 1511, and 1513, which implement the remainder of TMC memory 307. External memory 1509 is a ZBT SRAM memory which stores traffic queue parameter blocks 403 and related data structures for the traffic queues; external memory 1513 is a DDRSDRAM memory which stores the descriptors in the traffic queues' descriptor queues 419; external memory 1511 is a ZBT SRAM memory that stores the data used to link TMC descriptors 216 in the traffic queues 204 and to link traffic queues into scheduler queues. As will be explained in more detail in the following, TMC IC 1503 may be configured for varying amounts of external memory.

TMC IC 1503 receives enqueue data messages 601 from and provides dequeue data messages 701 to DCP 202 via TMI bus 1507. Both DCP 202 and TMC 203 may be configured using PCI bus 1505 to write to TMC memory 307. Both internal and external TMC memory 307 may be read and written via PCI bus 1505. PCI bus 1505 employs a standard PCI bus protocol; the protocol used in TMI bus 1507 will be explained in more detail in the following.

Figure 16:
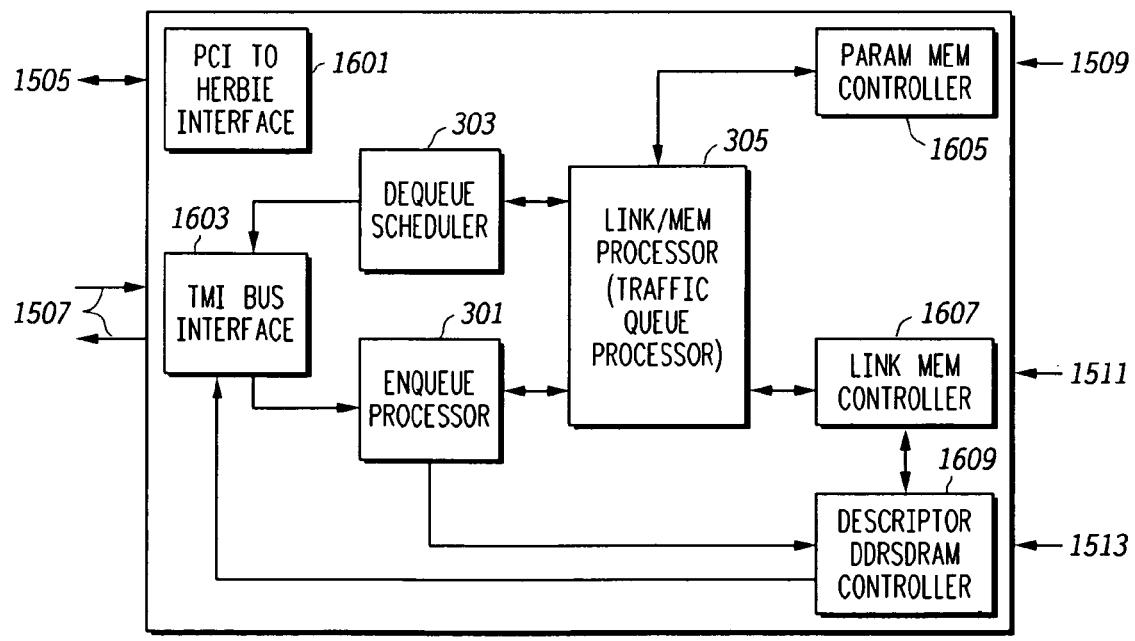
FIG. 16 is a detailed block diagram of TMC IC 1503.

Details of TMC IC 1503: FIG. 16

FIG. 16 shows internal details of TMC IC 1503. Also included, but not shown, is memory internal to TMC IC 1503. There are an interface 1601 to PCI bus 1505, an interface 1603 to TMI bus 1507, a controller 1605 for parameter memory 1509, a controller 1607 for link memory 1511, and a controller 1609 for descriptor memory 1513. Also found in TMC IC 1503 are dequeue scheduler 303, enqueue processor 301, and traffic queue processor 305. The arrows linking the components indicate the flow of data between them. Thus, when TMI bus interface 1603 receives an enqueue data message 601, it outputs enqueue data message 601 to enqueue processor 301, which provides at least cp descriptor 214 to descriptor memory controller 1609 for storage in descriptor memory 1513, the remaining contents of TMC descriptor 216, a link to the stored cp descriptor 214, and a specification of a traffic queue to traffic queue processor 305, which uses the information and link memory controller and link memory 1511 to link the descriptor into the specified traffic queue or discard traffic queue. While this is going on, dequeue scheduler 303 executes schedulers contained in the memory of TMC IC 1503 and selects thereby the traffic queue whose head descriptor is to be next output via TMI bus interface 1603. Dequeue scheduler 303 uses traffic queue processor 305 to retrieve the link to the selected traffic queue's head descriptor and provides it along with the additional information needed to make a dequeue data message 701 to TMI bus interface 1603, which provides the link to controller 1513, receives the descriptor from memory 1513, and outputs a dequeue data message 701 containing the descriptor via TMI bus interface 1603.

Figures 17, 18:
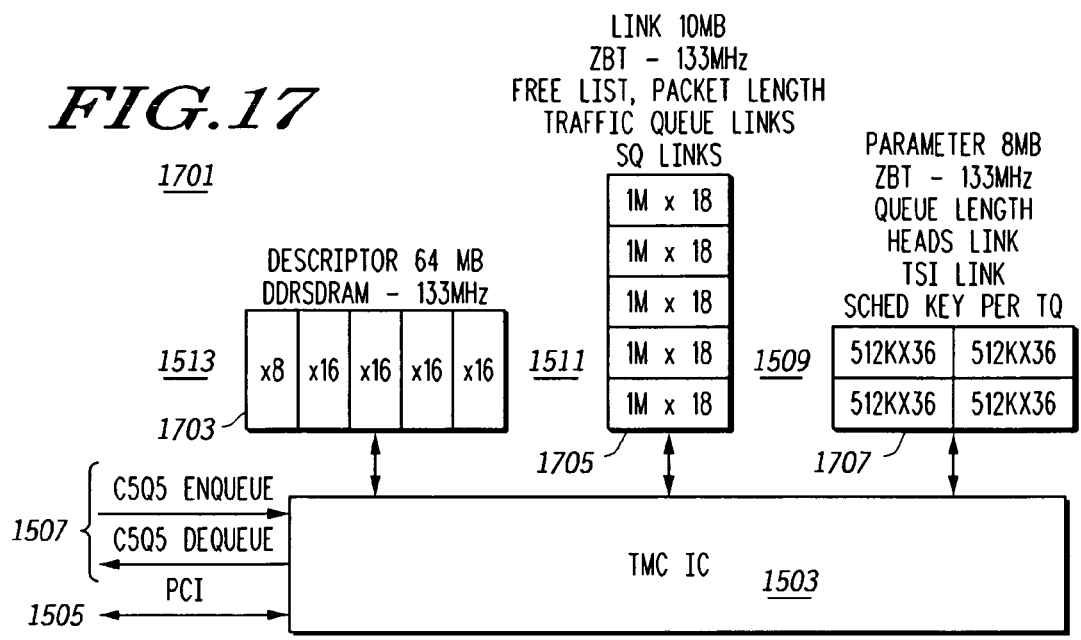
FIG. 17 is a detailed block diagram of a configuration of external memory in TMC IC 1503.
FIG. 18 is a table showing example external memory configurations in TMC IC 1503.

Memory Configurations with TMC IC 1503: FIGS. 17 and 18

As previously mentioned, TMC IC 1503 may be configured with different amounts of external memory. FIG. 17 shows a maximum configuration. Descriptor memory 1513 may include up to four 128 Mb(.times.16) and one 128 Mb(.times.8) DDRSDRAM memory ICs 1703; link memory 1511 may contain up to five 1 Mb(.times.18) ZBT SRAM memory IC's 1705, and descriptor parameter memory 1511 may include up to 4 512K(.times.36) ZBT SRAM memory IC's. When so configured, TMC IC 1503 will support OC 48 line rates and will be able to handle 2M 32-bit descriptors, 256K traffic queues, and 8K scheduler queues. Where line rates are lower or descriptors are fewer or smaller or where fewer traffic queues or fewer scheduler queues are required, the amount of external memory may be reduced. Configuration registers in TMC IC 1503 that are settable via PCI bus 1505 define both the maximum size of the external memories and partitions within the external memories. FIG. 18 is a table 1801 which shows typical configuration possibilities for OC 48 line rates and the amounts of each kind of external memory required for these configurations.

Details of TMI Bus 1507: FIG. 19

FIG. 19 shows a schematic 1901 of TMI bus 1507; table 1925 is a table that lists the names of the bus's signal names, whether the signal is an input or output signal from the point of view of TMC 1503, and a description of the signal.

Clock Signals

The DQCLK/DQCLKX 1905 pair is derived by TMC IC 1503 from TMICLK source 1903. DQCLK is half the frequency of TMICLK. DQCLKX is the inverted form of DQCLK. DQCLKX is exactly 180 degrees out of phase with respect to DQCLK. All outputs of TMC IC 1503 are synchronized to the rising edges of both DQCLK and DQCLKX; these outputs include DQD[23:0], NQRDY, DQARDY, and DQPAR. The NQCLK/NQCLKX pair 1907 is derived by the DCP from the received DQCLK/DQCLKX pair. NQCLKX is exactly 180 degrees out of phase with respect to NQCLK. All outputs of DCP 202 are synchronized to the rising edges of both NQCLK and NQCLKX; these outputs include NQD[23:0], DQRDY, DQACK[1:0], and NQPAR. The maximum clock frequency for the TMICLK signal is 200 MHz, which implies a maximum frequency of 100 MHz for each clock in the DQCLK/DQCLKX and NQCLK/NQCLKX pairs. The TMICLK frequency and NQD/DQD bus widths are chosen to support 32 byte descriptors assuming full C-5 DCP port bandwidth (approximately 5 Gbps) and a minimum average packet size of 40 bytes. The TMICLK frequency is further restricted to be no greater than twice the frequency of the TMC system clock, SCLK, which has a maximum frequency of 133 MHz.

Parity Signals

NQPAR signal 1909 is an odd parity signal covering all outputs of DCP 202 received by TMC IC 1503 (including NQD[23:0], DQRDY, and DQACK[1:0]). DQPAR 1911 signal is an odd parity signal covering all outputs of TMC IC 1503 received by DCP 202 (including DQD[23:0], NQRDY, and DQARDY).

Message Buses

There are three message buses in TMI bus 1507: NQD[23:0] 1913, which carries enqueue data messages, DQD[23:0] 1917, which carries dequeue data messages, and DQACK[1:0] 1921, which carries acknowledgements of dequeue data messages. NQD[23:0] 1913 carries the 24-bit words of enqueue data messages. The formats of these messages are shown in detail in FIGS. 6, 31, and 13. The NQD[23:0] bus pins are all high when the bus is idle. The start of an enqueue message is identified by a non-idle value in type field 611 of the message (bits 2:0 of the first 24-bit word of the message). DQD[23:0] carries the 24-bit words of dequeue data messages. The formats of the messages are shown in detail in FIGS. 7, 32, and 33, and as with enqueue data messages, the start of the dequeue data message is identified by a non-idle value in type field 703 of the message (bits 2:0 of the first 24-bit word of the message). The size of an enqueue or dequeue data message is variable depending on a descriptor size. The descriptor size is statically configured on both sides of the interface before any enqueue messages are sent from DCP 202 to TMC IC 1503.

DQACK[1:0] carries dequeue acknowledge messages from DCP 202 to TMC IC 1503. An acknowledge message is sent each time a descriptor is dequeued from a queue 213 in queues 247. Each message contains the virtual output port identifier specified in field 707 of the dequeue data message 701 in which the dequeued descriptor came from TMC IC 1503. The message is made up of 5 two-bit words and its format is shown at 2801 in FIG. 28.

Figure 20:
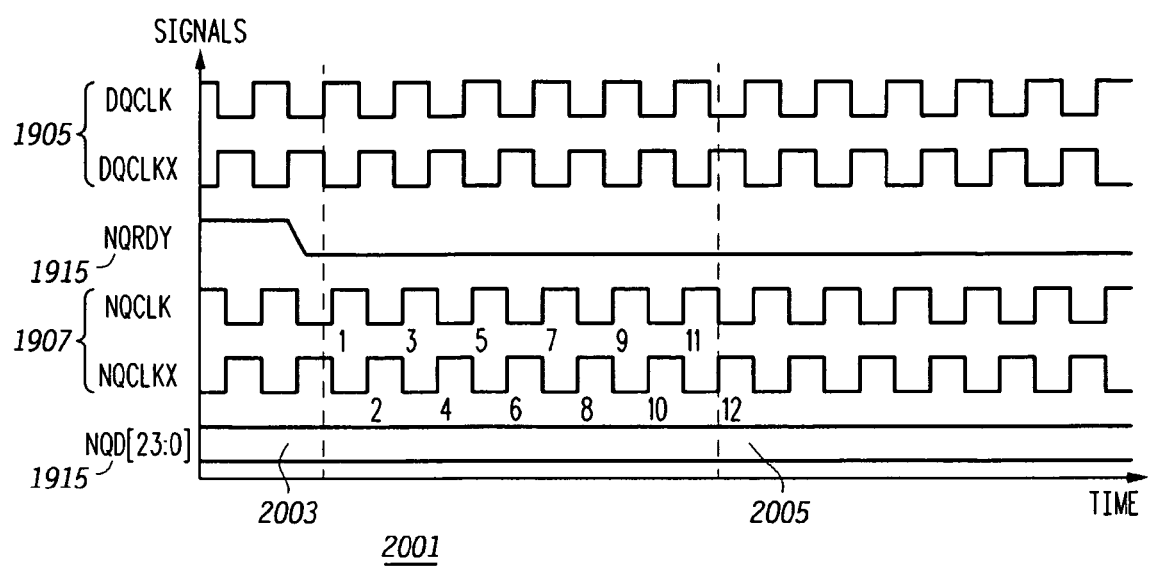
FIG. 20 shows timing diagrams for signals on TMI bus 1507.
Figure 38:
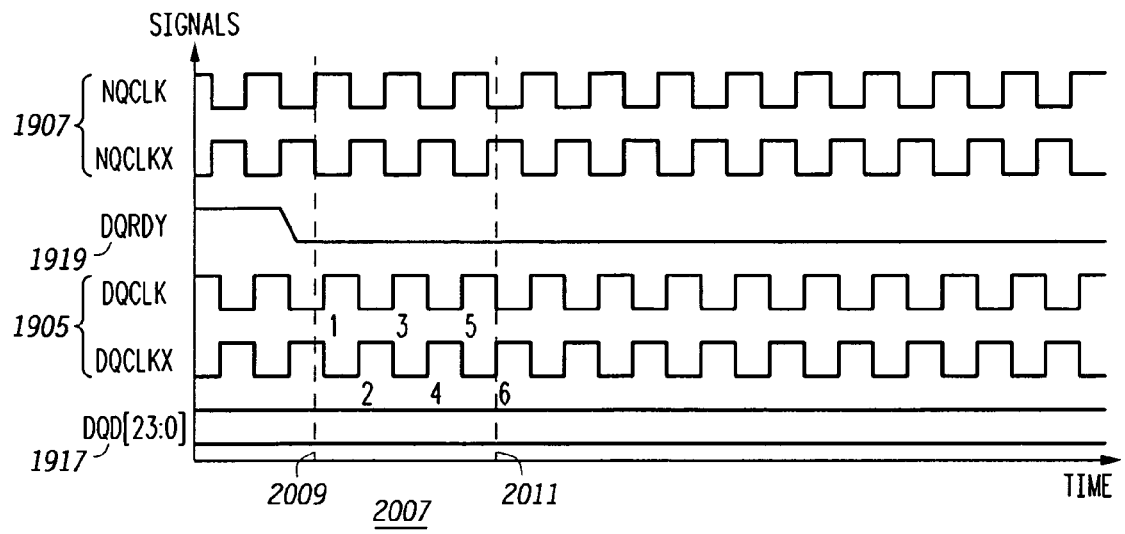
FIG. 38 is a continuation of FIG. 20.
Figure 39:
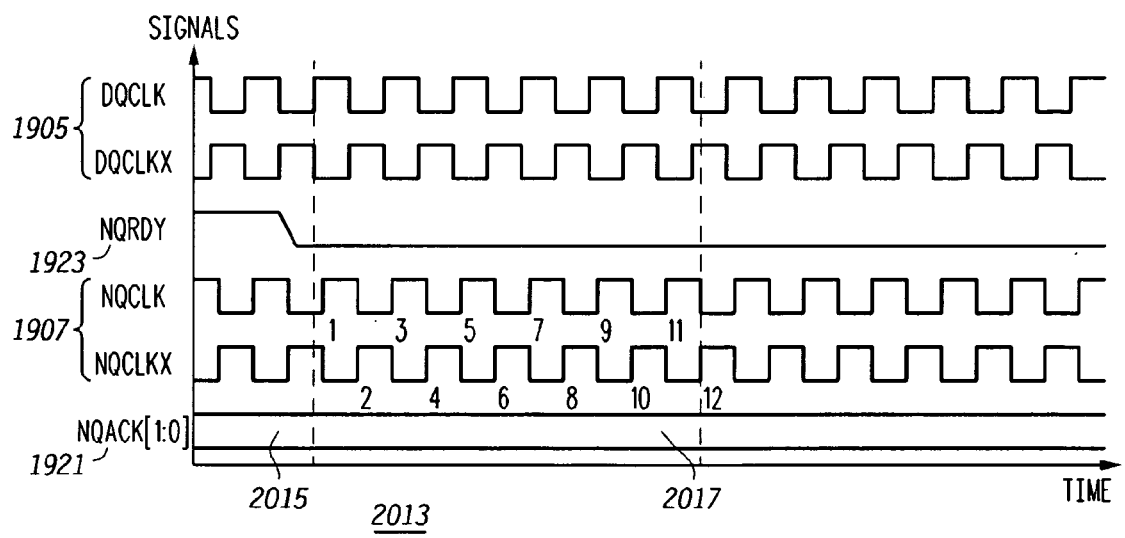
FIG. 39 is a further continuation of FIG. 20.

Flow Control on TMI Bus 1510: FIGS. 20, 38, 39

Flow of messages over the message buses NQD 1913, DQD 1917, and DQACK 1:0 is controlled by the signals NQRDY 1915, DQRDY 1919, and DOARDY 1923 respectively. NQRDY signal 1915 must be asserted to enable the flow of enqueue data messages over the enqueue data bus (NQD[23:0]). Once an enqueue data message is started on the enqueue data bus, it must be completed. This signal is used by TMC IC 1503 to pace the enqueue data messages coming from DCP 202. In the extreme case, TMC IC 1503 uses this signal to stop incoming enqueue data messages entirely when TMC IC 1503 has run out of descriptor storage resources. After the deassertion of NQRDY 1915 by TMC IC 1503, DCP 202 must stop generating enqueue data messages within a count of 12 rising edges of both NQCLK and NQCLKX. This is shown in timing diagram 2001 in FIG. 20. NQRDY 1915 is deasserted at 2003 and DCP 202 must stop generating enqueue data messages by the time indicated by 2005.

Note that the NQRDY signal is synchronous with the DQCLK/DQCLKX clock pair. Rising edges of the NQCLK/NQCLKX pair are counted starting with the first NQCLK/NQCLKX rising edge after the first rising edge of the DQCLK/DQCLKX pair in which NQRDY is sampled inactive. If the NQCLK/NQCLKX pair is treated as being asynchronous with respect to the DQCLK/DQCLKX pair, then one rising edge of NQCLK/NQCLKX out of the required 12 is lost due to the asynchronous nature of the clocks.

DQRDY signal 1919 manages flow control of dequeue data messages. DQRDY is asserted to enable the flow of dequeue messages over the dequeue data bus (DQD[23:0]). Once a dequeue data message is started on the dequeue data bus, it must be completed. This signal is used by DCP 202 to pace the dequeue data messages coming from TMC IC 1503. TMC IC 1503 must stop generating dequeue data messages within a count of 6 rising edges of both DQCLK and DQCLKX after the deassertion of DQRDY by the DCP, as shown in timing diagram 2007 of FIG. 20, where deassertion of DQRDY 1919 occurs at 2009 and 2011 marks the point at which no further new dequeue data messages may be generated.

Note that DQRDY signal 1919 is synchronous with the NQCLK/NQCLKX clock pair. Rising edges of the DQCLK/DQCLKX pair are counted starting with the first DQCLK/DQCLKX rising edge after the first rising edge of the NQCLK/NQCLKX pair in which DQRDY is sampled inactive. If the DQCLK/DQCLKX pair is treated as being asynchronous with respect to the NQCLK/NQCLKX pair, then one rising edge of DQCLK/DQCLKX out of the required 6 is lost, due to the asynchronous nature of the clocks.

DQARDY 1923 is asserted to enable the flow of dequeue acknowledge messages over dequeue acknowledge bus DQACK 1921. Once a dequeue acknowledge message is started on the dequeue acknowledge bus, it must be completed. DQARDY 1923 is used by TMC IC 1503 to pace the dequeue acknowledge messages coming from DCP 202. The DCP must stop generating dequeue acknowledge messages within a count of 12 rising edges of both NQCLK and NQCLKX, after the deassertion of DQARDY by TMC IC 1503 as shown in timing diagram 2013 of FIG. 20, where deassertion of DQARDY 1919 occurs at 2015 and 2017 marks the point at which no further new dequeue acknowledgment messages may be generated.

Note that DQARDY signal 1023 is synchronous with the DQCLK/DQCLKX clock pair. Rising edges of the NQCLK/NQCLKX pair are counted starting with the first NQCLK/NQCLKX rising edge after the first rising edge of the DQCLK/DQCLKX pair in which DQARDY is sampled inactive. If the NQCLK/NQCLKX pair is treated as being asynchronous with respect to the DQCLK/DQCLKX pair, then one rising edge of NQCLK/NQCLKX out of the required 12 is lost due to the asynchronous nature of the clocks.

CONCLUSION

The foregoing Detailed Description has described to those skilled in the relevant technologies how to make and use a stream data processing environment in which the inventions of the present patent application are implemented and has further disclosed the best mode of implementing the inventions presently known to the inventors. It will, however, be immediately apparent to those skilled in the relevant technologies that the inventions can be practiced in many stream data processing environments other than the one disclosed herein and that even in the environment disclosed herein, many alternative embodiments of the inventions are possible.

To give some examples: The inventive techniques described herein are particularly useful in an environment where the packet processing is done in one integrated circuit and the traffic management is done in another, but they are by no means limited to such an environment, but can be applied wherever it is desirable to separate traffic management and packet processing, and thus can be used with devices that perform traffic management and/or packet processing functions but are not implemented as integrated circuits. Further, the form and content of the descriptors will vary with every implementation, as will the traffic management functions and packet processing functions. Additionally, the discard and scheduling operations that are performed on descriptors for packets in the preferred embodiment can also be performed using the packets themselves. The details of the interface between the traffic management part of the environment and the packet processing part will also vary from implementation to implementation.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of scheduling varying-length packets, the method employing two sets of sets of the packets and the method comprising the steps of: selecting a given set of packets belonging to a current set of the two sets of sets of packets for scheduling, each set of packets belonging to the current set of the sets of packets being associated with a maximum quantum and a minimum quantum, the given set of packets remaining selected for scheduling as determined by the minimum quantum, and the minimum quantum determining a total size of packets that may be scheduled from the selected set of packets before again selecting a set of the packets belonging to the current set of the sets for scheduling; placing the given set of packets in the other of the two sets of sets of the packets as determined by the maximum quantum, the maximum quantum determining a total size of packets that may be scheduled from the selected set before the selected set is placed in the other of the two sets of the sets of packets; and when the current set of sets of packets becomes empty, swapping the current set of sets of packets and the other set of sets of packets.

2. The method set forth in claim 1 further comprising the step of: when the set of packets is moved from the current set to the next set, computing a new maximum quantum using the difference between the total size of the packets actually scheduled and the maximum quantum at the time the set of packets is placed in the other of the two sets of packets.

3. The method set forth in claim 1 further comprising the steps of: when a set of the packets belonging to the current set becomes ineligible for scheduling, removing the ineligible set of packets from the current set; and when an ineligible set of packets becomes eligible for scheduling, adding the eligible set to the next set.

4. The method set forth in claim 1 wherein: the current set of sets of packets is an ordered set and the sets of packets are selected for scheduling in round-robin fashion.

5. The method set forth in claim 1 wherein: the sets of packets in the current set are ordered sets and when a set of packets has been selected for scheduling, a packet is selected therefrom in round-robin fashion.

6. The method set forth in claim 1 wherein: the method employs a third set of sets of packets that has priority for scheduling over the current set of sets of packets; and the given set of packets belongs to the third set of sets of packets while the given set of packets remains selected for scheduling as determined by the minimum quantum and is thereafter moved to the current set of sets of packets and scheduled therefrom as determined by the maximum quantum.

7. The method set forth in claim 6 wherein: the current set of sets of packets and the third set of sets of packets are ordered sets and the sets of packets are selected for scheduling in the current set of packets and in the third set of packets in round-robin fashion.

8. The method set forth in claim 7 wherein: the sets of packets in the current set and the third set of sets of packets are ordered sets and when a set of packets has been selected for scheduling, a packet is selected therefrom in round-robin fashion.

9. The method set forth in claim 1 wherein: each packet is represented by a descriptor; and in the set of packets, the packets are represented by their descriptors.

* * * * *